(12) United States Patent
Shirai

(10) Patent No.: US 9,969,447 B2
(45) Date of Patent: May 15, 2018

(54) BICYCLE SEATPOST ASSEMBLY

(71) Applicant: SHIMANO INC., Sakai (JP)

(72) Inventor: Toyoto Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 557 days.

(21) Appl. No.: 14/709,420

(22) Filed: May 11, 2015

(65) Prior Publication Data

US 2015/0239517 A1 Aug. 27, 2015

Related U.S. Application Data

(63) Continuation-in-part of application No. 14/300,172, filed on Jun. 9, 2014, now Pat. No. 9,499,224, which is a continuation-in-part of application No. 14/185,784, filed on Feb. 20, 2014, now Pat. No. 9,604,691.

(51) Int. Cl.
*B62J 1/08* (2006.01)

(52) U.S. Cl.
CPC ............ *B62J 1/08* (2013.01); *B62J 2001/085* (2013.01); *Y10T 403/32426* (2015.01)

(58) Field of Classification Search
CPC ....... B62M 25/04; B62M 23/02; B62K 19/36; B62J 1/08
See application file for complete search history.

(56) References Cited

U.S. PATENT DOCUMENTS 3,406,587 A 10/1968 Brilando et al.
3,443,825 A 5/1969 Wolf
3,861,740 A 1/1975 Tajima et al.
4,807,856 A 2/1989 Teckenbrock
(Continued)

FOREIGN PATENT DOCUMENTS

AT 216373 B 7/1961
DE 29806919 U1 8/1998
(Continued)

OTHER PUBLICATIONS

Office Action with Form PTO-892 Notice of References Cited issued by the U.S. Patent and Trademark Office for the parent U.S. Appl. No. 14/300,172, dated Mar. 4, 2016.
(Continued)

*Primary Examiner* — Daniel J Wiley
(74) *Attorney, Agent, or Firm* — Mori & Ward, LLP

(57) ABSTRACT

A bicycle seatpost assembly comprises a first cylinder, a second cylinder, a positioning structure, and an adjusting structure. The second cylinder is configured to be telescopically received in the first cylinder. The positioning structure is configured to relatively position the first cylinder and the second cylinder and configured to switch a state of the bicycle seatpost assembly among a first adjustable state and a second adjustable state. In the first adjustable state, a positional relationship between the first cylinder and the second cylinder is adjustable within a first adjustable position range. In the second adjustable state in which the positional relationship between the first cylinder and the second cylinder is adjustable within a second adjustable position range different from the first adjustable position range. The adjusting structure is configured to adjust at least one of the first adjustable position range and the second adjustable position range.

31 Claims, 42 Drawing Sheets

(56) References Cited

U.S. PATENT DOCUMENTS

| | | |
|---|---|---|
| 4,872,696 A | 10/1989 | Gill |
| 4,924,723 A | 5/1990 | Cristie |
| 4,938,733 A | 7/1990 | Patterson |
| 5,007,675 A | 4/1991 | Musto et al. |
| 5,044,592 A | 9/1991 | Cienfuegos |
| 5,149,034 A | 9/1992 | Ganaja |
| 5,370,017 A | 12/1994 | Krauer |
| 5,577,969 A | 11/1996 | Watarai |
| 5,682,794 A | 11/1997 | Shibata |
| 5,829,733 A | 11/1998 | Becker |
| 5,881,602 A | 3/1999 | Cirami |
| 6,502,477 B1 | 1/2003 | Assel |
| 2006/0260428 A1 | 11/2006 | Kawakami et al. |
| 2007/0068316 A1 | 3/2007 | Kawakami et al. |
| 2008/0007098 A1 | 1/2008 | Girard |
| 2011/0204201 A1 | 8/2011 | Kodama et al. |
| 2011/0257848 A1 | 10/2011 | Shirai |
| 2012/0104727 A1 | 5/2012 | Hsu |
| 2013/0119634 A1 | 5/2013 | Camp et al. |

FOREIGN PATENT DOCUMENTS

| | | |
|---|---|---|
| DE | 19849178 C1 | 6/2000 |
| DE | 10140995 | 6/2003 |
| DE | 10 2011 012 063 | 8/2011 |
| EP | 1764298 | 3/2007 |
| GB | 442311 | 2/1936 |
| JP | 4040057 B2 | 3/2007 |

OTHER PUBLICATIONS

Office Action with Form PTO-892 Notice of References Cited issued by the U.S. Patent and Trademark Office for the corresponding U.S. Appl. No. 14/185,784, dated Oct. 2, 2015.

Office Action with Form PTO-892 Notice of References Cited issued by the U.S. Patent and Trademark Office for the corresponding U.S. Appl. No. 14/185,784, dated Jun. 16, 2016.

Office Action issued by the U.S. Patent and Trademark Office for the parent U.S. Appl. No. 14/300,172, dated Jun. 16, 2016.

Office Action with Form PTO-892 Notice of References Cited issued by the U.S. Patent and Trademark Office for the U.S. Appl. No. 14/185,784, dated Mar. 26, 2015.

BICYCLE SEATPOST ASSEMBLY

CROSS-REFERENCE TO RELATED APPLICATIONS

The present application is a continuation-in-part application of the U.S. patent application Ser. No. 14/300,172 filed Jun. 9, 2014 which is a continuation-in-part application of the U.S. patent application Ser. No. 14/185,784 filed Feb. 20, 2014. The contents of these applications are incorporated herein by reference in their entirety.

BACKGROUND OF THE INVENTION

Field of the Invention

The present invention relates to a bicycle seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device. Another bicycle component that has been extensively redesigned is a bicycle seatpost assembly.

SUMMARY OF THE INVENTION

In accordance with a first aspect of the present invention, a bicycle seatpost assembly comprises a first cylinder, a second cylinder, a positioning structure, and an adjusting structure. The second cylinder is configured to be telescopically received in the first cylinder. The positioning structure is configured to relatively position the first cylinder and the second cylinder and configured to switch a state of the bicycle seatpost assembly among a first adjustable state and a second adjustable state. In the first adjustable state, a positional relationship between the first cylinder and the second cylinder is adjustable within a first adjustable position range. In the second adjustable state in which the positional relationship between the first cylinder and the second cylinder is adjustable within a second adjustable position range different from the first adjustable position range. The adjusting structure is configured to adjust at least one of the first adjustable position range and the second adjustable position range.

In accordance with a second aspect of the present invention, the bicycle seatpost assembly according to the first aspect is configured so that the adjusting structure is configured to adjust one of the first adjustable position range and the second adjustable position range without changing the other of the first adjustable position range and the second adjustable position range.

In accordance with a third aspect of the present invention, the bicycle seatpost assembly according to the first aspect is configured so that the first cylinder and the second cylinder are relatively movable in a telescopic direction. The positioning structure includes a first positioning member movable together with one of the first cylinder and the second cylinder in the telescopic direction relative to the other of the first cylinder and the second cylinder, and a second positioning member movable together with the other of the first cylinder and the second cylinder in the telescopic direction relative to the one of the first cylinder and the second cylinder. The adjusting structure is configured to adjust a relative positional relationship between the first positioning member and the second positioning member in a reference state where a total length of the bicycle seatpost assembly is one of shortest and longest.

In accordance with a fourth aspect of the present invention, the bicycle seatpost assembly according to the third aspect is configured so that the adjusting structure is configured to change a position of the first positioning member relative to one of the first cylinder and the second cylinder, and/or the adjusting structure is configured to change a position of the second positioning member relative to the other of the first cylinder and the second cylinder.

In accordance with a fifth aspect of the present invention, the bicycle seatpost assembly according to the third aspect is configured so that the second positioning member extends in the telescopic direction in a form of a fluid cylinder. The first positioning member includes a support member and a seal member. The support member is at least partly disposed in the fluid cylinder to provide a fluid passageway between the support member and the fluid cylinder. The seal member is configured to block the fluid passageway in a state where the total length of the bicycle seatpost assembly is an intermediate length between a maximum overall length and a minimum overall length.

In accordance with a sixth aspect of the present invention, the bicycle seatpost assembly according to the fifth aspect is configured so that one of the first cylinder and the second cylinder includes an attachment end. The support member extends in the telescopic direction and is configured to be attached to the attachment end. The adjusting structure is configured to adjust a position of the support member relative to the attachment end in the telescopic direction.

In accordance with a seventh aspect of the present invention, the bicycle seatpost assembly according to the sixth aspect is configured so that the adjusting structure includes a securing member and at least one spacer. The securing member is configured to be secured to an end of the support member. The at least one spacer is configured to be detachably provided between the securing member and the attachment end to adjust a position of the support member relative to the attachment end.

In accordance with an eighth aspect of the present invention, the bicycle seatpost assembly according to the sixth aspect is configured so that the adjusting structure includes a lock member configured to lock the support member relative to the attachment end so that a position of the support member is adjustable relative to the attachment end.

In accordance with a ninth aspect of the present invention, the bicycle seatpost assembly according to the sixth aspect is configured so that the other of the first cylinder and the second cylinder includes an additional attachment end. The fluid cylinder is configured to be attached to the additional attachment end. The adjusting structure is configured to adjust a position of the fluid cylinder relative to the additional attachment end in the telescopic direction.

In accordance with a tenth aspect of the present invention, the bicycle seatpost assembly according to the ninth aspect is configured so that the adjusting structure includes a rack and a pinion gear. The rack includes teeth and secured to the fluid cylinder. The pinion gear is configured to engage with the teeth of the rack to position the fluid cylinder relative to the additional attachment end.

In accordance with an eleventh aspect of the present invention, a bicycle seatpost assembly comprises a first cylinder, a second cylinder, a positioning structure, a first abutment, a second abutment, and an adjusting structure. The second cylinder is configured to be telescopically received in the first cylinder so as to be movable with respect to the first cylinder in a telescopic direction. The telescopic direction includes an extending direction in which a total length of the bicycle seatpost assembly increases, and a shortening direction which is opposite to the extending direction and in which the total length of the bicycle seatpost assembly decreases. The positioning structure is configured to relatively position the first cylinder and the second cylinder. The first abutment is configured to be coupled to the first cylinder. The second abutment is configured to be coupled to the second cylinder. The second abutment is configured to abut the first abutment to restrict a movement of the second cylinder with respect to the first cylinder in the extending direction. The adjusting structure is configured to adjust one of a position of the first abutment relative to the first cylinder and a position of the second abutment relative to the second cylinder.

In accordance with a twelfth aspect of the present invention, the bicycle seatpost assembly according to the eleventh aspect is configured so that the first abutment and the second abutment are provided in the second cylinder.

In accordance with a thirteenth aspect of the present invention, the bicycle seatpost assembly according to the twelfth aspect is configured so that the positioning structure includes a sealing structure and a support member. The sealing structure is configured to be mounted to the second cylinder and has an opening. The support member is configured to be mounted to the first cylinder to extend through the opening of the sealing structure. The first abutment is provided to the support member. The second abutment is provided to the sealing structure.

In accordance with a fourteenth aspect of the present invention, the bicycle seatpost assembly according to the thirteenth aspect is configured so that the adjusting structure is configured to change a position of the support member relative to the first cylinder to adjust the position of the first abutment relative to the first cylinder.

In accordance with a fifteenth aspect of the present invention, the bicycle seatpost assembly according to the fourteenth aspect is configured so that the first cylinder includes an attachment end to which the support member is configured to be attached. The adjusting structure includes a securing member and at least one spacer. The securing member is configured to be secured to an end of the support member and is provided outside the first cylinder. The at least one spacer is configured to be detachably provided between the securing member and the attachment end to adjust a position of the support member relative to the attachment end.

In accordance with a sixteenth aspect of the present invention, the bicycle seatpost assembly according to the fourteenth aspect is configured so that the first cylinder includes an attachment end to which the support member is configured to be attached. The adjusting structure includes a lock member configured to lock the support member relative to the attachment end so that a position of the support member is adjustable relative to the attachment end.

In accordance with a seventeenth aspect of the present invention, the bicycle seatpost assembly according to the eleventh aspect is configured so that the first abutment and the second abutment are provided outside the second cylinder.

In accordance with an eighteenth aspect of the present invention, the bicycle seatpost assembly according to the seventeenth aspect is configured so that the first cylinder includes an inner peripheral surface. The second cylinder includes an outer peripheral surface configured to face the inner peripheral surface. The first abutment is provided on the inner peripheral surface of the first cylinder. The second abutment is provided on the outer peripheral surface of the second cylinder.

In accordance with a nineteenth aspect of the present invention, the bicycle seatpost assembly according to the eighteenth aspect is configured so that the second abutment is configured to radially protrude from the outer peripheral surface of the second cylinder.

In accordance with a twentieth aspect of the present invention, the bicycle seatpost assembly according to the nineteenth aspect further comprises a restricting member radially protruding from the outer peripheral surface of the second cylinder. The first cylinder includes a restricting groove provided on the inner peripheral surface and extending in the telescopic direction. The restricting member is provided in the restricting groove to restrict a relative rotation between the first cylinder and the second cylinder. The second abutment is provided to the restricting member.

In accordance with a twenty-first aspect of the present invention, the bicycle seatpost assembly according to the twentieth aspect is configured so that the adjusting structure is configured to adjust a position of the first abutment relative to the first cylinder.

In accordance with a twenty-second aspect of the present invention, the bicycle seatpost assembly according to the twenty-first aspect is configured so that the adjusting structure includes a stopper attached to an end of the first cylinder to be contactable with the second abutment. The first abutment is provided to the stopper.

In accordance with a twenty-third aspect of the present invention, the bicycle seatpost assembly according to the twenty-second aspect is configured so that the adjusting structure is configured to adjust the position of the first abutment relative to the first cylinder via the stopper in the telescopic direction.

In accordance with a twenty-fourth aspect of the present invention, a bicycle seatpost assembly comprises a first cylinder, a second cylinder, a positioning structure, and an adjusting structure. The second cylinder is configured to be telescopically received in the first cylinder so as to be movable with respect to the first cylinder in a telescopic direction. The positioning structure is configured to relatively position the first cylinder and the second cylinder. The positioning structure includes a fluid cylinder and a support member. The fluid cylinder is connected to one of the first cylinder and the second cylinder. The support member is connected to the other of the first cylinder and the second cylinder. The support member is at least partly received in the fluid cylinder. The adjusting structure configure to adjust an initial relative position of the fluid cylinder and the support member.

In accordance with a twenty-fifth aspect of the present invention, the bicycle seatpost assembly according to the twenty-fourth aspect is configured so that the adjusting structure is configured to change a position of the support member relative to one of the first cylinder and the second cylinder. The adjusting structure is configured to change a position of the fluid cylinder relative to the other of the first cylinder and the second cylinder.

In accordance with a twenty-sixth aspect of the present invention, the bicycle seatpost assembly according to the twenty-fifth aspect is configured so that the support member is at least partly disposed in the fluid cylinder to provide a fluid passageway between the support member and the fluid cylinder. The positioning structure includes a seal member configured to block the fluid passageway in a state where a total length of the bicycle seatpost assembly is an intermediate length between a maximum overall length and a minimum overall length.

In accordance with a twenty-seventh aspect of the present invention, the bicycle seatpost assembly according to the twenty-sixth aspect is configured so that one of the first cylinder and the second cylinder includes an attachment end. The support member extends in the telescopic direction and is configured to be attached to the attachment end. The adjusting structure is configured to adjust a position of the support member relative to the attachment end in the telescopic direction.

In accordance with a twenty-eighth aspect of the present invention, the bicycle seatpost assembly according to the twenty-seventh aspect is configured so that the adjusting structure includes a securing member and at least one spacer. The securing member is configured to be secured to an end of the support member. The at least one spacer is configured to be detachably provided between the securing member and the attachment end to adjust a position of the support member relative to the attachment end.

In accordance with a twenty-ninth aspect of the present invention, the bicycle seatpost assembly according to the twenty-seventh aspect is configured so that the adjusting structure includes a lock member configured to lock the support member relative to the attachment end so that a position of the support member is adjustable relative to the attachment end.

In accordance with a thirtieth aspect of the present invention, the bicycle seatpost assembly according to the twenty-seventh aspect is configured so that the other of the first cylinder and the second cylinder includes an additional attachment end. The fluid cylinder is configured to be attached to the additional attachment end. The adjusting structure is configured to adjust a position of the fluid cylinder relative to the additional attachment end.

In accordance with a thirty-first aspect of the present invention, the bicycle seatpost assembly according to the thirtieth aspect is configured so that the adjusting structure includes a rack and a pinion gear. The rack includes teeth and secured to the fluid cylinder. The pinion gear is configured to engage with the teeth of the rack to position the fluid cylinder relative to the additional attachment end.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
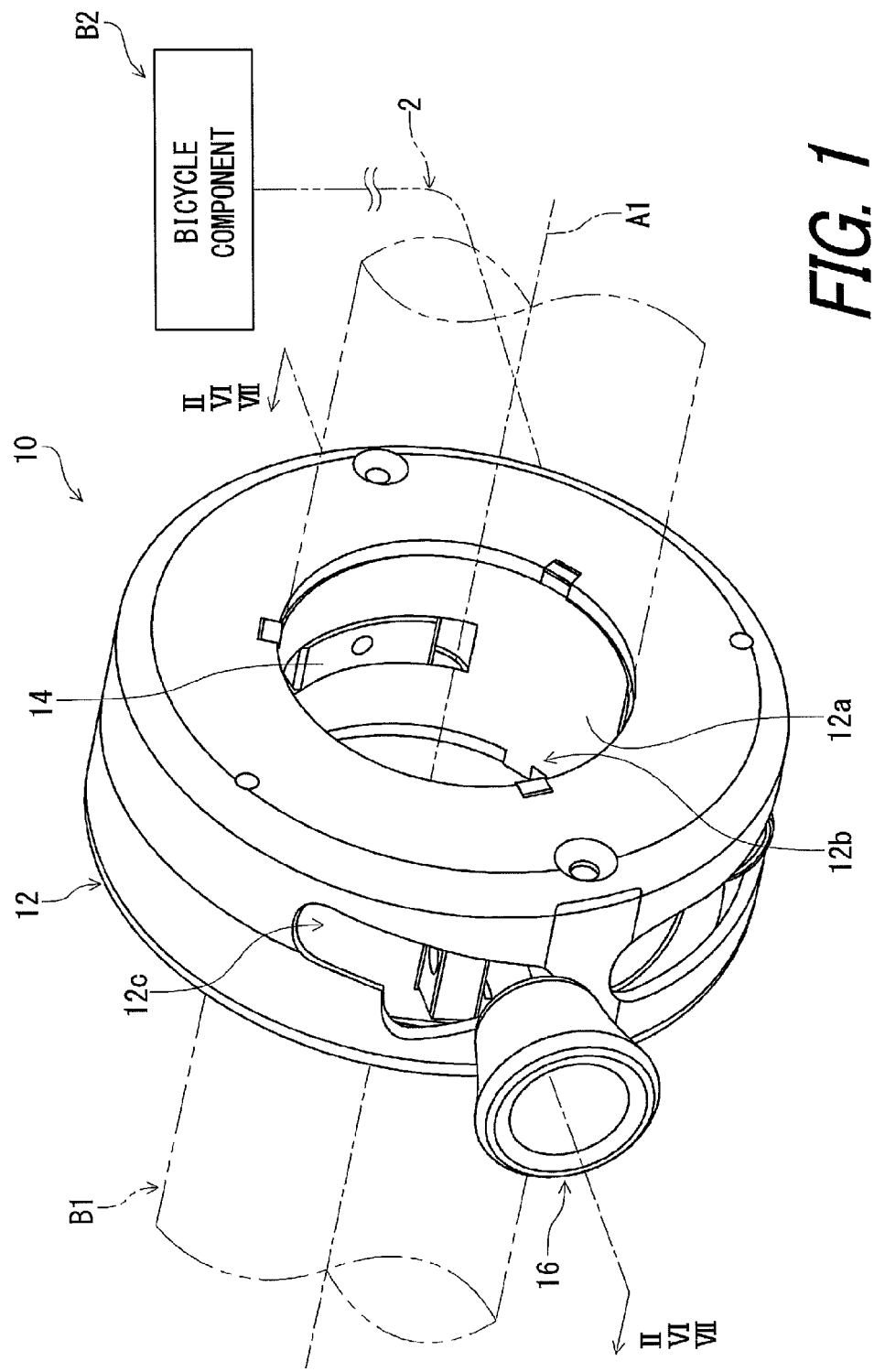
FIG. 1 is a perspective view of a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a bicycle part B1. Possible examples of the bicycle part B1 include a bicycle handlebar, a stem and a bicycle frame. The bicycle operating device 10 is configured to operate a bicycle component B2 configured to be operated via an operation cable 2. Possible examples of the bicycle component B2 include a seatpost assembly and a bicycle transmission. Since such bicycle components are well known in the bicycle field, they will not be described and/or illustrated in detail here for the sake of brevity. The bicycle operating device 10 is a right hand side control device operated by the rider's right hand. It will be apparent to those skilled in the bicycle field that the configuration of the bicycle operating device 10 can be adapted to a left hand side control device that is operated by the rider's left hand.

In the present application, the following directional terms "forward", "rearward", "left", "right", "upward" and "downward" as well as any other similar directional terms refer to those directions which are determined on the basis of the rider who sits on a bicycle seat (not shown) of a bicycle with facing a bicycle handlebar (not shown). Accordingly, these terms, as utilized to describe the bicycle operating device 10, should be interpreted relative to a bicycle equipped with the bicycle operating device 10 as used in an upright riding position on a horizontal surface.

As seen in FIG. 1, the bicycle operating device 10 comprises a base member 12. The base member 12 is configured to be mounted to the bicycle part B1. In the illustrated embodiment, the base member 12 has an annular shape and includes an inner peripheral surface 12a. The inner peripheral surface 12a defines a center opening 12b through which the bicycle part B1. In the illustrated embodiment, the bicycle part B1 has a longitudinal axis A1. The bicycle operating device 10 comprises a clamp member 14 configured to clamp the bicycle part B1 together with the inner peripheral surface 12a of the base member 12.

As seen in FIG. 1, the bicycle operating device 10 comprises an operated member 16. The operated member 16 is configured to be operated by a user to operate the bicycle component B2 via an operation cable 2. The base member 12 includes a guide opening 12c configured to define a movable area of the operated member 16 with respect to the base member 12. The operated member 16 extends through the guide opening 12c.

Figure 2:
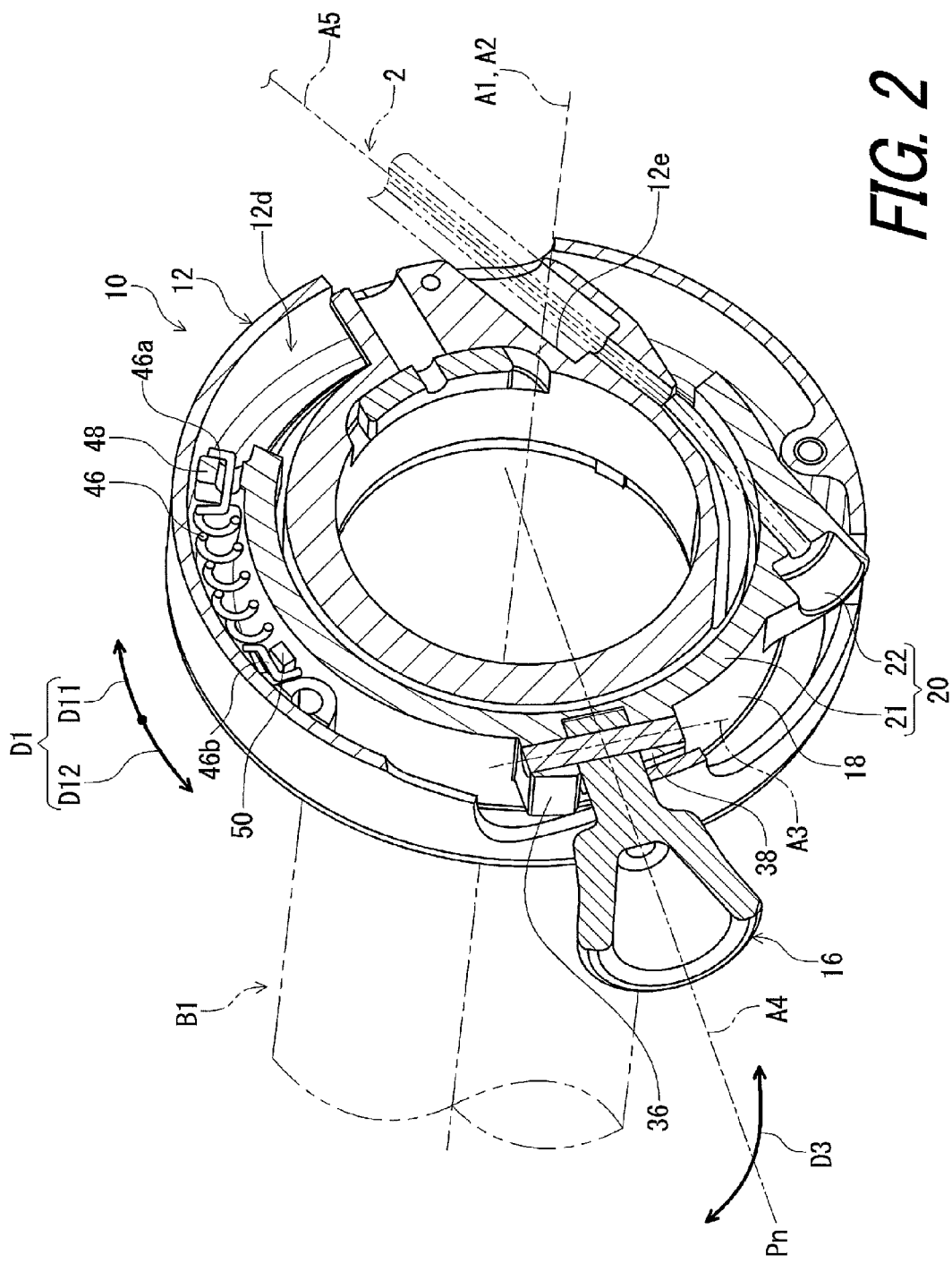
FIG. 2 is a cross-sectional view of the bicycle operating device taken along line II-II of FIG. 1.

As seen in FIG. 2, the bicycle operating device 10 further comprises a cable operating structure 18. The base member 12 includes an inner space 12d having an annular shape. The cable operating structure 18 is provided in the inner space 12d of the base member 12. The cable operating structure 18 is rotatable relative to the base member 12 in a rotational direction D1 about a rotation axis A2. For example, the rotation axis A2 is defined by a center axis of the inner peripheral surface 12a of the base member 12 and is substantially coaxial with the longitudinal axis A1 of the bicycle part B1.

As seen in FIG. 2, the operated member 16 is pivotally coupled to the cable operating structure 18 about a pivot axis A3. The operated member 16 extends along a center axis A4 intersecting with the pivot axis A3. In the illustrated embodiment, the center axis A4 of the operated member 16 is perpendicular to the pivot axis A3. The operated member 16 is rotatable together with the cable operating structure 18 relative to the base member 12 about the rotation axis A2. The pivot axis A3 is defined substantially along the rotational direction D1 of the cable operating structure 18. The pivot axis A3 can be defined to be perpendicular to a radial direction of the inner peripheral surface 12a of the base member 12. The constructions of the operated member 16 and the cable operating structure 18 are not limited to the illustrated embodiment. For example, the operated member 16 can be secured to the cable operating structure 18 if needed and/or desired. Furthermore, the operated member 16 can be slanted in a direction different from the rotational direction D1 together with the cable operating structure 18 with respect to the base member 12 if needed and/or desired.

As seen in FIG. 2, the cable operating structure 18 includes a cable supporting member 20. An end of the operation cable 2 is connected to the cable supporting member 20. More specifically, the cable supporting member 20 includes a cable supporting main-body 21 and a cable attachment portion 22. The cable attachment portion 22 is provided on the cable supporting main-body 21. An end of an inner cable 2a of the operation cable 2 is attached to the cable attachment portion 22. The base member 12 includes a cable guide hole 12e through which the operation cable 2 is to extend. The cable guide hole 12e defines a cable operation axis A5 as a center longitudinal axis thereof.

When the cable operating structure 18 rotates relative to the base member 12 in a first rotational direction D11 of the rotational direction D1, the operation cable 2 (i.e., the inner cable 2a) is pulled from an initial position. When the cable operating structure 18 rotates relative to the base member 12 in a second rotational direction D12 opposite to the first rotational direction D11, the operation cable 2 (i.e., the inner cable 2a) is returned toward the initial position.

Figure 3:
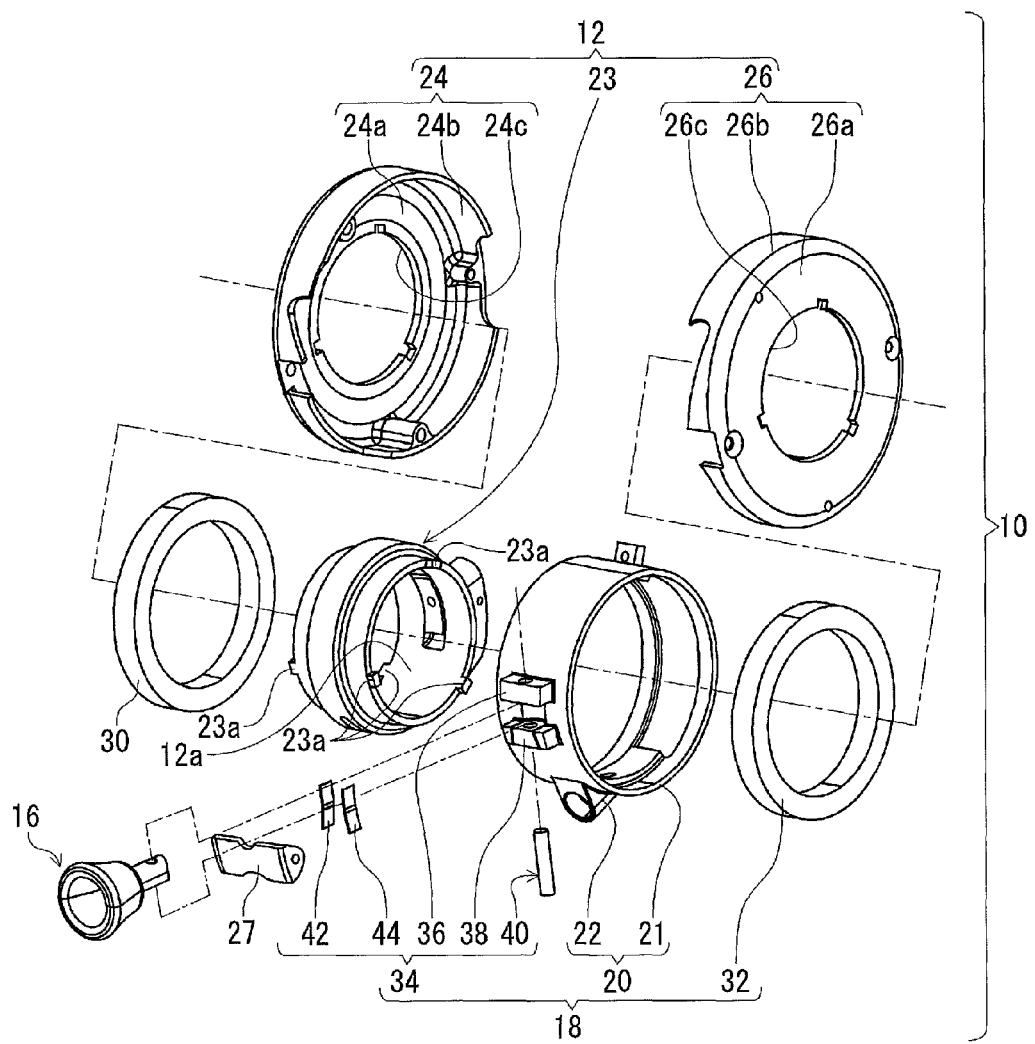
FIG. 3 is an exploded perspective view of the bicycle operating device illustrated in FIG. 1.

As seen in FIG. 3, the base member 12 includes a supporting portion 23 configured to rotatably support the cable supporting member 20 about the rotation axis A2. In the illustrated embodiment, the supporting portion 23 is configured to slidably contact the cable supporting member 20 to rotatably support the cable supporting member 20 about the rotation axis A2. The base member 12 further includes a first housing 24, a second housing 26 and a third housing 27. The second housing 26 is fastened to the first housing 24 by fasteners (not shown) such as a screw. The third housing 27 is fastened to the first housing 24 and the second housing 26 by fasteners (not shown) such as a screw. The first housing 24 has a first annular part 24a and a first cylindrical part 24b. The first annular part 24a has a first opening 24c through which the bicycle part B1 (FIG. 1) is to extend. The first cylindrical part 24b protrudes from an outer periphery of the first annular part 24a. The second housing 26 has a second annular part 26a and a second cylindrical part 26b. The second annular part 26a has a second opening 26c through which the bicycle part B1 is to extend. The second cylindrical part 26b protrudes from an outer periphery of the second annular part 26a. The first cylindrical part 24b, the second cylindrical part 26b and the third housing 27 are assembled to provide the guide opening 12c (FIG. 1).

The supporting portion 23 is provided between the first housing 24 and the second housing 26. The supporting portion 23 is secured to the first annular part 24a and the second annular part 26a via protrusions 23a. The supporting portion 23 defines the center opening 12b of the base member 12. The supporting portion 23, the first housing 24, the second housing 26 and the third housing 27 define the inner space 12d (FIG. 2) of the base member 12.

The cable operating structure 18 includes a first sliding part 30 and a second sliding part 32. The cable supporting main-body 21 has a cylindrical shape and is disposed radially outward of the supporting portion 23. The first sliding part 30 is fitted in the cable supporting member 20. The second sliding part 32 is fitted in the cable supporting member 20. The first sliding part 30 is slidable with an outer peripheral surface of the supporting portion 23. The second sliding part 32 is slidable with an outer peripheral surface of the supporting portion 23. The construction of the cable operating structure 18 is not limited to the illustrated embodiment. For example, at least one of the first sliding part 30 and the second sliding part 32 can be slidably provided in the cable supporting main-body 21 if needed and/or desired. Furthermore, at least one of the first sliding part 30 and the second sliding part 32 can be integrally provided with the cable supporting main-body 21 as a single unitary member if needed and/or desired.

As seen in FIG. 3, the cable operating structure 18 further includes a lever coupling structure 34 configured to pivotally couple the operated member 16 to the cable supporting member 20. The lever coupling structure 34 is provided on an outer peripheral surface of the cable supporting member 20. The lever coupling structure 34 includes a first lever supporting part 36 and a second lever supporting part 38. Each of the first lever supporting part 36 and the second lever supporting part 38 radially outwardly protrudes from the cable supporting main-body 21. The second lever supporting part 38 is spaced apart from the first lever supporting part 36 in the rotational direction D1. The operated member 16 is partially provided between the first lever supporting part 36 and the second lever supporting part 38 (FIG. 2). The lever coupling structure 34 further includes a pivot pin 40 configured to pivotally couple the operated member 16 to the first lever supporting part 36 and the second lever supporting part 38. The pivot pin 40 is attached to the first lever supporting part 36 and the second lever supporting part 38.

Figure 4:
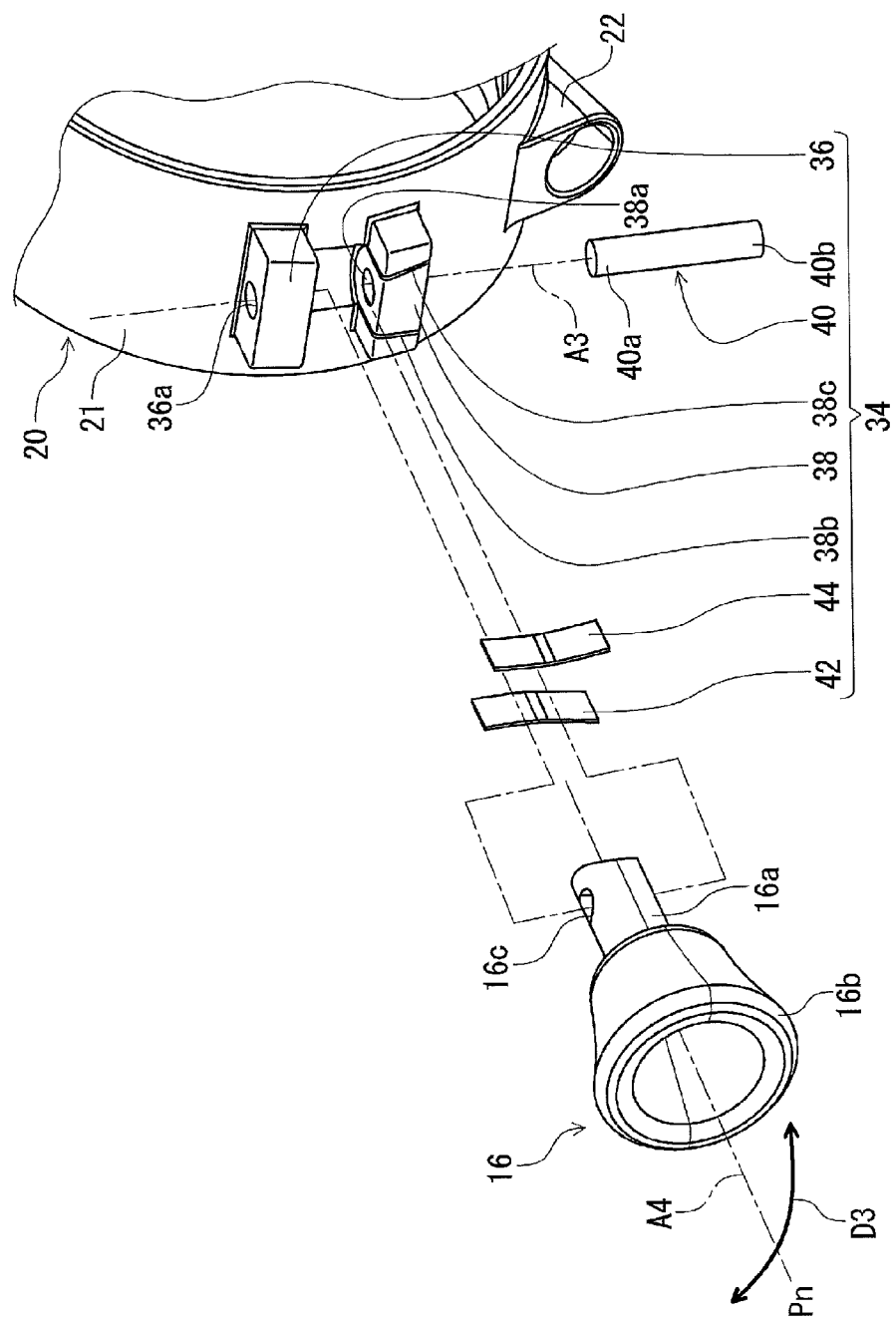
FIG. 4 is a partial exploded perspective view of the bicycle operating device illustrated in FIG. 1.

As seen in FIG. 4, the pivot pin 40 includes a first end 40a and a second end 40b. The first lever supporting part 36 includes a first supporting hole 36a. The second lever supporting part 38 includes a second supporting hole 38a. The first end 40a of the pivot pin 40 is fitted in the first supporting hole 36a. The second end 40b of the pivot pin 40 is fitted in the second supporting hole 38a.

The operated member 16 includes a shaft portion 16a and a head portion 16b provided at an end of the shaft portion 16a. The shaft portion 16a includes a through-hole 16c through which the pivot pin 40 extends. The pivot pin 40 defines the pivot axis A3 of the operated member 16. The head portion 16b has an outer maximum diameter larger than an outer maximum diameter of the shaft portion 16a. The operated member 16 is pivotable relative to the cable supporting member 20 around the pivot axis A3.

As seen in FIG. 4, the lever coupling structure 34 further includes a first biasing element 42 and a second biasing element 44. The first biasing element 42 and the second biasing element 44 are secured to the second lever supporting part 38. In the illustrated embodiment, each of the first biasing element 42 and the second biasing element 44 is a leaf spring, for example. The structures of the first biasing element 42 and the second biasing element 44 are not limited to the illustrated embodiment. For example, the first biasing element 42 and the second biasing element 44 can be other biasing elements such as a coil spring if needed and/or desired. Furthermore, at least one of the first biasing element 42 and the second biasing element 44 can be omitted if needed and/or desired.

The second lever supporting part 38 includes a first slit 38b and a second slit 38c. The first biasing element 42 is partially fitted in the first slit 38b. The second biasing element 44 is partially fitted in the second slit 38c. The shaft portion 16a of the operated member 16 is provided between the first biasing element 42 and the second biasing element 44. The first biasing element 42 and the second biasing element 44 are configured to elastically position the operated member 16 at a neutral position Pn. As seen in FIG. 2, in a state where the operated member 16 is positioned at the neutral position Pn, the center axis A4 of the operated member 16 is substantially perpendicular to the rotation axis A2.

Figure 5:
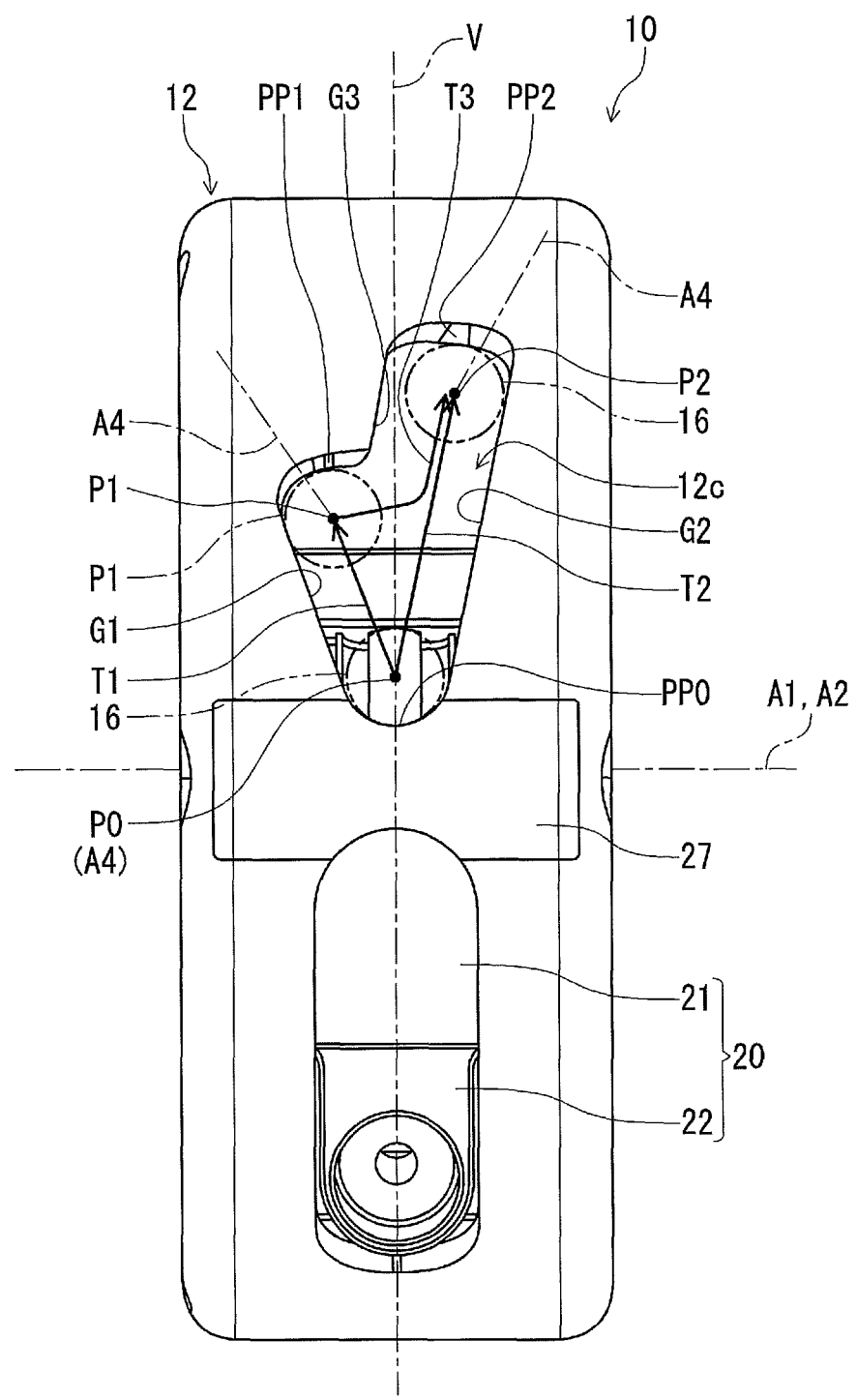
FIG. 5 is an elevational view of the bicycle operating device illustrated in FIG. 1.

As seen in FIG. 5, the operated member 16 is movable within the guide opening 12c of the base member 12. The operated member 16 is omitted from FIG. 5 for convenience of explanation. The operated member 16 is configured to be movable relative to the base member 12 from a rest position P0 to a first operated position P1 along a first path T1. The operated member 16 is configured to be movable relative to the base member 12 from the rest position P0 to a second operated position P2 along a second path T2. In FIG. 5, each of the rest position P0, the first operated position P1 and the second operated position P2 is defined based on the center axis A4 of the operated member 16.

More specifically, the first path T1 is defined so as to at least extend from the center axis A4 of when the operated member 16 is disposed at the rest position P0, to the center axis A4 of when the operated member 16 is disposed at the first operated position P1. The second path T2 is defined so as to at least extend from the center axis A4 of when the operated member 16 is disposed at the rest position P0, to the center axis A4 of when the operated member 16 is disposed at the second operated position P2. The second path T2 is at least partially different from the first path T1. In the illustrated embodiment, the second path T2 is entirely different from the first path T1. The first path T1 is defined as a path having a minimum travel between the rest position P0 and the first operated position P1, for example. The second path T2 is defined as a path having a minimum travel between the rest position P0 and the second operated position P2, for example. The rest position P0 can be defined as a point at which the first path T1 and the second path T2 intersects with each other. In the illustrated embodiment, the second path T2 is defined on a plane which is not parallel to a plane on which the first path T1 is defined.

In the present application, the term "rest position" as used herein refers to a position at which a movable part (e.g., the operated member 16) remains stationary in a state where the movable part is not operated by a user (e.g., a rider). The term "operated position" as used herein refers to a position at which the movable part has been operated by a user (e.g., a rider) to perform the operation of the bicycle component B2.

As seen in FIG. 5, the rest position P0 is provided on a virtual plane V perpendicular to the rotation axis A2. At least one of the first operated position P1 and the second operated position P2 is spaced apart from the virtual plane V. In the illustrated embodiment, each of the first operated position P1 and the second operated position P2 is spaced apart from the virtual plane V. The first operated position P1 is disposed on an opposite side of the second operated position P2 with respect to the virtual plane V. However, one of the first operated position P1 and the second operated position P2 can be disposed on the virtual plane V if needed and/or desired. Furthermore, both of the first operated position P1 and the second operated position P2 can be disposed on the same side with respect to the virtual plane V if needed and/or desired.

As seen in FIG. 5, the base member 12 includes a rest positioning portion PP0, a first positioning portion PP1 and a second positioning portion PP2. The rest positioning portion PP0 is configured to be contactable with the operated member 16 to position the operated member 16 at the rest position P0 relative to the base member 12. The first positioning portion PP1 is configured to be contactable with the operated member 16 to position the operated member 16 at the first operated position P1 relative to the base member 12. The second positioning portion PP2 is configured to be contactable with the operated member 16 to position the operated member 16 at the second operated position P2 relative to the base member 12.

The base member 12 includes a first guide portion G1 and a second guide portion G2. The first guide portion G1 is configured to guide the operated member 16 between the rest positioning portion PP0 and the first positioning portion PP1. The second guide portion G2 is configured to guide the operated member 16 between the rest positioning portion PP0 and the second positioning portion PP2. The first guide portion G1 is configured to allow the operated member 16 to be moved from the first operated position P1 to the second operated position P2 without via the rest position P0. More specifically, the operated member 16 is configured to be movable relative to the base member 12 from the first operated position P1 to the second operated position P2 along a third path T3. The third path T3 is partially the same as the second path T2.

The second guide portion G2 is on an opposite side of the first guide portion G1 in the guide opening 12c. The operated member 16 is movable relative to the base member 12 between the first guide portion G1 and the second guide portion G2. The base member 12 further includes a third guide portion G3 configured to guide the operated member 16 between the first operated position P1 and the second operated position P2. The third guide portion G3 is configured to allow the operated member 16 to be mover from the second operated position P2 to the first operated position P1 without via the rest position P0. The rest positioning portion PP0, the first positioning portion PP1, the second positioning portion PP2, the first guide portion G1, the second guide portion G2 and the third guide portion G3 define the guide opening 12c of the base member 12.

Figure 6:
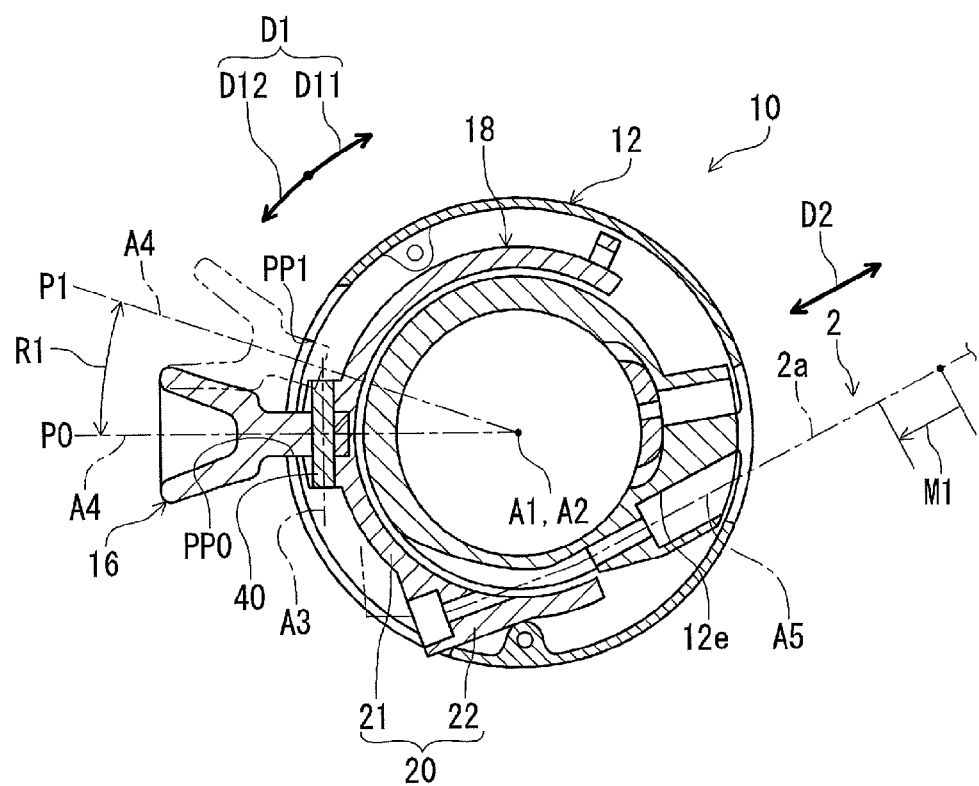
FIG. 6 is a schematic cross-sectional view of the bicycle operating device taken along line VI-VI of FIG. 1 (a first operated position)

As seen in FIGS. 5 and 6, the operated member 16 is configured to be movable relative to the base member 12 from the rest position P0 to the first operated position P1 along the first path T1 such that the operation cable 2 is pulled relative to the base member 12 by a first amount of movement M1 in a cable operating direction D2. The cable operating structure 18 is configured to pull the operation cable 2 relative to the base member 12 in the cable operating direction D2 by the first amount of movement M1 when the operated member 16 is moved from the rest position P0 to the first operated position P1 along the first path T1. The cable operating direction D2 is defined as a direction parallel to the cable operation axis A5 of the cable guide hole 12e, for example.

Figure 7:
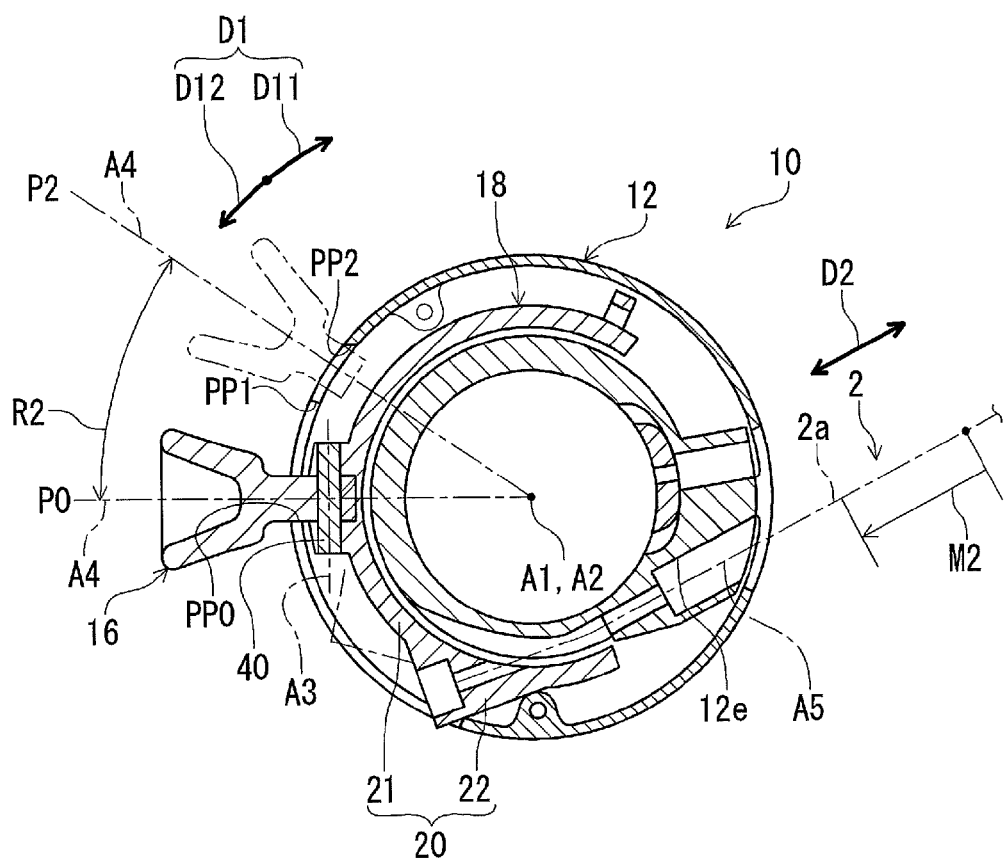
FIG. 7 is a schematic cross-sectional view of the bicycle operating device taken along line VII-VII of FIG. 1 (a second operated position)

As seen in FIGS. 5 and 7, the operated member 16 is configured to be movable relative to the base member 12 from the rest position P0 to the second operated position P2 along the second path T2 such that the operation cable 2 is pulled relative to the base member 12 by a second amount of movement M2 in the cable operating direction D2. The cable operating structure 18 is configured to pull the operation cable 2 relative to the base member 12 in the cable operating direction D2 by the second amount of movement M2 when the operated member 16 is moved from the rest position P0 to the second operated position P2 along the second path T2.

As seen in FIGS. 6 and 7, the second amount of movement M2 is different from the first amount of movement M1. In the illustrated embodiment, the second amount of movement M2 is greater than the first amount of movement M1. However, the second amount of movement M2 can be less than the first amount of movement M1 if needed and/or desired.

As seen in FIG. 6, the first positioning portion PP1 and the rest positioning portion PP0 are configured to define a first rotation angle R1 of the cable operating structure 18 relative to the base member 12 about the rotation axis A2. The first positioning portion PP1 and the rest positioning portion PP0 are configured to define the first amount of movement M1 of the operation cable 2 in the cable operating direction D2.

As seen in FIG. 7, the second positioning portion PP2 and the rest positioning portion PP0 are configured to define a second rotation angle R2 of the cable operating structure 18 relative to the base member 12 about the rotation axis A2. The second rotation angle R2 is greater than the first rotation angle R1. The second positioning portion PP2 and the rest positioning portion PP0 are configured to define the second amount of movement M2 of the operation cable 2 in the cable operating direction D2.

As seen in FIGS. 5 and 6, the cable operating structure 18 is configured to be moved by the operated member 16 in a first direction when the operated member 16 is moved from the rest position P0 to the first operated position P1. In the illustrated embodiment, the first direction is defined as the first rotational direction D11 of the rotational direction D1. The first direction can be defined as directions other than the first rotational direction D11. The first rotational direction D11 is hereinafter referred to as the first direction D11. The cable supporting member 20 is configured to be rotatable relative to the base member 12 about the rotation axis A2 in the first direction D11. In other words, the cable supporting member 20 is configured to be rotatable relative to the base member 12 around the longitudinal axis A1 of the bicycle part B1.

As seen in FIGS. 5 and 6, the cable operating structure 18 is configured to be moved by the operated member 16 in the first direction D11 when the operated member 16 is moved from the rest position P0 to the second operated position P2. The cable supporting member 20 is configured to be movable relative to the base member 12 in the first direction D11 to pull the operation cable 2 in the cable operating direction D2.

Figure 8:
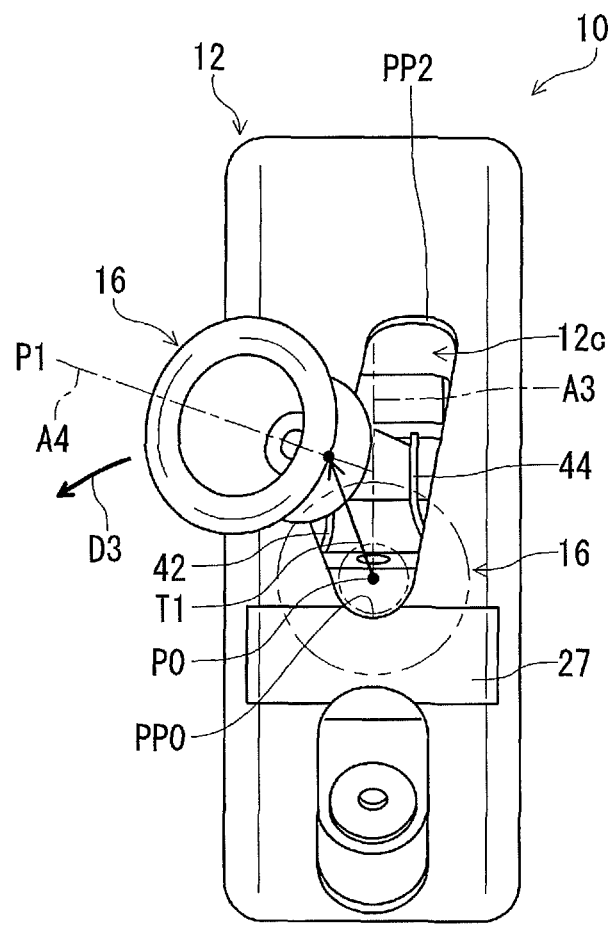
FIG. 8 is an elevational view of the bicycle operating device illustrated in FIG. 1 (the first operated position)
Figure 9:
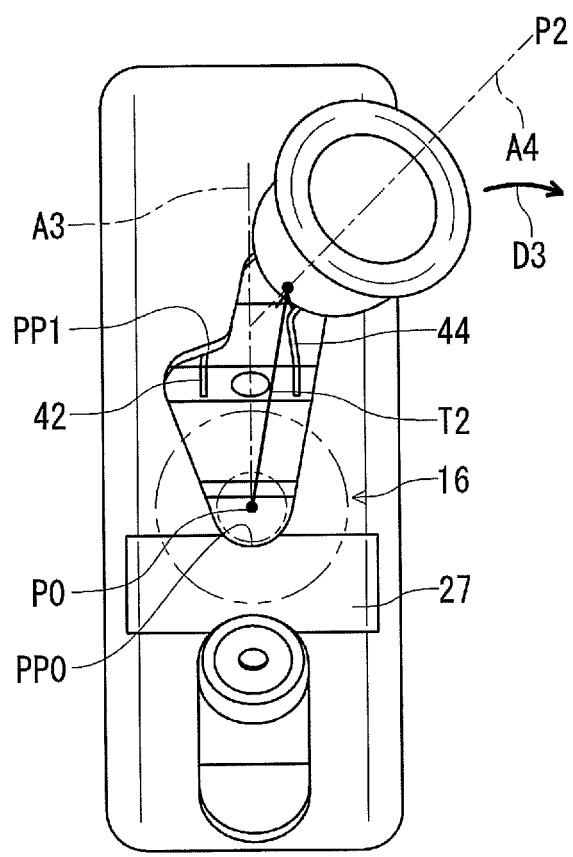
FIG. 9 is an elevational view of the bicycle operating device illustrated in FIG. 1 (the second operated position)

As seen in FIGS. 8 and 9, the operated member 16 is configured to be slanted by a user in a second direction D3 different from the first direction D11 when the operated member 16 is moved from the rest position P0 to at least one of the first operated position P1 and the second operated position P2. In the illustrated embodiment, the operated member 16 is configured to be slanted by a user in the second direction D3 when the operated member 16 is moved from the rest position P0 to each of the first operated position P1 and the second operated position P2.

As seen in FIGS. 2, 8 and 9, the second direction D3 is defined as a pivot direction in which the operated member 16 is pivotable relative to the cable operating structure 18 around the pivot axis A3. The operated member 16 is pivotally coupled to the cable supporting member 20 about the pivot axis A3 such that the operated member 16 is configured to be slanted in the second direction D3.

Returning to FIG. 2, the bicycle operating device 10 further comprises a first biasing member 46 configured to bias the cable supporting member 20 such that the operated member 16 is disposed at the rest position P0. In the illustrated embodiment, the first biasing member 46 is a tension coil spring. However, the first biasing member 46 can be a biasing member other than the tension coil spring if needed and/or desired.

The cable operating structure 18 includes a first spring support 48 radially outwardly protruding from the cable supporting main-body 21. The base member 12 includes a second spring support 50 spaced apart from the first spring support 48 in the rotational direction D1. A first end portion 46a of the first biasing member 46 is hooked to the first spring support 48. A second end portion 46b of the first biasing member 46 is hooked to the second spring support 50.

As seen in FIG. 2, the first biasing member 46 is configured to bias the cable operating structure 18 to rotate relative to the base member 12 in the second rotational direction D12. As seen in FIG. 5, the operated member 16 is pressed against the rest positioning portion PP0 in a state where the cable operating structure 18 is biased to rotate relative to the base member 12 in the second rotational direction D12. This causes the operated member 16 to be positioned at the rest position P0. However, the first biasing member 46 can be omitted from the bicycle operating device 10 if needed and/or desired. The first biasing member 46 can be provided in a bicycle component operated using the bicycle operating device 10 if needed and/or desired.

The bicycle operating device 10 can be used to operate several bicycle components. One example of the bicycle component B2 will be described below referring to FIGS. 10 to 17.

Figure 10:
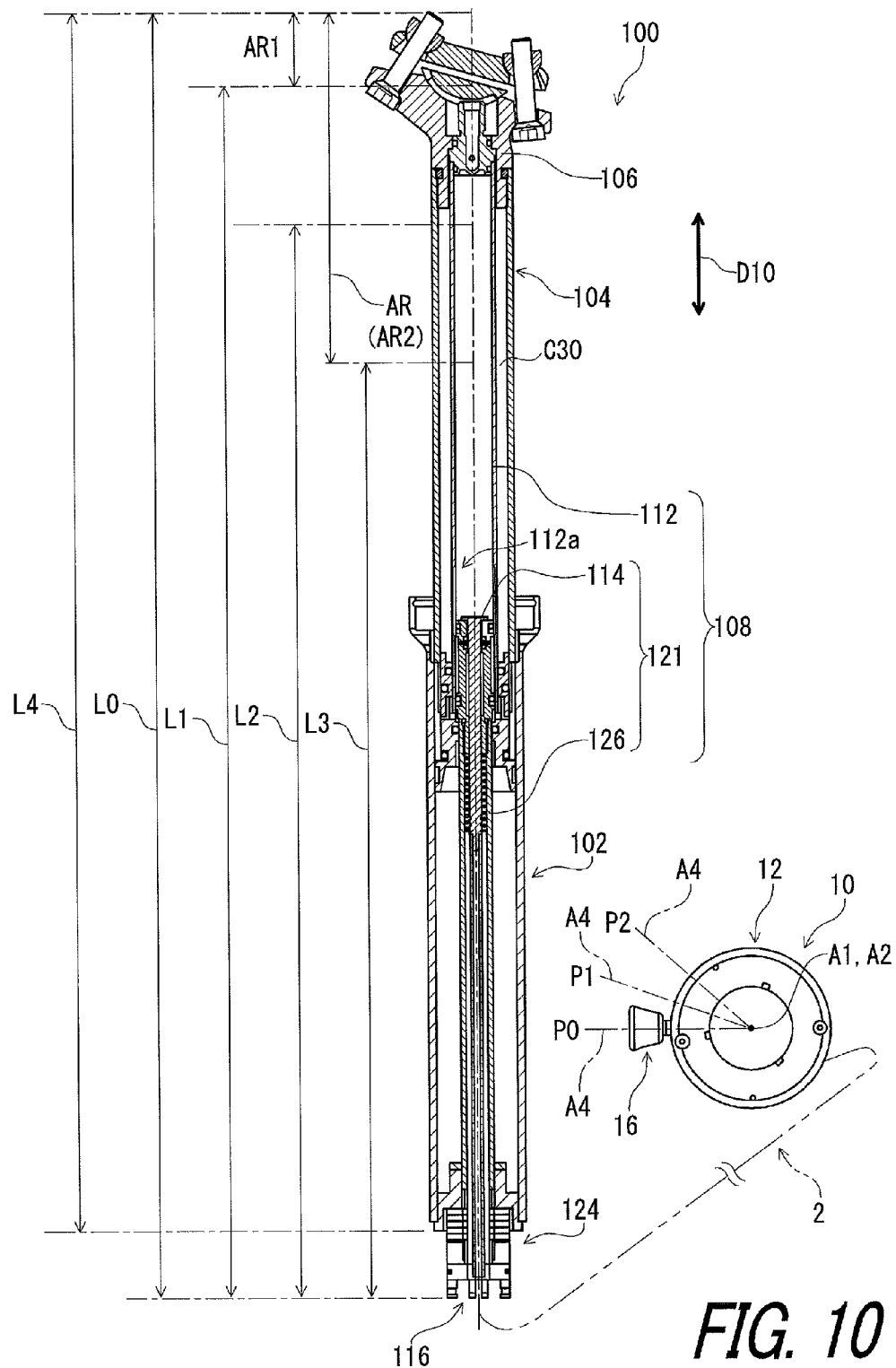
FIG. 10 is a cross-sectional view of a bicycle seatpost assembly in accordance with the first embodiment.

As seen in FIG. 10, the bicycle operating device 10 can be used to operate a bicycle seatpost assembly 100 via the operation cable 2, for example. The operation cable 2 is configured to be connected to the bicycle seatpost assembly 100 to adjust an overall length of the bicycle seatpost assembly 100. The bicycle seatpost assembly 100 in accordance with the first embodiment has a maximum overall length L0 and a minimum overall length L3. The overall length of the bicycle seatpost assembly 100 is adjustable within an adjustable range AR defined as a difference between the maximum overall length L0 and the minimum overall length L3. The bicycle seatpost assembly 100 has a first overall length L1 and a second overall length L2. The first overall length L1 and the second overall length L2 are defined between the maximum overall length L0 and the minimum overall length L3. The first and second overall lengths L1 and L2 are different from each other.

For example, the overall length of the bicycle seatpost assembly 100 is adjustable to the first overall length L1 in a state where the operated member 16 is positioned at the first operated position P1 such that the operation cable 2 is pulled relative to the base member 12 by the first amount of movement M1 (FIG. 6). The overall length of the bicycle seatpost assembly 100 is adjustable to the second overall length L2 in a state where the operated member 16 is positioned at the second operated position P2 such that the operation cable 2 is pulled relative to the base member 12 by the second amount of movement M2 (FIG. 7).

As seen in FIG. 10, the bicycle seatpost assembly 100 comprises a first cylinder 102 and a second cylinder 104. The first cylinder 102 is detachably attached to a seat tube (not shown), for example. However, the second cylinder 104 can be detachably attached to the seat tube if needed and/or desired. The second cylinder 104 is configured to be telescopically received in the first cylinder 102 so as to be movable with respect to the first cylinder 102 in a telescopic direction D10. The first cylinder 102 and the second cylinder 104 are configured to be movable relative to each other in the telescopic direction D10. The second cylinder 104 includes a seat attachment portion 106 to which a bicycle seat (not shown) is to be attached.

In the illustrated embodiment, the bicycle seatpost assembly 100 has a locked state, a first adjustable state and a second adjustable state. The bicycle seatpost assembly 100 has a structure configured to switch a state of the bicycle seatpost assembly 100 among the locked state, the first adjustable state and the second adjustable state using the bicycle operating device 10.

For example, in the locked state, the overall length of the bicycle seatpost assembly 100 is maintained at an adjusted overall length. In the locked state, the first cylinder 102 and the second cylinder 104 are fixedly positioned relative to each other in the telescopic direction D10.

In the first adjustable state, the overall length of the bicycle seatpost assembly 100 is adjustable to the first overall length L1 by just operating the operated member 16 of the bicycle operating device 10 to the first operated position P1. More specifically, in the first adjustable state, the second cylinder 104 stops relative to the first cylinder 102 at a position corresponding to the first overall length L1 when the second cylinder 104 downwardly moves relative to the first cylinder 102 from a position corresponding to the maximum overall length L0. In the first adjustable state, the first cylinder 102 and the second cylinder 104 are telescopically movable relative to each other between the maximum overall length L0 and the first overall length L1 in the telescopic direction D10.

Furthermore, in the first adjustable state, the overall length of the bicycle seatpost assembly 100 is continuously adjustable between the maximum overall length L0 and the first overall length L1 by operating the operated member 16 of the bicycle operating device 10 to the first operated position P1. In the second adjustable state, the first cylinder 102 and the second cylinder 104 are telescopically movable relative to each other between the maximum overall length L0 and the minimum overall length L3 in the telescopic direction D10. Namely, in the first adjustable state, a positional relationship between the first cylinder 102 and the second cylinder 104 is continuously adjustable within a first adjustable position range AR1. The first adjustable position range AR1 is defined between a first maximum overall length (the maximum overall length L0) and a first minimum overall length (first overall length L1) of the bicycle seatpost assembly 100.

In the second adjustable state, the overall length of the bicycle seatpost assembly 100 is continuously adjustable within the adjustable range AR by operating the operated member 16 to the second operated position P2. Namely, in the second adjustable state, the positional relationship between the first cylinder 102 and the second cylinder 104 is continuously adjustable within a second adjustable position range AR2 (the adjustable range AR) different from the first adjustable position range AR1. The second adjustable position range AR2 is defined between a second maximum overall length (the maximum overall length L0) and a second minimum overall length (the minimum overall length L3) of the bicycle seatpost assembly 100. In the illustrated embodiment, the second overall length L2 shows possible overall lengths within the adjustable range AR while the first overall length L1 is a predetermined overall length.

As seen in FIG. 10, the first adjustable position range AR1 and the second adjustable position range AR2 are different from each other. More specifically, the first adjustable position range AR1 at least partially overlaps with the second adjustable position range AR2. In the illustrated embodiment, the first adjustable position range AR1 entirely overlaps with the second adjustable position range AR2 and is included in the second adjustable position range AR2. The second adjustable position range AR2 partially overlaps with the first adjustable position range AR1.

The first adjustable position range AR1 has a total length different from a total length of the second adjustable position range AR2. In the illustrated embodiment, the total length of the first adjustable position range AR1 is shorter than the total length of the second adjustable position range AR2. The first minimum overall length (first overall length L1) is different from the second minimum overall length (the minimum overall length L3). On the other hand, the first maximum overall length (the maximum overall length L0) is equal to the second maximum overall length (the maximum overall length L0). In the illustrated embodiment, the first minimum overall length (first overall length L1) is longer than the second minimum overall length (the minimum overall length L3).

As seen in FIG. 10, the bicycle seatpost assembly 100 comprises a positioning structure 108. The positioning structure 108 is configured to relatively position the first cylinder 102 and the second cylinder 104. The positioning structure 108 is configured to switch a state of the bicycle seatpost assembly 100 among the locked state, the first adjustable state and the second adjustable state.

The positioning structure 108 is configured to switch the state of the bicycle seatpost assembly 100 among the first adjustable state and the second adjustable state in response to an operation of the bicycle operating device 10 (FIG. 5). The positioning structure 108 is configured to switch the state of the bicycle seatpost assembly 100 to the first adjustable state in response to a first operation of the bicycle operating device 10. The positioning structure 108 is configured to switch the state of the bicycle seatpost assembly 100 to the second adjustable state in response to a second operation of the bicycle operating device 10.

In the illustrated embodiment, as seen in FIG. 5, the first operation of the bicycle operating device 10 is an operation in which the operated member 16 is moved relative to the base member 12 from the rest position P0 to the first operated position P1 along the first path T1. The second operation of the bicycle operating device 10 is an operation in which the operated member 16 is moved relative to the base member 12 from the rest position P0 to the second operated position P2 along the second path T2.

In the bicycle operating device 10, at least one of a movement amount and a movement direction of the first operation is different from at least one of a movement amount and a movement direction of the second operation. In the illustrated embodiment, as seen in FIG. 5, the movement amount of the first operation is different from the movement amount of the second operation in the bicycle operating device 10. Furthermore, the movement direction of the first operation is different from the movement direction of the second operation in the bicycle operating device 10. As seen in FIG. 10, the first operation of the bicycle operating device 10 is transmitted from the bicycle operating device 10 to the bicycle seatpost assembly 100 via the operation cable 2. The second operation of the bicycle operating device 10 is transmitted from the bicycle operating device 10 to the bicycle seatpost assembly 100 via the operation cable 2.

As seen in FIG. 5, the movement amount and the movement direction of the first operation (e.g., the first path T1) are different from the movement amount and the movement direction of the second operation (e.g., the second path T2) in the bicycle operating device 10, respectively. However, one of the movement amount and the movement direction of the first operation can be different from that of the second operation in the bicycle operating device 10. In a case where the movement direction of the first operation is different from the movement direction of the second operation, the movement directions of the first operation and the second operation can be defined on the same virtual plane and can be defined on the same virtual line so as to be opposite to each other.

As seen in FIG. 10, the positioning structure 108 includes a support member 110 and a fluid cylinder 112. The fluid cylinder is connected to one of the first cylinder and the second cylinder. The support member is connected to the other of the first cylinder and the second cylinder. The support member is at least partly received in the fluid cylinder. In the illustrated embodiment, the fluid cylinder is connected to the second cylinder. The support member is partly received in the fluid cylinder.

The support member 110 is configured to be telescopically movable relative to the fluid cylinder 112. The support member 110 and the fluid cylinder 112 extend in the telescopic direction D10. The support member 110 is provided in the first cylinder 102 and is integrally movable with the first cylinder 102 relative to the second cylinder 104. The fluid cylinder 112 is provided in the second cylinder 104 and is integrally movable with the second cylinder 104 relative to the first cylinder 102. However, the support member 110 can be provided in the second cylinder 104, and the fluid cylinder 112 can be provided in the first cylinder 102 if needed and/or desired.

Figure 11:
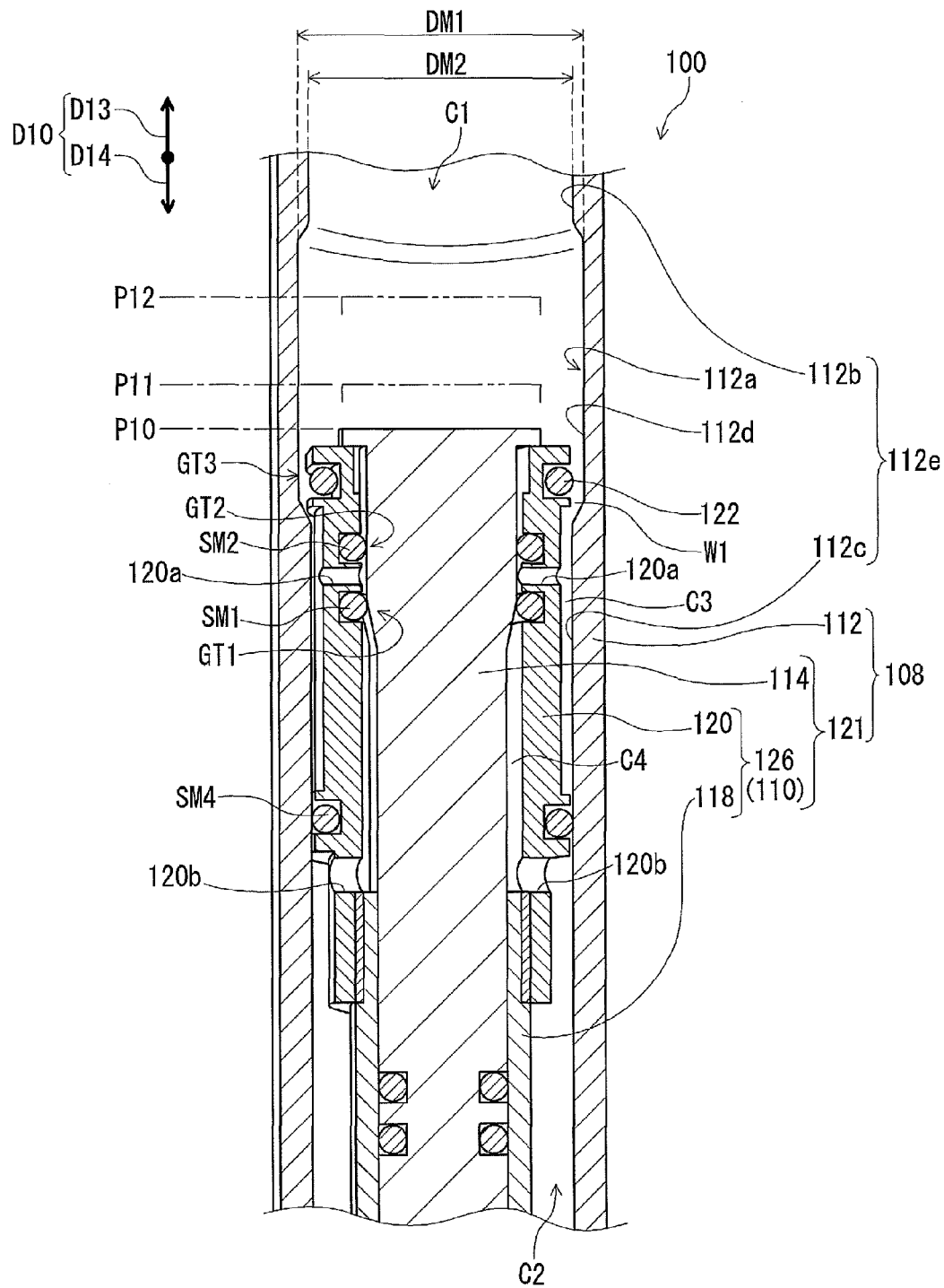
FIG. 11 is a partial cross-sectional view of the bicycle seatpost assembly illustrated in FIG. 10 (a closed position)

As seen in FIG. 11, the positioning structure 108 includes a movable member 114. The movable member 114 is configured to be movable relative to the support member 110. As seen in FIG. 10, the bicycle seatpost assembly 100 further includes a valve operating structure 116 attached to a lower end of the first cylinder 102. The valve operating structure 116 is operatively connected to the bicycle operating device 10 via the operation cable 2. The movable member 114 is upwardly moved relative to the support member 110 via the valve operating structure 116. In the illustrated embodiment, the movable member 114 is upwardly moved relative to the support member 110 via the valve operating structure 116 in response to the first operation and the second operation of the bicycle operating device 10 (FIG. 10).

As seen in FIG. 11, the support member 110 includes an inner tube 118 and a valve receiving member 120. The valve receiving member 120 is secured to an upper end of the inner tube 118 and is slidably provided in the fluid cylinder 112. The positioning structure 108 is configured to change a position of the movable member 114 relative to the support member 110 in response to an operation of the bicycle operating device 10 (FIG. 10).

As seen in FIG. 11, the positioning structure 108 includes a first chamber C1 and a second chamber C2. The first chamber C1 is defined by the support member 110 (the valve receiving member 120), the fluid cylinder 112 and the movable member 114. The second chamber C2 is defined by the support member 110 and the fluid cylinder 112. Each of the first chamber C1 and the second chamber C2 is filled with a substantially incompressible fluid (e.g., oil), for example.

Figure 13:
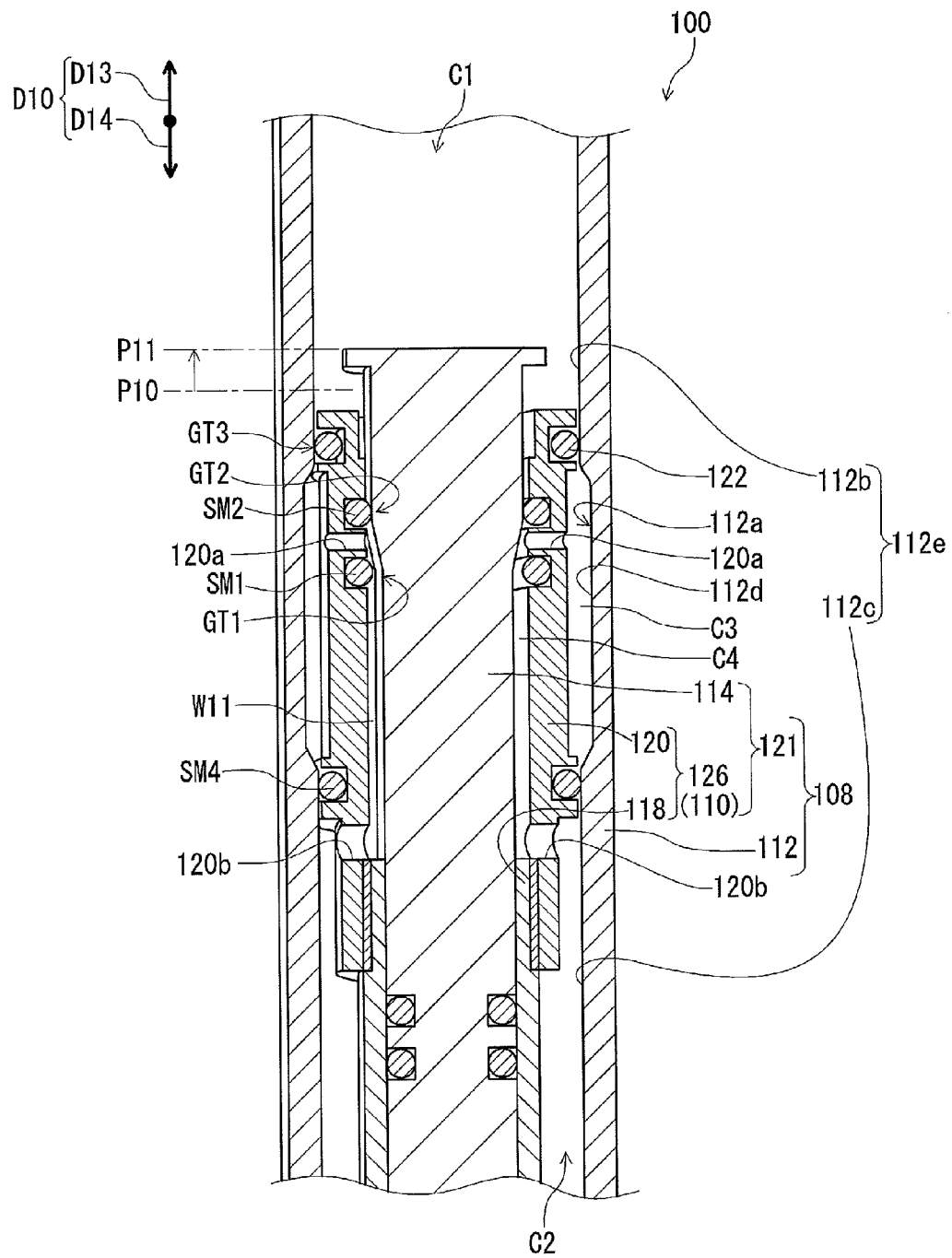
FIG. 13 is a partial cross-sectional view of the bicycle seatpost assembly illustrated in FIG. 10 (the first open position)
Figure 14:
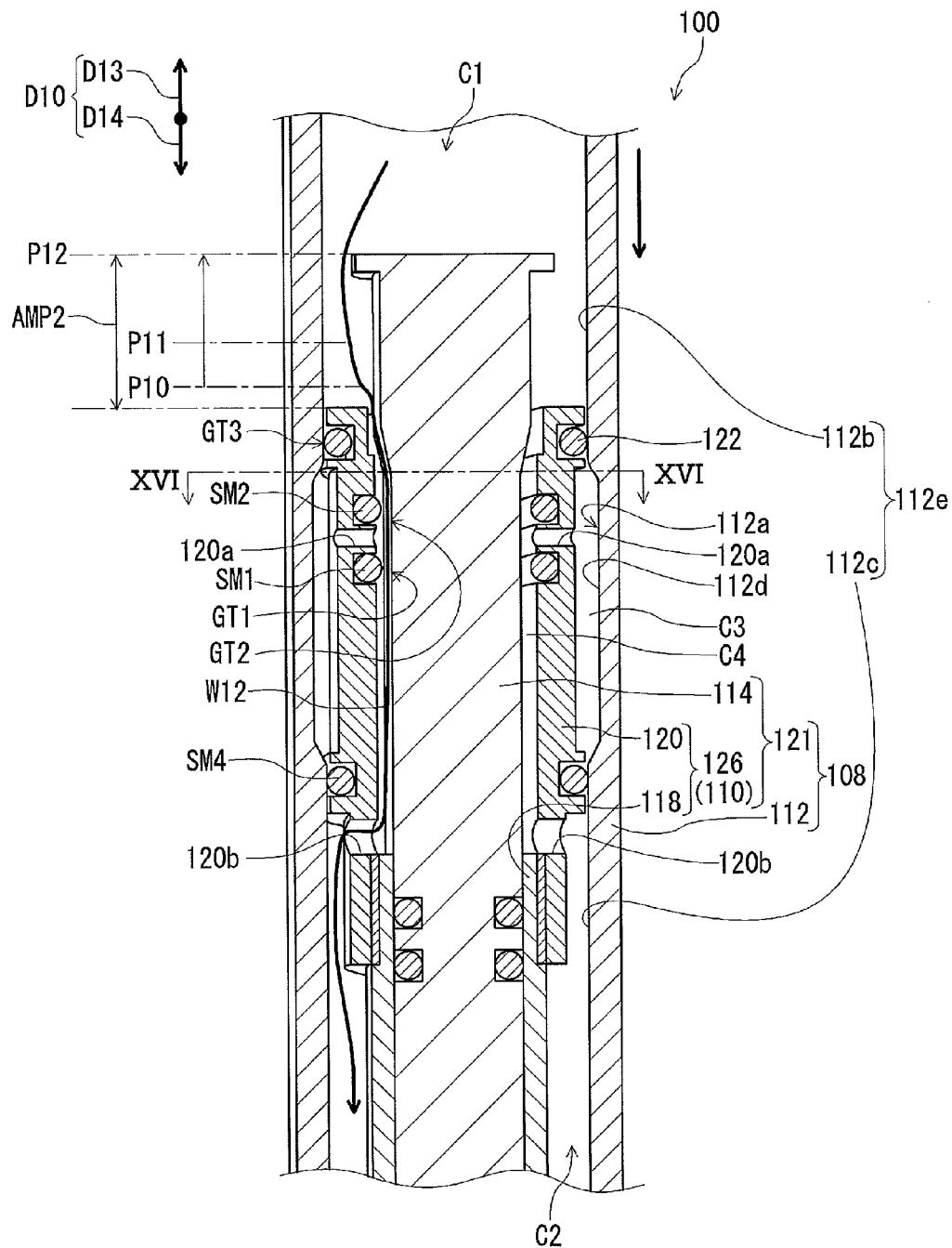
FIG. 14 is a partial cross-sectional view of the bicycle seatpost assembly illustrated in FIG. 10 (a second open position)

The support member 110 and the movable member 114 constitute a valve structure 121. The valve structure 121 has a closed state (FIG. 11), a first open state (FIGS. 12 and 13) and a second open state (FIG. 14). The closed state corresponds to the locked state of the bicycle seatpost assembly 100. The first open state corresponds to the first adjustable state of the bicycle seatpost assembly 100. The second open state corresponds to the second adjustable state of the bicycle seatpost assembly 100.

As seen in FIG. 11, the movable member 114 is slidably provided in the inner tube 118 and the valve receiving member 120. The movable member 114 is configured to be positioned at a closed position P10, a first open position P11 and a second open position P12. In the closed state of the valve structure 121, the movable member 114 is positioned at the closed position P10. In the first open state of the valve structure 121, the movable member 114 is positioned at the first open position P11. In the second open state of the valve structure 121, the movable member 114 is positioned at the second open position P12. The positioning structure 108 includes a biasing element (not shown) configured to bias the movable member 114 relative to the support member 110 toward the closed position P10.

The movable member 114 contacts the valve receiving member 120 to close the valve structure 121 in a state where the movable member 114 is positioned at the closed position P10. The closed position P10 corresponds to the rest position P0 (FIGS. 5 and 10) of the bicycle operating device 10. The first open position P11 corresponds to the first operated position P1 (FIGS. 5, 6 and 10) of the bicycle operating device 10. The second open position P12 corresponds to the second operated position P2 (FIGS. 5, 7 and 10) of the bicycle operating device 10. The position of the movable member 114 is continuously adjustable relative to the support member 110 between the closed position P10 and the second open position P12 using the bicycle operating device 10 (FIG. 10). The position of the movable member 114 can be adjusted at the first open position P11 relative to the support member 110 using the first operated position P1 of the bicycle operating device 10 (FIG. 10).

Figure 12:
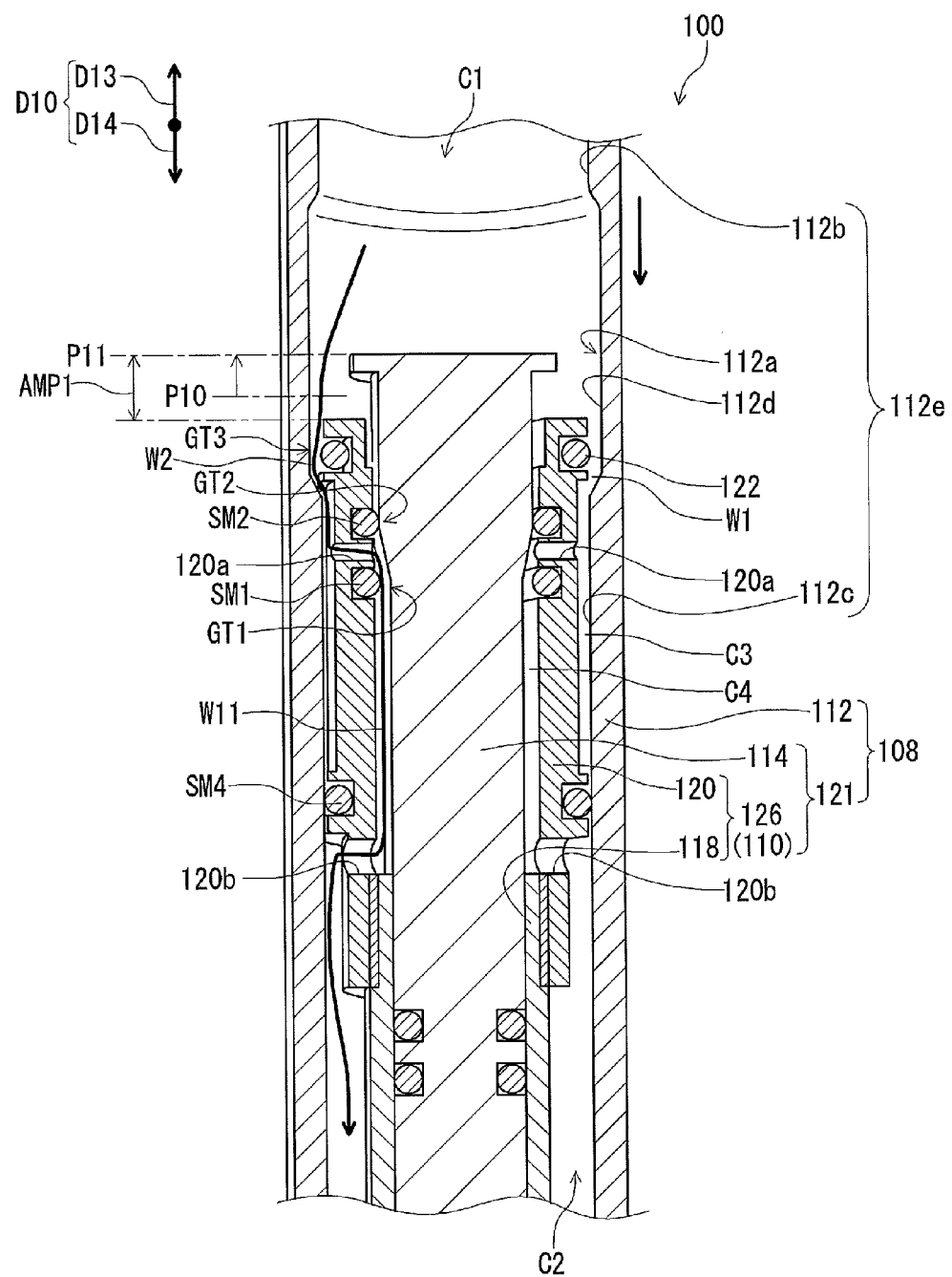
FIG. 12 is a partial cross-sectional view of the bicycle seatpost assembly illustrated in FIG. 10 (a first open position)

As seen in FIGS. 12 and 14, the movable member 114 is movably mounted to the support member 110 and is configured to protrude from the support member 110. As seen in FIG. 12, the movable member 114 protrudes from the support member 110 by a first amount of protrusion AMP1 in a state where the movable member 114 is disposed at the first open position P11. As seen in FIG. 14, the movable member 114 protrudes from the support member 110 by a second amount of protrusion AMP2 different from the first amount of protrusion AMP1 in a state where the movable member 114 is disposed at the second open position P12. In the illustrated embodiment, as seen in FIGS. 12 and 14, the second amount of protrusion AMP2 is greater than the first amount of protrusion AMP1.

As seen in FIGS. 12 and 14, the positioning structure 108 includes a first passageway W11 and a second passageway W12. As seen in FIG. 12, the first chamber C1 is in communication with the second chamber C2 via the first passageway W11 in the first adjustable state of the bicycle seatpost assembly (i.e., in a state where the movable member 114 is disposed at the first open position P11). As seen in FIG. 14, the first chamber C1 is in communication with the second chamber C2 via the second passageway W12 in the second adjustable state of the bicycle seatpost assembly (i.e., in a state where the movable member 114 is disposed at the second open position P12). As seen in FIGS. 12 and 14, the first passageway W11 and the second passageway W12 are at least partially disposed between the support member 110 and the movable member 114. In the illustrated embodiment, the first passageway W11 is at least partially different from the second passageway W12.

As seen in FIGS. 12 and 14, the positioning structure 108 is configured to switch a fluid passageway among the first passageway W11 and the second passageway W12 to switch the state of the bicycle seatpost assembly among the first adjustable state and the second adjustable state. In the illustrated embodiment, the movable member 114 is configured to switch the fluid passageway among the first passageway W11 and the second passageway W12 in accordance with the position of the movable member 114 relative to the support member 110.

As seen in FIG. 12, the first passageway W11 includes a first gate GT1 configured to open and close in response to the position of the movable member 114 relative to the support member 110. The first gate GT1 is open in a state where the movable member 114 is disposed at the first open position P11.

More specifically, the positioning structure 108 includes a first-gate seal member SM1 provided on an inner periphery of the valve receiving member 120. The first-gate seal member SM1 is contactable with the movable member 114. The first gate GT1 is closed in a state where the first-gate seal member SM1 contacts the movable member 114 (FIG.

11). The first gate GT1 is open in a state where the first-gate seal member SM1 is spaced apart from the movable member 114 (FIG. 12).

As seen in FIG. 14, the second passageway W12 includes a second gate GT2 configured to open and close in response to a position of the movable member 114 relative to the support member 110. The second gate GT2 is provided at a position different from a position of the first gate GT1. Specifically, the second gate GT2 is provided at a position spaced apart from the first gate GT1 in the telescopic direction D10 and is closer to an upper end of the movable member 114 than the first gate GT1. The first gate GT1 and the second gate GT2 are open in a state where the movable member 114 is disposed at the second open position P12 different from the first open position P11 relative to the support member 110.

More specifically, the positioning structure 108 includes a second-gate seal member SM2 provided on the inner periphery of the valve receiving member 120. The second-gate seal member SM2 is contactable with the movable member 114. The second gate GT2 is closed in a state where the second-gate seal member SM2 contacts the movable member 114 (FIG. 11). The second gate GT2 is open in a state where the second-gate seal member SM2 is spaced apart from the movable member 114 (FIG. 14).

As seen in FIG. 11, the first gate GT1 and the second gate GT2 are closed in a state where the movable member 114 is disposed at the closed position P10 different from the first open position P11 and the second open position P12 relative to the support member 110. In this state, the first-gate seal member SM1 and the second-gate seal member SM2 contact the movable member 114 so that the first gate GT1 and the second gate GT2 are closed. As seen in FIG. 12, the second gate GT2 is closed in a state where the movable member 114 is disposed at the first open position P11. In this state, the first-gate seal member SM1 is spaced apart from the movable member 114 so that the first gate GT1 is open, and the second-gate seal member SM2 contacts the movable member 114 so that the second gate GT2 is closed.

A first intermediate chamber C3 is defined between the fluid cylinder 112 and the valve receiving member 120. More specifically, the positioning structure 108 includes an additional seal member SM4 provided on the outer periphery of the valve receiving member 120. The first intermediate chamber C3 is defined by the fluid cylinder 112, the valve receiving member 120 and the additional seal member SM4.

A second intermediate chamber C4 is defined between the movable member 114 and the valve receiving member 120. The valve receiving member 120 includes first through-holes 120a and second through-holes 120b. The first through-holes 120a extends in a radial direction of the valve receiving member 120 and are provided between the first-gate seal member SM1 and the second-gate seal member SM2.

As seen in FIG. 12, the first intermediate chamber C3 is in communication with the second intermediate chamber C4 via the first through-holes 120a in a state where the first gate GT1 is open. The second through-holes 120b extends in the radial direction of the valve receiving member 120 and are provided on an opposite side of the first through-holes 120a relative to the first-gate seal member SM1. The second intermediate chamber C4 is in communication with the second chamber C2 via the second through-holes 120b. The additional seal member SM4 is provided between the first through-holes 120a and the second through-holes 120b in the telescopic direction D10.

Figure 15:
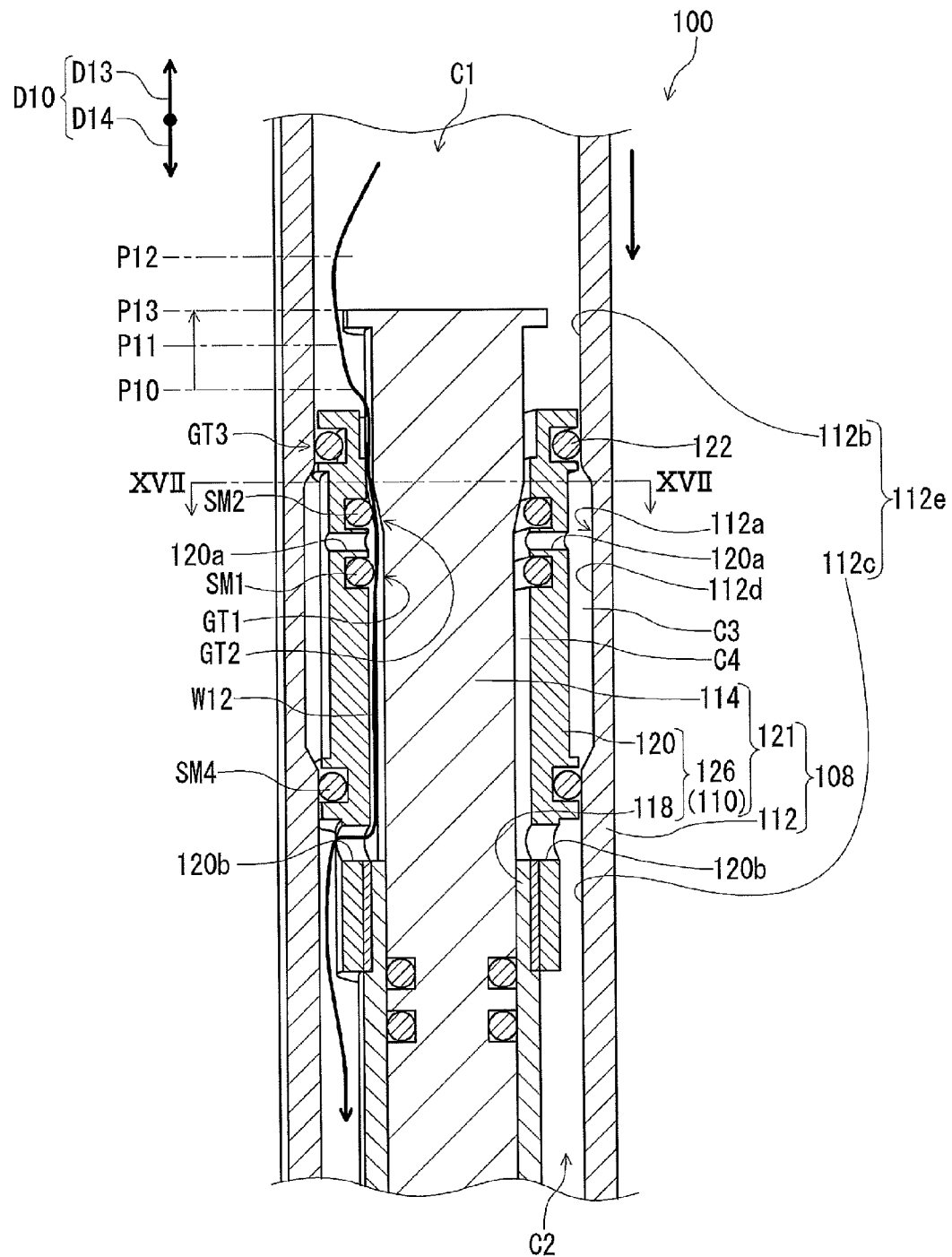
FIG. 15 is a partial cross-sectional view of the bicycle seatpost assembly illustrated in FIG. 10 (a third open position)

As seen in FIG. 15, the first gate GT1 and the second gate GT2 are open in a state where the movable member 114 is disposed at a third open position P13 different from the first open position P11 and the second open position P12 relative to the support member 110. In the illustrated embodiment, the third open position P13 is disposed between the first open position P11 and the second open position P12.

Figure 16:
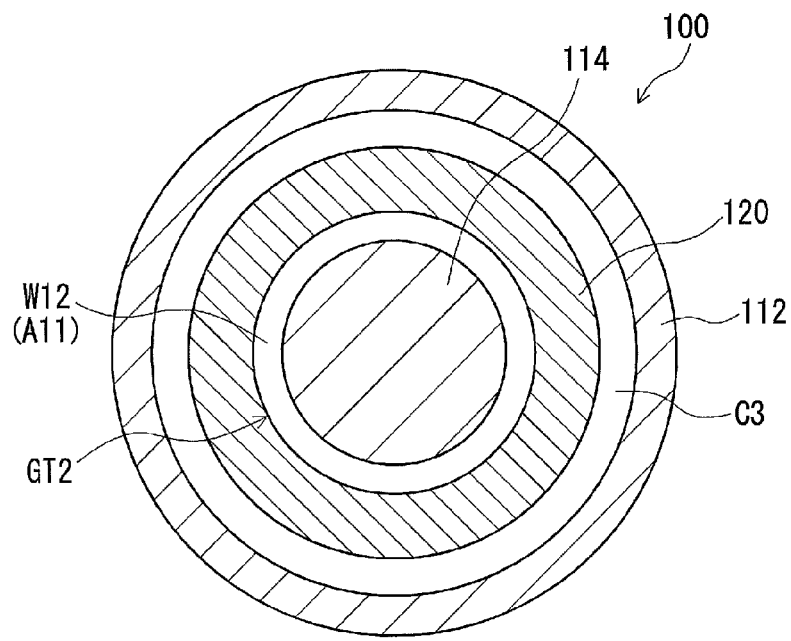
FIG. 16 is a cross-sectional view of the bicycle seatpost assembly taken along line XVI-XVI of FIG. 14 (the second open position)
Figure 17:
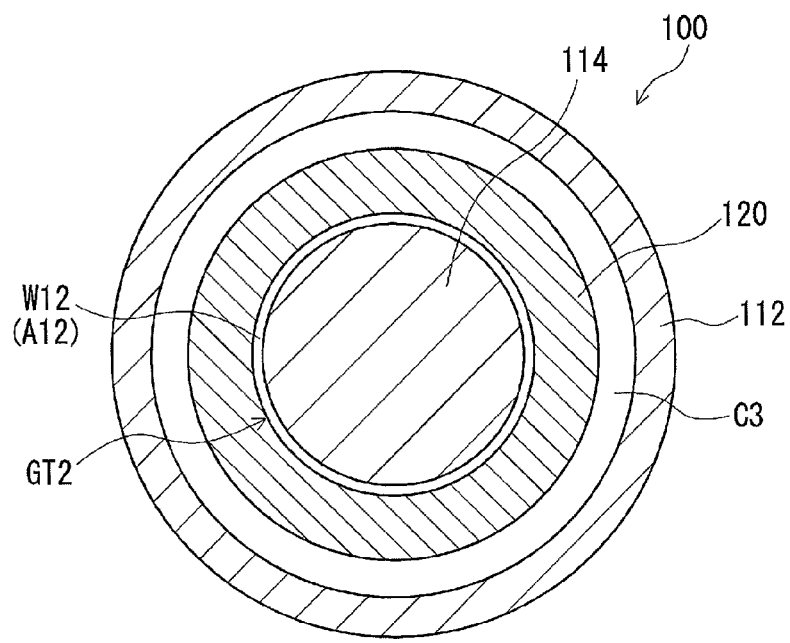
FIG. 17 is a cross-sectional view of the bicycle seatpost assembly taken along line XVII-XVII of FIG. 15 (the third open position)

As seen in FIG. 16, the second gate GT2 has a first cross-sectional area A11 in a state where the movable member 114 is disposed at the second open position P12. The first cross-sectional area A11 is defined on a cross section taken along line XVI-XVI of FIG. 14. As seen in FIG. 17, the second gate GT2 has a second cross-sectional area A12 in a state where the movable member 114 is disposed at the third open position P13. The second cross-sectional area A12 is defined on a cross section taken along line XVII-XVII of FIG. 15. As seen in FIGS. 16 and 17, the second cross-sectional area A12 is smaller than the first cross-sectional area A11. Since the second cross-sectional area A12 is smaller than the first cross-sectional area A11, fluid resistance caused by the second gate GT2 having the second cross-sectional area A12 is greater than fluid resistance caused by the second gate GT2 having the first cross-sectional area A11. Thus, the second cross-sectional area A12 of the second gate GT2 reduces the relative movement speed between the first cylinder 102 and the second cylinder 104 compared with the first cross-sectional area A11 of the second gate GT2. This allows the user to finely adjust the overall length of the bicycle seatpost assembly 100.

As seen in FIG. 11, the fluid cylinder 112 includes an inner peripheral surface 112e and a recessed inner peripheral surface 112d recessed from the inner peripheral surface 112e. The recessed inner peripheral surface 112d defines an inner diameter DM1 larger than an inner diameter DM2 defined by the inner peripheral surface 112e. The inner peripheral surface 112e includes a first inner peripheral surface 112b and a second inner peripheral surface 112c. The recessed inner peripheral surface 112d is disposed between the first inner peripheral surface 112b and the second inner peripheral surface 112c. The recessed inner peripheral surface 112d defines a recess 112a.

As seen in FIG. 12, the first passageway W11 includes a third gate GT3 configured to open and close in response to a relative position between the support member 110 and the recessed inner peripheral surface 112d. The third gate GT3 is configured to open and close the first passageway W11 provided between the first chamber C1 and the first intermediate chamber C3. The positioning structure 108 includes a seal member 122 (a third-gate seal member) provided on an outer periphery of the support member 110. The third gate GT3 is open in a state where the seal member 122 faces the recessed inner peripheral surface 112d of the fluid cylinder 112 in the radial direction of the valve receiving member 120. More specifically, the third gate GT3 is open in a state where a space is made between the seal member 122 and the recessed inner peripheral surface 112d. The first chamber C1 is in communication with the first intermediate chamber C3 in a state where the third gate GT3 is open (i.e., in a state where the seal member 122 is disposed between an upper end and a lower end of the recessed inner peripheral surface 112d). As seen in FIG. 13, the third gate GT3 is closed in a state where the seal member 122 contacts the inner peripheral surface 112e of the fluid cylinder 112.

The operation of the bicycle seatpost assembly 100 will be described in detail below. As seen in FIG. 11, in a state where the overall length of the bicycle seatpost assembly 100 is the maximum overall length L0, the seal member 122 is disposed radially inward of the recess 112a provided in the fluid cylinder 112. The seal member 122 is spaced apart from the recessed inner peripheral surface 112d of the fluid cylinder 112 to provide a passageway W1 between the recessed inner peripheral surface 112d and the seal member 122. The passageway W1 is a part of the first passageway W11.

As seen in FIG. 12, when the operated member 16 (FIG. 10) of the bicycle operating device 10 is moved by the user from the rest position P0 to the first operated position P1, the movable member 114 is moved from the closed position P10 to the first open position P11. In a state where the movable member 114 is positioned at the first open position P11, the first chamber C1 is in communication with the second chamber C2 via the first intermediate chamber C3, the first through-holes 120a, the second intermediate chamber C4 and the second through-holes 120b. This allows the substantially incompressible fluid to flow from the first chamber C1 to the second chamber C2 via the first passageway W11, allowing the second cylinder 104 to be downwardly moved relative to the first cylinder 102 using the rider's weight applied to the seat attachment portion 106.

As seen in FIG. 13, after the seal member 122 passes through the recess 112a, the seal member 122 contacts the first inner peripheral surface 112b of the fluid cylinder 112. The third gate GT3 is closed in a state where the seal member 122 contacts the inner peripheral surface 112e of the fluid cylinder 112. This prevents the substantially incompressible fluid from flowing from the first chamber C1 to the second chamber C2, causing the second cylinder 104 to stop moving downwardly relative to the first cylinder 102 and to be fixedly positioned relative to the first cylinder 102 at a position corresponding to the first overall length L1 (FIG. 10) after the movable member 114 moves from the first open position P11 to the closed position P10. Accordingly, when the operated member 16 of the bicycle operating device 10 is moved to the first operated position P1, the second cylinder 104 can downwardly move relative to the first cylinder 102 from the maximum overall length L0 to the first overall length L1 defined by the recess 112a.

As seen FIG. 14, when the operated member 16 is moved by the user from the rest position P0 to the second operated position P2, the movable member 114 is moved from the closed position P10 to the second open position P12. In a state where the movable member 114 is positioned at the second open position P12, the first chamber C1 is in communication with the second chamber C2 via the second intermediate chamber C4 and the second through-holes 120b. This allows the substantially incompressible fluid to flow from the first chamber C1 to the second chamber C2 via the second passageway W12, allowing the second cylinder 104 to be downwardly moved relative to the first cylinder 102 using the rider's weight applied to the seat attachment portion 106.

At this time, the substantially incompressible fluid flows from the first chamber C1 to the second chamber C2 without via the first intermediate chamber C3. Accordingly, a relative position between the first cylinder 102 and the second cylinder 104 can be continuously adjusted using the bicycle operating device 10 regardless of the recess 112a.

As seen in FIG. 10, the bicycle seatpost assembly 100 comprises an adjusting structure 124. The adjusting structure 124 is configured to adjust at least one of the first adjustable position range AR1 and the second adjustable position range AR2. In the illustrated embodiment, the adjusting structure 124 is configured to adjust one of the first adjustable position range AR1 and the second adjustable position range AR2 without changing the other of the first adjustable position range AR1 and the second adjustable position range AR2. The adjusting structure 124 is configured to adjust (change) the second adjustable position range AR2 without changing the first adjustable position range AR1.

As seen in FIG. 11, the positioning structure 108 includes a first positioning member 126 and a second positioning member 112. In the illustrated embodiment, the fluid cylinder 112 can also be referred to as the second positioning member 112. The second positioning member 112 extends in the telescopic direction D10. The first positioning member 126 includes the support member 110 and the seal member 122.

As seen in FIG. 12, the support member 110 is at least partly disposed in the fluid cylinder 112 to provide a fluid passageway W2 between the support member 110 and the fluid cylinder 112. In the illustrated embodiment, the support member 110 is partly disposed in the fluid cylinder 112 to provide the fluid passageway W2 between the support member 110 and the fluid cylinder 112. The first passageway W11 includes the fluid passageway W2. The seal member 122 is configured to block the fluid passageway W2 in a state where the total length of the bicycle seatpost assembly 100 is an intermediate length (e.g., the first overall length L1) between the maximum overall length L0 and the minimum overall length L3 (FIG. 10).

The first positioning member 126 is movable together with one of the first cylinder 102 and the second cylinder 104 in the telescopic direction D10 relative to the other of the first cylinder 102 and the second cylinder 104. The second positioning member 112 is movable together with the other of the first cylinder 102 and the second cylinder 104 in the telescopic direction D10 relative to the one of the first cylinder 102 and the second cylinder 104. In the illustrated embodiment, the first positioning member 126 is movable together with the first cylinder 102 (FIG. 10) in the telescopic direction D10 relative to the second cylinder 104. The second positioning member 112 is movable together with the second cylinder 104 in the telescopic direction D10 relative to the first cylinder 102.

Figure 18:
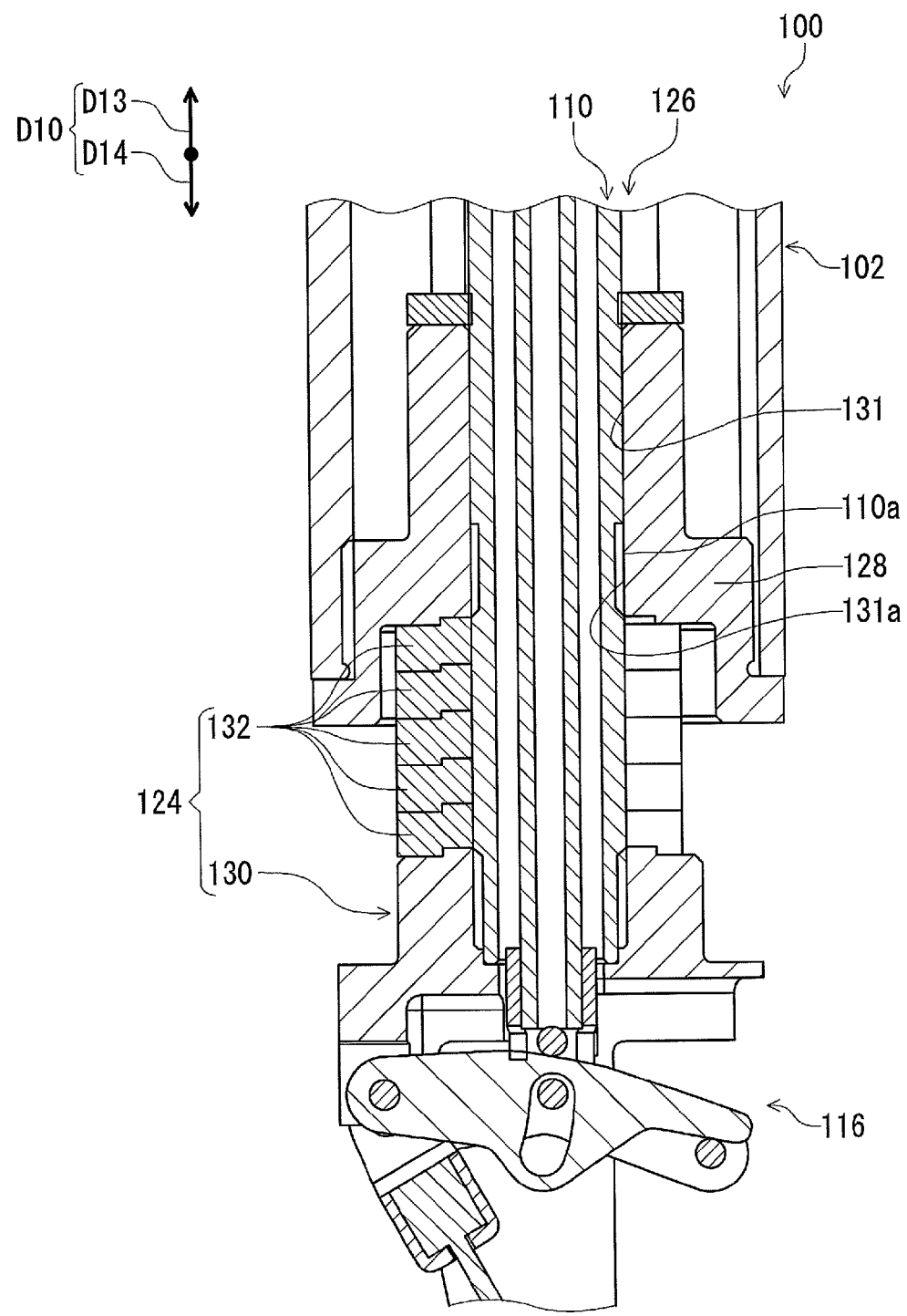
FIG. 18 is a partial cross-sectional view of the bicycle seatpost assembly illustrated in FIG. 10.

As seen in FIG. 18, one of the first cylinder 102 and the second cylinder 104 includes an attachment end 128. In the illustrated embodiment, the first cylinder 102 includes the attachment end 128. The attachment end 128 is disposed on a distal end of the first cylinder 102. The support member 110 extends in the telescopic direction D10 and is configured to be attached to the attachment end 128. The first positioning member 126 is attached to the first cylinder 102 via the attachment end 128 to be movable together with the first cylinder 102 in the telescopic direction D10 relative to the second cylinder 104.

Figure 19:
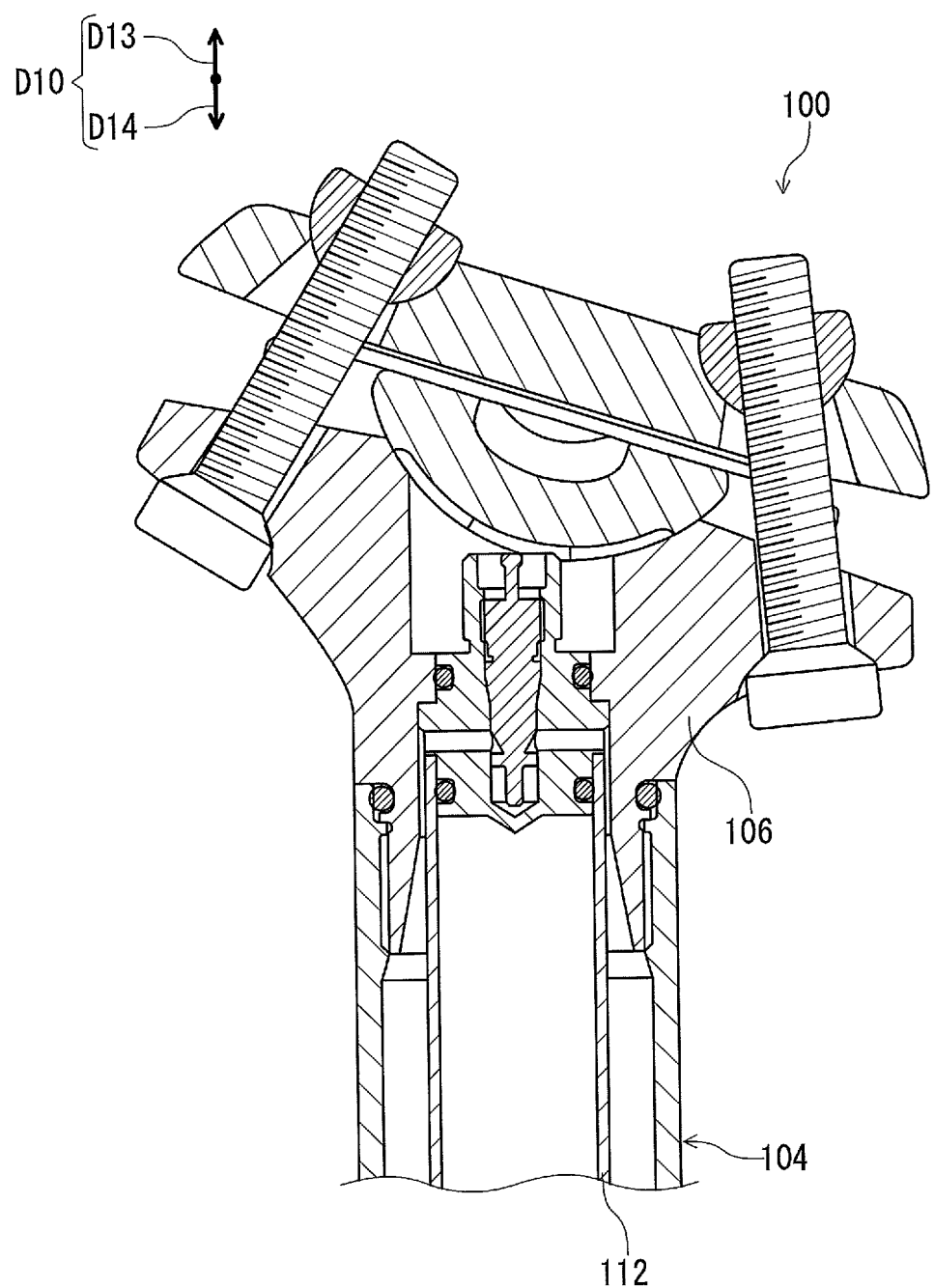
FIG. 19 is a partial cross-sectional view of the bicycle seatpost assembly illustrated in FIG. 10.

As seen in FIG. 19, the other of the first cylinder 102 and the second cylinder 104 includes an additional attachment end 106. In the illustrated embodiment, the second cylinder 104 includes the additional attachment end 106. The additional attachment end 106 is disposed on a distal end of the second cylinder 104. The additional attachment end 106 can also be referred to as the seat attachment portion 106. The fluid cylinder 112 is configured to be attached to the additional attachment end 106. The second positioning member 112 is attached to the second cylinder 104 via the additional attachment end 106 to be movable together with the second cylinder 104 in the telescopic direction D10 relative to the first cylinder 102.

As seen in FIG. 10, the adjusting structure 124 is configured to adjust a relative positional relationship between the first positioning member 126 and the second positioning member 112 in a reference state where a total length of the bicycle seatpost assembly 100 is one of shortest and longest. In the illustrated embodiment, the adjusting structure 124 is configured to adjust the relative positional relationship between the first positioning member 126 and the second positioning member 112 in a reference state where a total length of the bicycle seatpost assembly 100 is longest (i.e., the maximum overall length L0 in FIG. 10).

Furthermore, the adjusting structure 124 is configure to adjust an initial relative position of the fluid cylinder 112 and the support member 110. In the illustrated embodiment, the initial relative position of the fluid cylinder 112 and the support member 110 is a relative position at which a total length of the bicycle seatpost assembly 100 is longest.

As seen in FIG. 18, the adjusting structure 124 is configured to change a position of the first positioning member 126 relative to one of the first cylinder 102 and the second cylinder 104. The adjusting structure 124 is configured to change a position of the support member 110 relative to one of the first cylinder 102 and the second cylinder 104. In the illustrated embodiment, the adjusting structure 124 is configured to change the position of the first positioning member 126 (the support member 110) relative to the first cylinder 102. As described in a third embodiment, however, the adjusting structure 124 can be configured to change a position of the second positioning member 112 relative to the other of the first cylinder 102 and the second cylinder 104. The adjusting structure 124 can be configured to change a position of the fluid cylinder 112 relative to the other of the first cylinder 102 and the second cylinder 104. Namely, the adjusting structure 124 can be configured to change the position of the second positioning member 112 (the fluid cylinder 112) relative to the second cylinder 104.

As seen in FIG. 18, the adjusting structure 124 is configured to adjust a position of the support member 110 relative to the attachment end 128 in the telescopic direction D10. The adjusting structure 124 includes a securing member 130. The securing member 130 is configured to be secured to an end of the support member 110. The securing member 130 is provided outside the first cylinder 102. The valve operating structure 116 is mounted to the securing member 130. In the illustrated embodiment, the securing member 130 is secured to the end of the support member 110 so that the securing member 130 and the support member 110 are integrally rotatable relative to the first cylinder 102.

The attachment end 128 includes a through-hole 131 having an internally threaded portion 131a. The support member 110 extends through the through-hole 131 and has an externally threaded portion 110a engaged with the internally threaded portion 131a. When the securing member 130 and the support member 110 are integrally rotated relative to the first cylinder 102, the securing member 130 and the support member 110 move relative to the first cylinder 102 in the telescopic direction D10 via the internally threaded portion 131a and the externally threaded portion 110a.

The adjusting structure 124 includes at least one spacer 132. The at least one spacer 132 is configured to be detachably provided between the securing member 130 and the attachment end 128 to adjust a position of the support member 110 relative to the attachment end 128. In the illustrated embodiment, the adjusting structure 124 includes a plurality of spacers 132. The spacers 132 are configured to be detachably provided between the securing member 130 and the attachment end 128 to adjust the position of the support member 110 relative to the attachment end 128.

Figure 20:
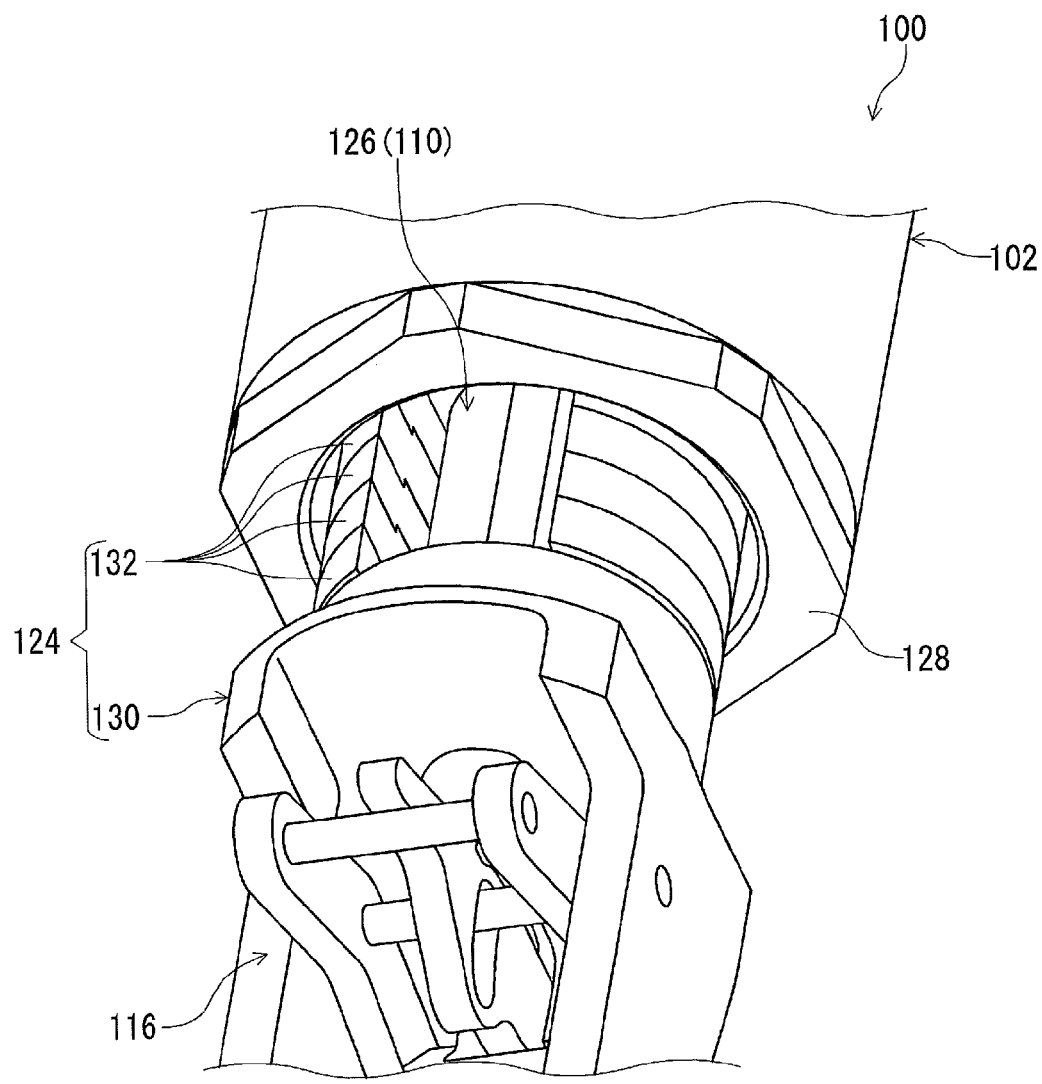
FIG. 20 is a partial perspective view of the bicycle seatpost assembly illustrated in FIG. 10.

As seen in FIG. 20, the spacers 132 have the same shape as each other. While each of the spacers 132 is a substantially U-shaped plate in the illustrated embodiment, the spacers 132 can have other shapes if needed and/or desired. A distance between the securing member 130 and the attachment end 128 is adjustable by changing a total number of the spacers 132 provided between the securing member 130 and the attachment end 128. Namely, the position of the first positioning member 126 (the support member 110) is adjustable relative to the first cylinder 102 by changing a total number of the spacers 132 provided between the securing member 130 and the attachment end 128.

When the securing member 130 are rotated relative to the first cylinder 102 together with the support member 110 to move toward the attachment end 128, the spacers 132 are sandwiched between the securing member 130 and the attachment end 128. This allows the support member 110 to be fixedly positioned relative to the first cylinder 102 at a position corresponding to a total axial thickness of the spacers 132. When the securing member 130 are rotated relative to the first cylinder 102 together with the support member 110 to move away from the attachment end 128, the spacers 132 are released from being sandwiched between the securing member 130 and the attachment end 128. In this state, the spacers 132 are detachable from and attachable to the support member 110 to adjust a total axial thickness of the spacers 132 (i.e., to adjust the position of the support member 110 relative to the first cylinder 102).

Figure 21:
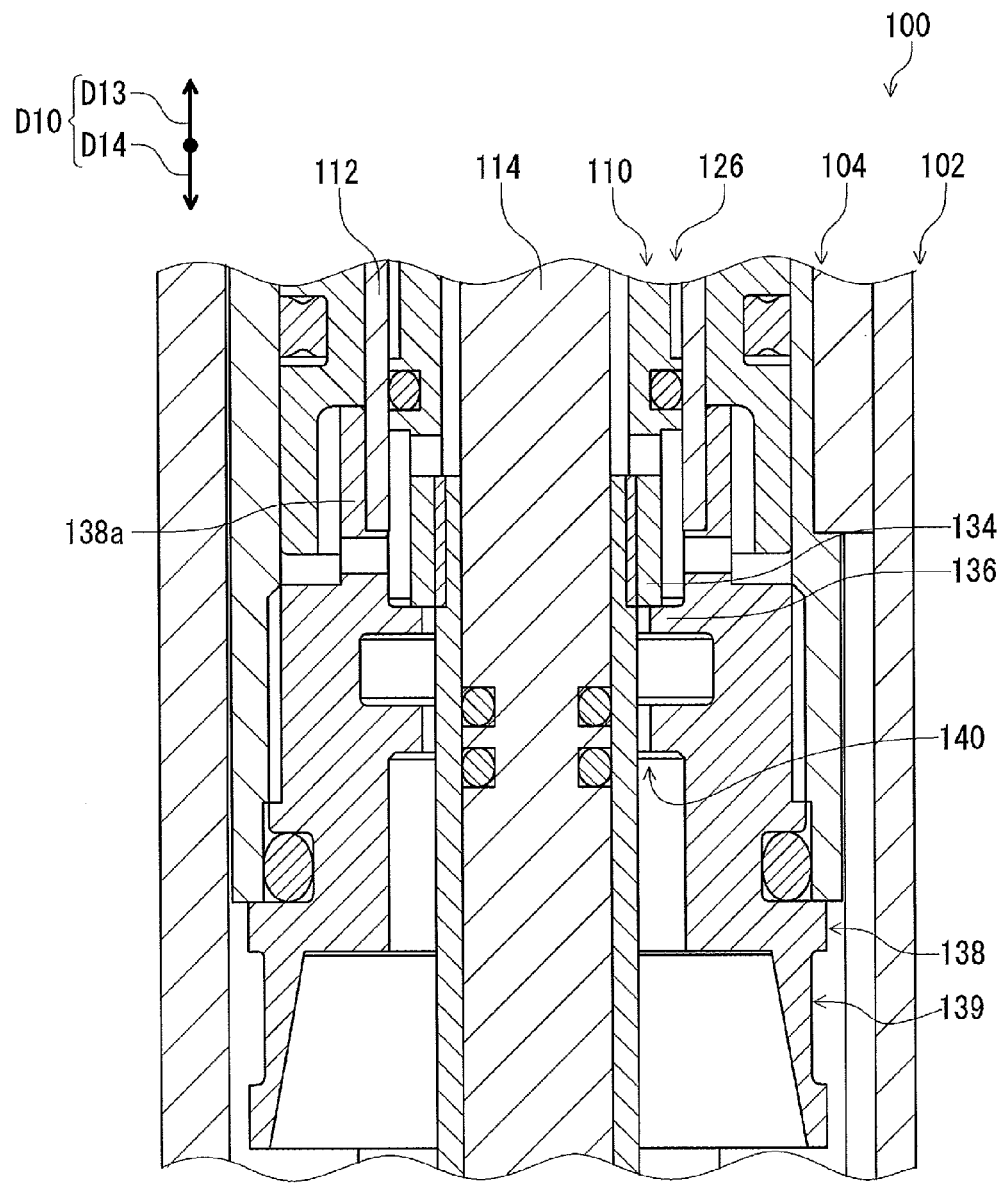
FIG. 21 is a partial cross-sectional view of the bicycle seatpost assembly illustrated in FIG. 10.

As seen in FIG. 21, the bicycle seatpost assembly 100 comprises a first abutment 134 and a second abutment 136. The first abutment 134 is configured to be coupled to the first cylinder 102. The second abutment 136 is configured to be coupled to the second cylinder 104. The telescopic direction D10 includes an extending direction D13 and a shortening direction D14. In the extending direction D13, a total length of the bicycle seatpost assembly 100 increases. The shortening direction D14 is opposite to the extending direction D13. In the shortening direction D14, the total length of the bicycle seatpost assembly 100 decreases. The second abutment 136 is configured to abut the first abutment 134 to restrict a movement of the second cylinder 104 with respect to the first cylinder 102 in the extending direction D13. In the illustrated embodiment, each of the extending direction D13 and the shortening direction D14 is defined as a direction in which the second cylinder 104 moves relative to the first cylinder 102.

In the illustrated embodiment, the first abutment 134 and the second abutment 136 are provided in the second cylinder 104. Specifically, the positioning structure 108 includes a sealing structure 138. The sealing structure 138 is configured to be mounted to the second cylinder 104 and has an opening 140. The sealing structure 138 comprises a piston 139 to move together with the second cylinder 104 in the telescopic direction D10. The support member 110 is configured to be mounted to the first cylinder 102 to extend through the opening 140 of the sealing structure 138. In the illustrated embodiment, the first abutment 134 is provided to the support member 110. The second abutment 136 is provided to the sealing structure 138. The sealing structure 138 includes a tubular portion 138a. An end of the fluid cylinder 112 is provided in the tubular portion 138a. The sealing structure 138 holds the end of the fluid cylinder 112 relative to the second cylinder 104.

As seen in FIGS. 10 and 21, a total length L4 of the first cylinder 102 and the second cylinder 104 is longest when the first abutment 134 is in contact with the second abutment 136. As seen in FIGS. 10, 18, and 21, the total length L4 of the first cylinder 102 and the second cylinder 104 is shortest when the sealing structure 138 is in contact with the attachment end 128.

As seen in FIGS. 18 and 21, the adjusting structure 124 is configured to adjust one of a position of the first abutment 134 relative to the first cylinder 102 and a position of the second abutment 136 relative to the second cylinder 104. In the illustrated embodiment, the adjusting structure 124 is configured to adjust the position of the first abutment 134 relative to the first cylinder 102. Specifically, the adjusting structure 124 is configured to change the position of the support member 110 relative to the first cylinder 102 to adjust the position of the first abutment 134 relative to the first cylinder 102.

For example, when a total number of the spacers 132 decreases in the adjusting structure 124, a position of the support member 110 (the first abutment 134) of the first positioning member 126 moves relative to the first cylinder 102 in the extending direction D13. This makes the second adjustable position range AR2 longer.

When a total number of the spacers 132 increases in the adjusting structure 124, a position of the support member 110 (the first abutment 134) of the first positioning member 126 moves relative to the first cylinder 102 in the shortening direction D14. This makes the second adjustable position range AR2 shorter.

When the position of the support member 110 of the first positioning member 126 is adjusted relative to the first cylinder 102, the movable member 114 is preferably moved via the valve operating structure 116 to open the first gate GT1 and the second gate GT2. This allows the fluid to flow between the first chamber C1 and the second chamber C2, preventing the fluid in the first chamber C1 and/or the second chamber C2 from blocking the adjustment of the position of the first positioning member 126.

With the bicycle seatpost assembly 100, the adjusting structure 124 is configured to adjust at least one of the first adjustable position range AR1 and the second adjustable position range AR2. In the illustrated embodiment, the adjusting structure 124 is configured to adjust the second adjustable position range AR2. Accordingly, it is possible to change the adjustable position range of the bicycle seatpost assembly 100 to suit the needs and/or preferences of the user.

The bicycle seatpost assembly 100 is not limited to a hydraulic adjustable seatpost such that an overall length thereof is continuously adjustable. The seatpost assembly can include a mechanical structure or an electromechanical structure such that an overall length thereof is mechanically or electromechanically adjustable to a plurality of predetermined different lengths instead of a hydraulic mechanism.

Second Embodiment

A bicycle seatpost assembly 300 in accordance with a second embodiment will be described below referring to FIGS. 22 to 26. The bicycle seatpost assembly 300 has substantially the same configuration as the bicycle seatpost assembly 100 except for an arrangement of the first adjustable position range AR1. Thus, elements having substantially the same function as those in the first embodiment will be numbered the same here, and will not be described and/or illustrated again in detail here for the sake of brevity.

Figure 22:
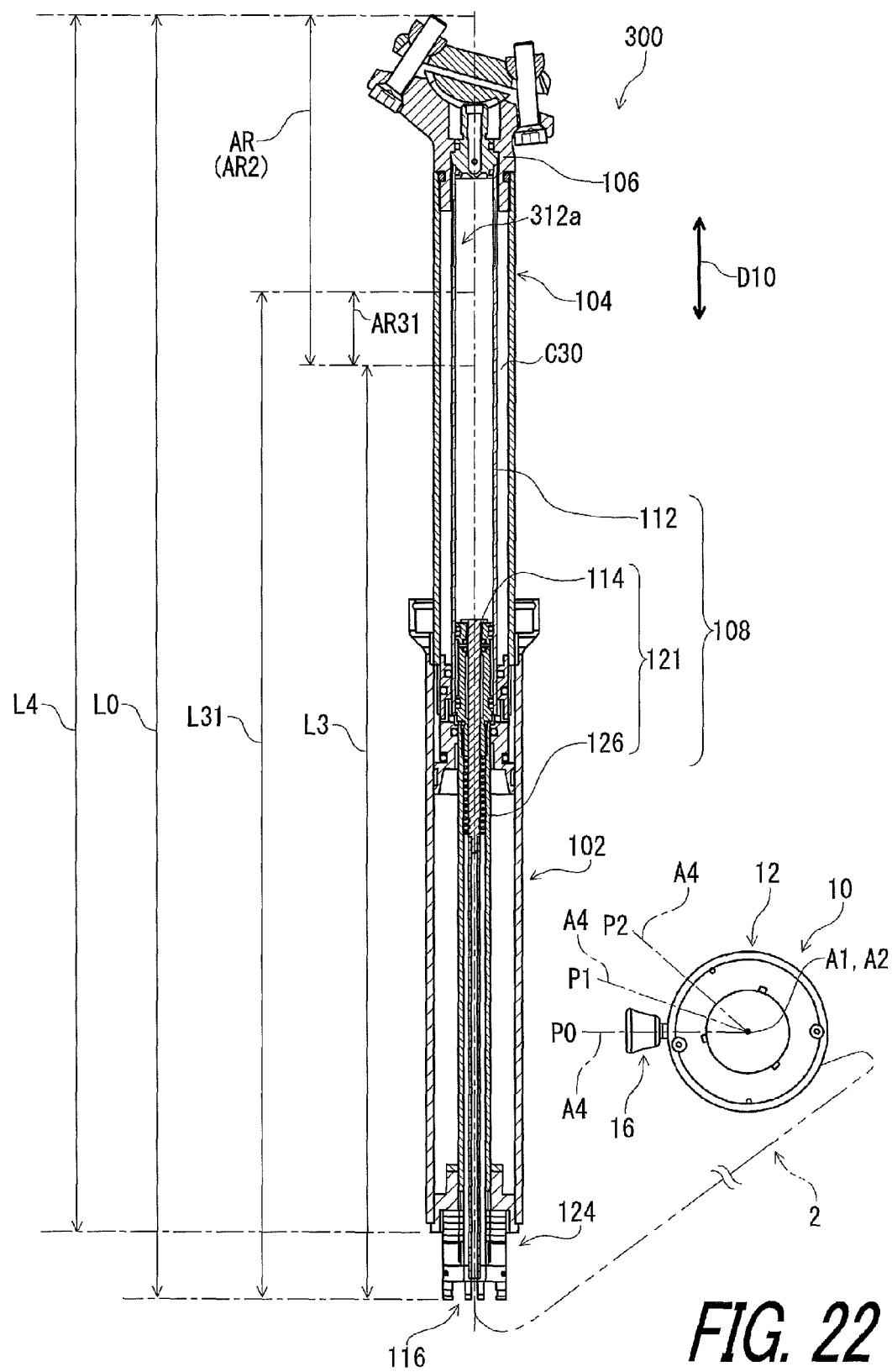
FIG. 22 is a cross-sectional view of a bicycle seatpost assembly in accordance with a second embodiment.

As seen in FIG. 22, unlike the recess 112a in accordance with the first embodiment, a recess 312a is disposed at an upper portion of the fluid cylinder 112 than the recess 112a of the first embodiment. A first adjustable position range AR31 is defined between a first maximum overall length (a third overall length L31) and a first minimum overall length (the minimum overall length L3) of the bicycle seatpost assembly 300. The second adjustable position range AR2 is defined between the second maximum overall length (the maximum overall length L0) and the second minimum overall length (the minimum overall length L3) of the bicycle seatpost assembly 300. The first maximum overall length (the third overall length L31) is different from the second maximum overall length (the maximum overall length L0). In the illustrated embodiment, the first maximum overall length (the third overall length L31) is shorter than the second maximum overall length (the maximum overall length L0). The first minimum overall length (the minimum overall length L3) is equal to the second minimum overall length (the minimum overall length L3).

Figure 23:
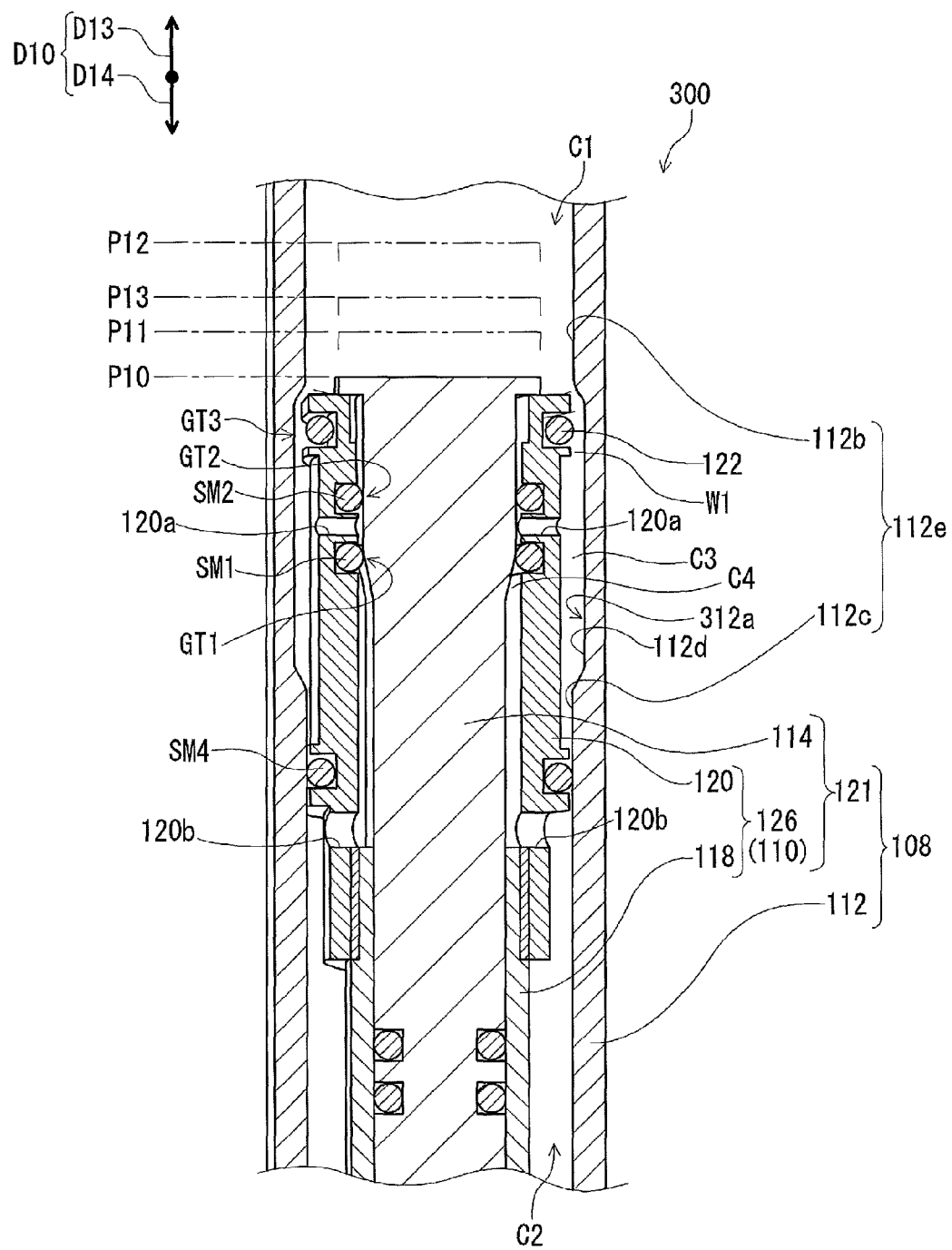
FIG. 23 is a partial cross-sectional view of the bicycle seatpost assembly illustrated in FIG. 22 (the closed position)

As seen in FIG. 23, in a state where the overall length of the bicycle seatpost assembly 300 is the minimum overall length L3, the seal member 122 is disposed radially inward of the recess 312a provided in the fluid cylinder 112. The seal member 122 is spaced apart from the recessed inner peripheral surface 112d of the fluid cylinder 112 to provide the passageway W1 between the recessed inner peripheral surface 112d and the seal member 122.

Figure 24:
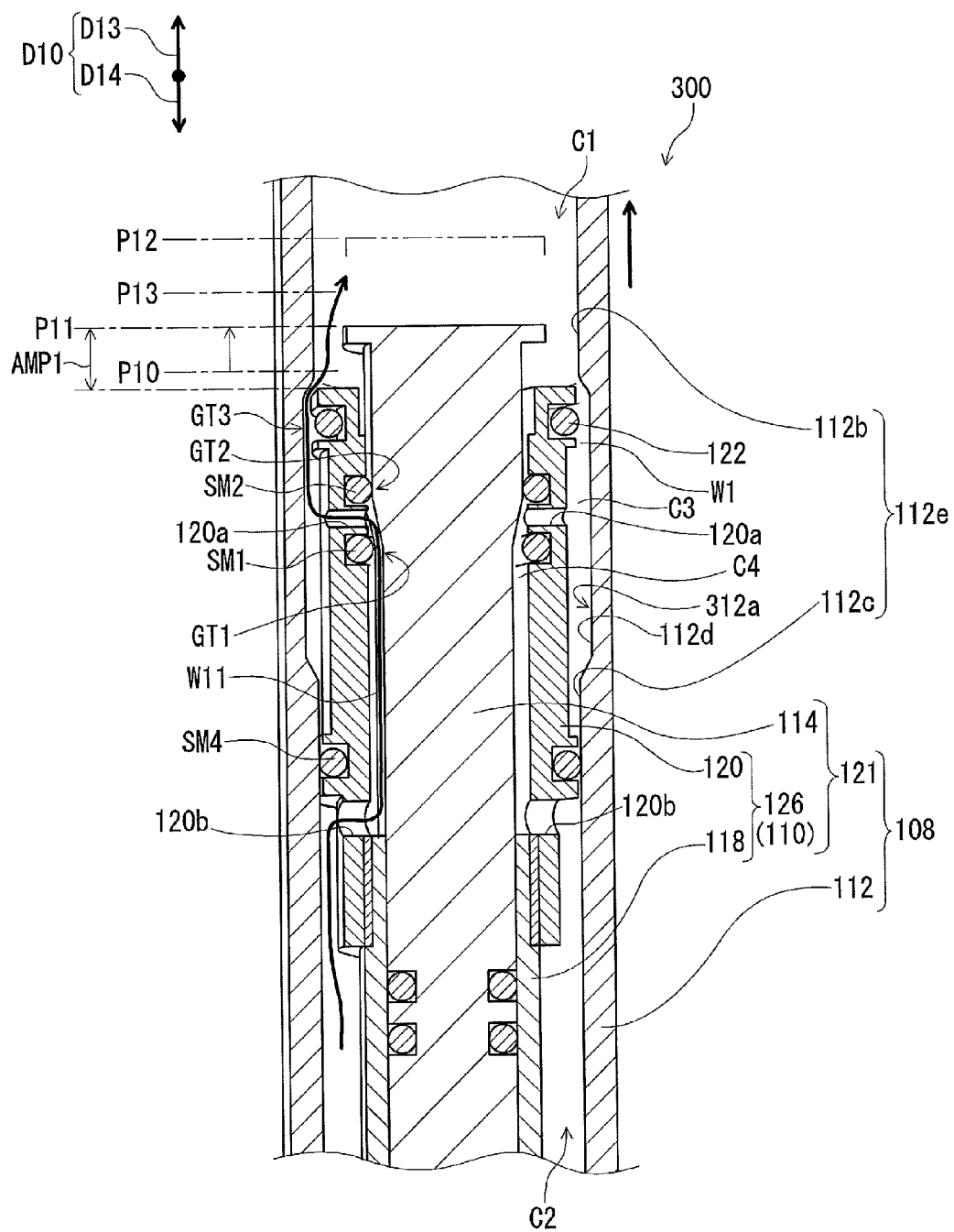
FIG. 24 is a partial cross-sectional view of the bicycle seatpost assembly illustrated in FIG. 22 (the first open position)

As seen in FIG. 24, in a state where the movable member 114 is positioned at the first open position P11, the first chamber C1 is in communication with the second chamber C2 via the first passageway W11, allowing the second cylinder 104 to be upwardly moved relative to the first cylinder 102 with pressure of compressible fluid (e.g., air) filled in a biasing chamber C30 (FIG. 22).

Figure 25:
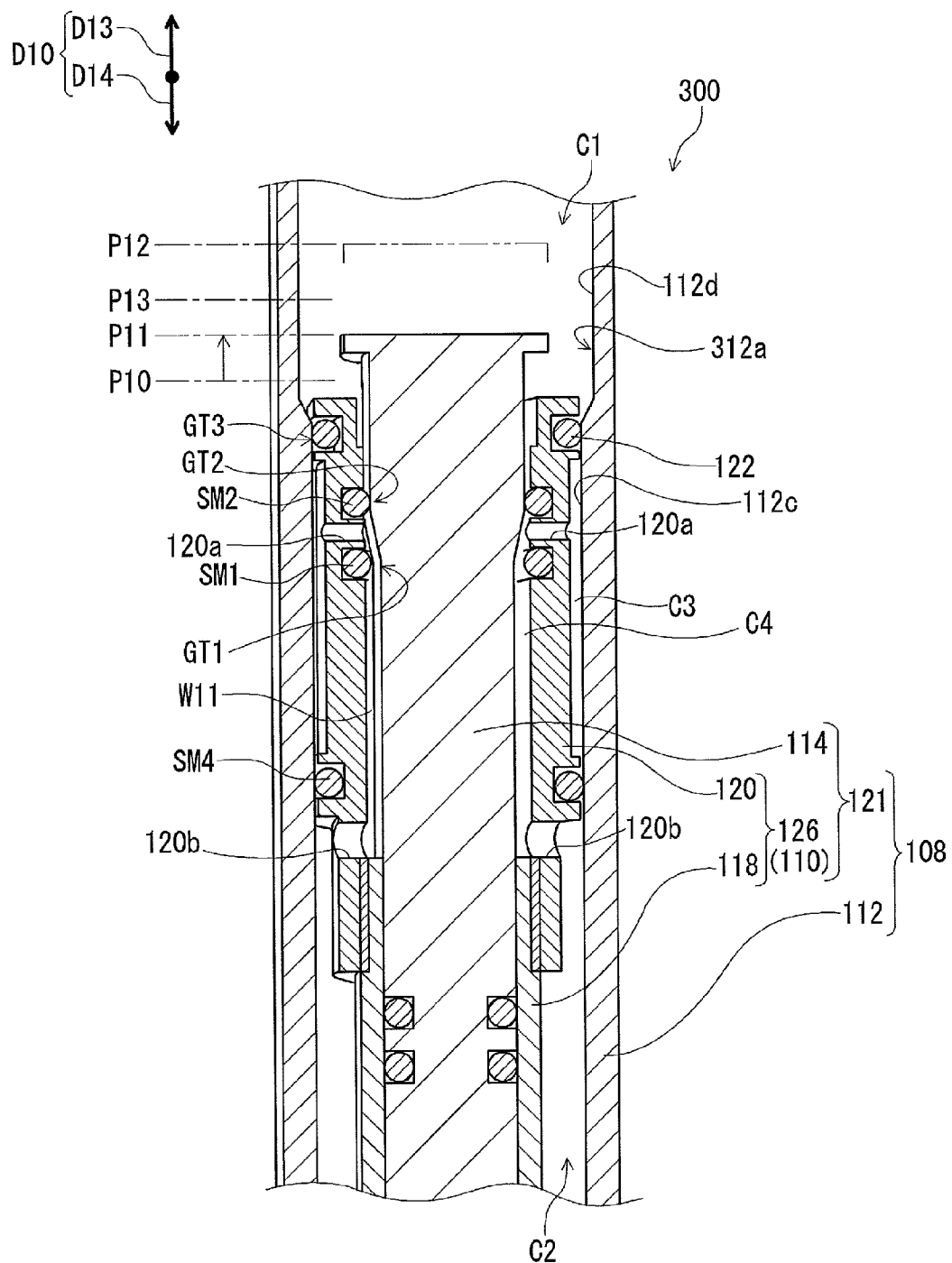
FIG. 25 is a partial cross-sectional view of the bicycle seatpost assembly illustrated in FIG. 22 (the first open position)

As seen in FIG. 25, after the seal member 122 passes through the recess 312a, the seal member 122 contacts the second inner peripheral surface 112c of the fluid cylinder 112. The third gate GT3 is closed in a state where the seal member 122 contacts the inner peripheral surface 112e of the fluid cylinder 112. This prevents the substantially incompressible fluid from flowing from the second chamber C2 to the first chamber C1, causing the second cylinder 104 to stop moving upwardly relative to the first cylinder 102 and to be fixedly positioned relative to the first cylinder 102 at a position corresponding to the third overall length L31 (FIG. 22) after the movable member 114 moves from the first open position P11 to the closed position P10. Accordingly, when the operated member 16 of the bicycle operating device 10 is moved to the first operated position P1, the second cylinder 104 can upwardly move relative to the first cylinder 102 from the minimum overall length L3 to the third overall length L31 defined by the recess 312a.

Figure 26:
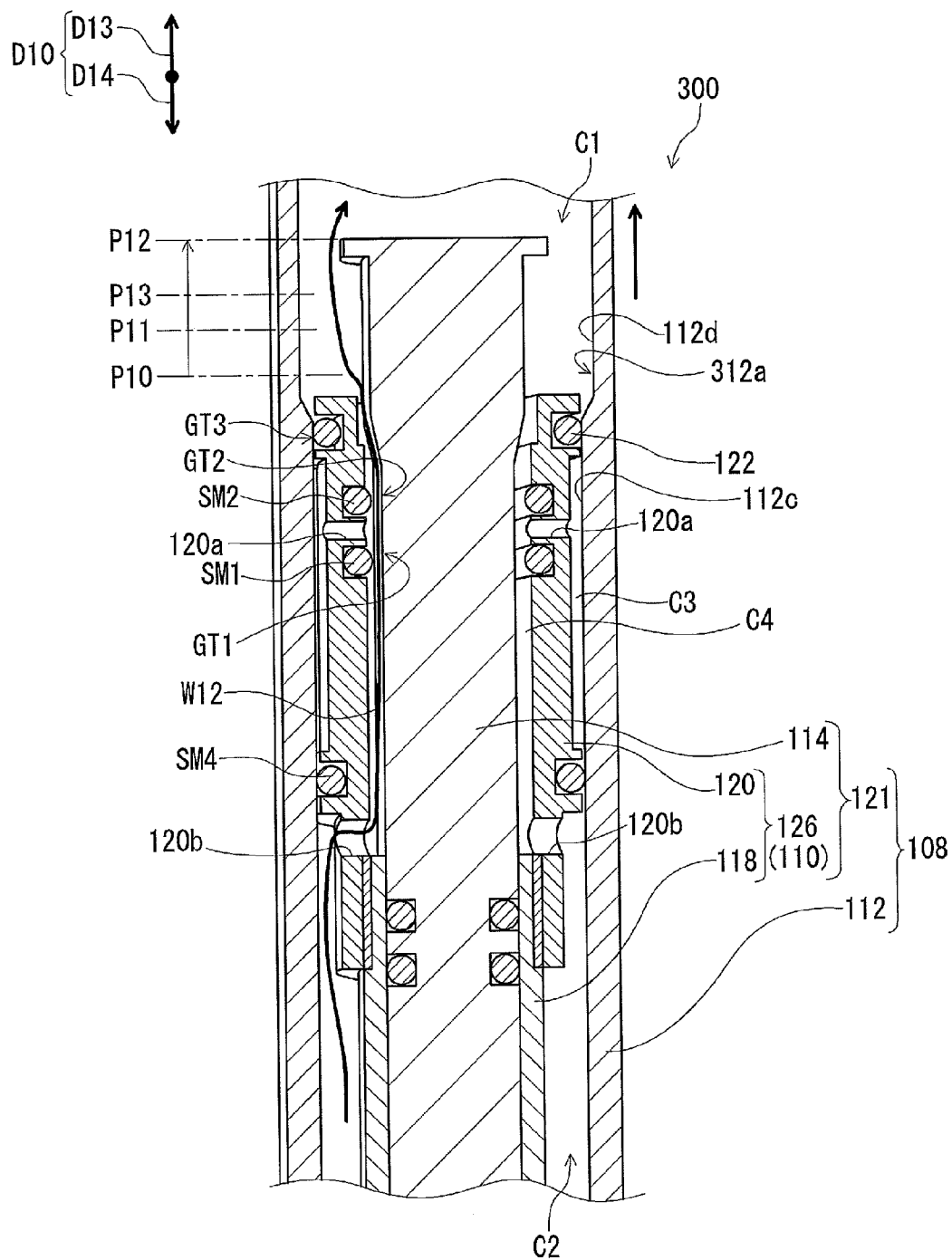
FIG. 26 is a partial cross-sectional view of the bicycle seatpost assembly illustrated in FIG. 22 (the second open position)

As seen FIG. 26, in a state where the movable member 114 is positioned at the second open position P12, the first chamber C1 is in communication with the second chamber C2 via the second intermediate chamber C4 and the second through-holes 120b. This allows the substantially incompressible fluid to flow from the second chamber C2 to the first chamber C1 via the second passageway W12, allowing the second cylinder 104 to be upwardly moved relative to the first cylinder 102 with pressure of the compressible fluid (e.g., air) filled in the biasing chamber C30 (FIG. 22).

At this time, the substantially incompressible fluid flows from the second chamber C2 to the first chamber C1 without via the first intermediate chamber C3. Accordingly, a relative position between the first cylinder 102 and the second cylinder 104 can be continuously adjusted using the bicycle operating device 10 regardless of the recess 312a.

As well as the bicycle seatpost assembly 100, the first gate GT1 and the second gate GT2 are open in a state where the movable member 114 is disposed at the third open position P13 (FIGS. 23 to 25) different from the first open position P11 and the second open position P12 relative to the support member 110. In this state, since the second cross-sectional area A12 (FIG. 17) is smaller than the first cross-sectional area A11 (FIG. 16), fluid resistance caused by the second gate GT2 having the second cross-sectional area A12 is greater than fluid resistance caused by the second gate GT2 having the first cross-sectional area A11. Thus, the second cross-sectional area A12 of the second gate GT2 reduces the relative movement speed between the first cylinder 102 and the second cylinder 104 compared with the first cross-sectional area A11 of the second gate GT2. This allows the user to finely adjust the overall length of the bicycle seatpost assembly 300.

With the bicycle seatpost assembly 300, it is possible to obtain the same advantageous effect as that of the bicycle seatpost assembly 100 in accordance with the first embodiment.

Figure 27:
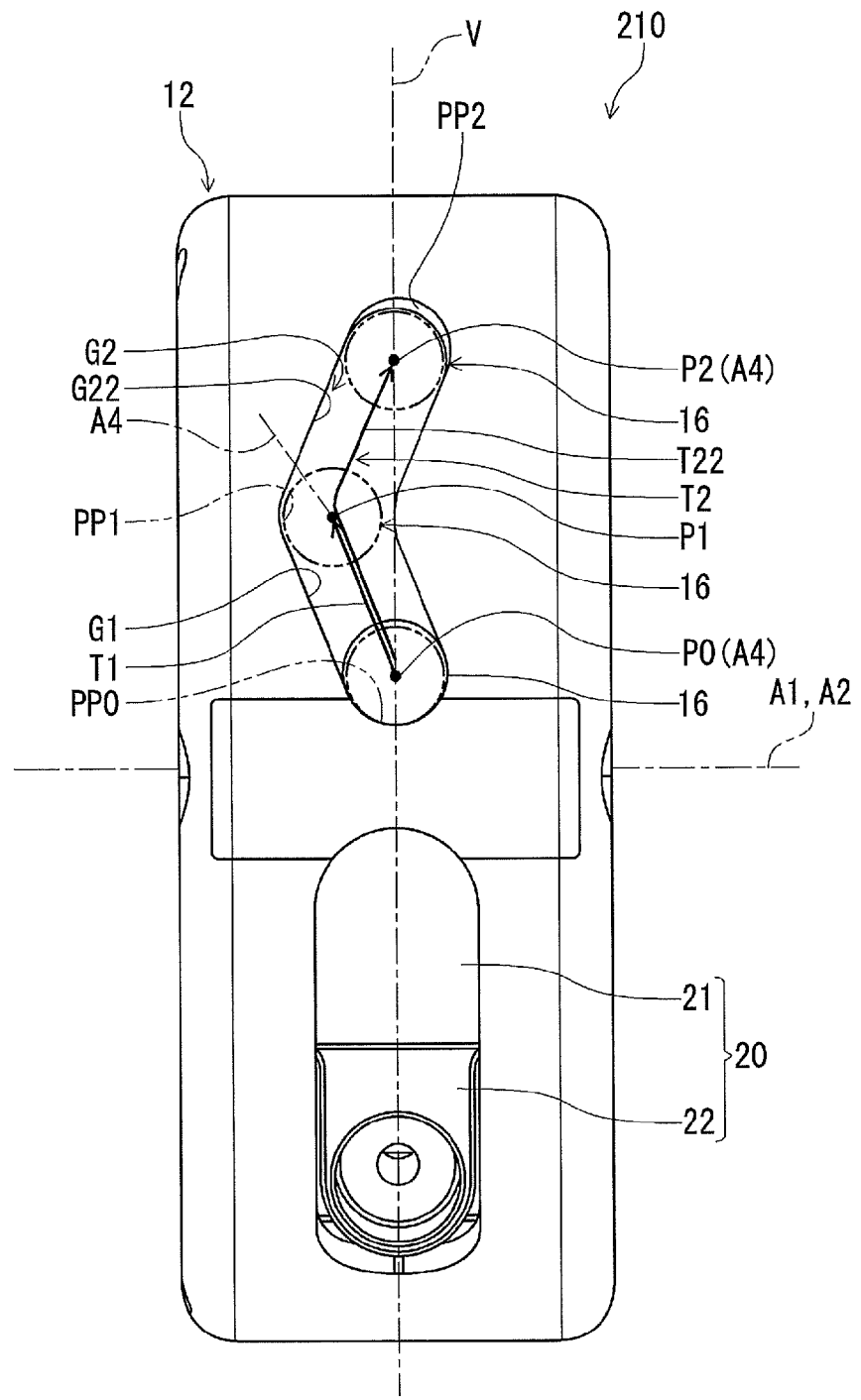
FIG. 27 is an elevational view of a bicycle operating device in accordance with a modified embodiment.

A bicycle operating device 210 as illustrated in FIG. 27 can be used for the bicycle seatpost assembly 100 or 300 instead of the bicycle operating device 10. The bicycle operating device 210 has substantially the same configuration as the bicycle operating device 10 except for a shape of the guide opening. Thus, elements having substantially the same function as those in the first embodiment will be numbered the same here, and will not be described and/or illustrated again in detail here for the sake of brevity.

In the bicycle operating device 210, the second path T2 is at least partially different from the first path T1. In the illustrated embodiment, the second path T2 is partially different from the first path T1 and is partially the same as the first path T1. The second path T2 includes the first path T1 and an additional path T22. The additional path T22 is defined from the first operated position P1 to the second operated position P2.

At least one of the first operated position P1 and the second operated position P2 is spaced apart from the virtual plane V. In the illustrated embodiment, the second operated position P2 is disposed on the virtual plane V while the first operated position P1 is spaced apart from the virtual plane V.

The second guide portion G2 is configured to guide the operated member 16 between the rest positioning portion PP0 and the second positioning portion PP2. In the illustrated embodiment, the second guide portion G2 includes the first guide portion G1 and an additional guide portion G22. The additional guide portion G22 is configured to guide the operated member 16 between the first positioning portion PP1 and the second positioning portion PP2. The first guide portion G1 is configured to allow the operated member 16 to be moved from the first operated position P1 to the second operated position P2 without via the rest position P0.

With the bicycle operating device 210, the operation cable 2 can be pulled by each of the first amount of movement M1 (FIG. 6) and the second amount of movement M2 (FIG. 7) in response to operations of a single operated member (i.e., the operated member 16). This allows the structure of the bicycle operating device 210 to be simplified as well as the bicycle operating device 10 in accordance with the first embodiment.

Third Embodiment

A bicycle seatpost assembly 400 in accordance with a third embodiment will be described below referring to FIGS. 28 to 31. The bicycle seatpost assembly 400 has substantially the same configuration as the bicycle seatpost assembly 100 except for the adjusting structure 124. Thus, elements having substantially the same function as those in the above embodiments will be numbered the same here, and will not be described and/or illustrated again in detail here for the sake of brevity.

Figure 28:
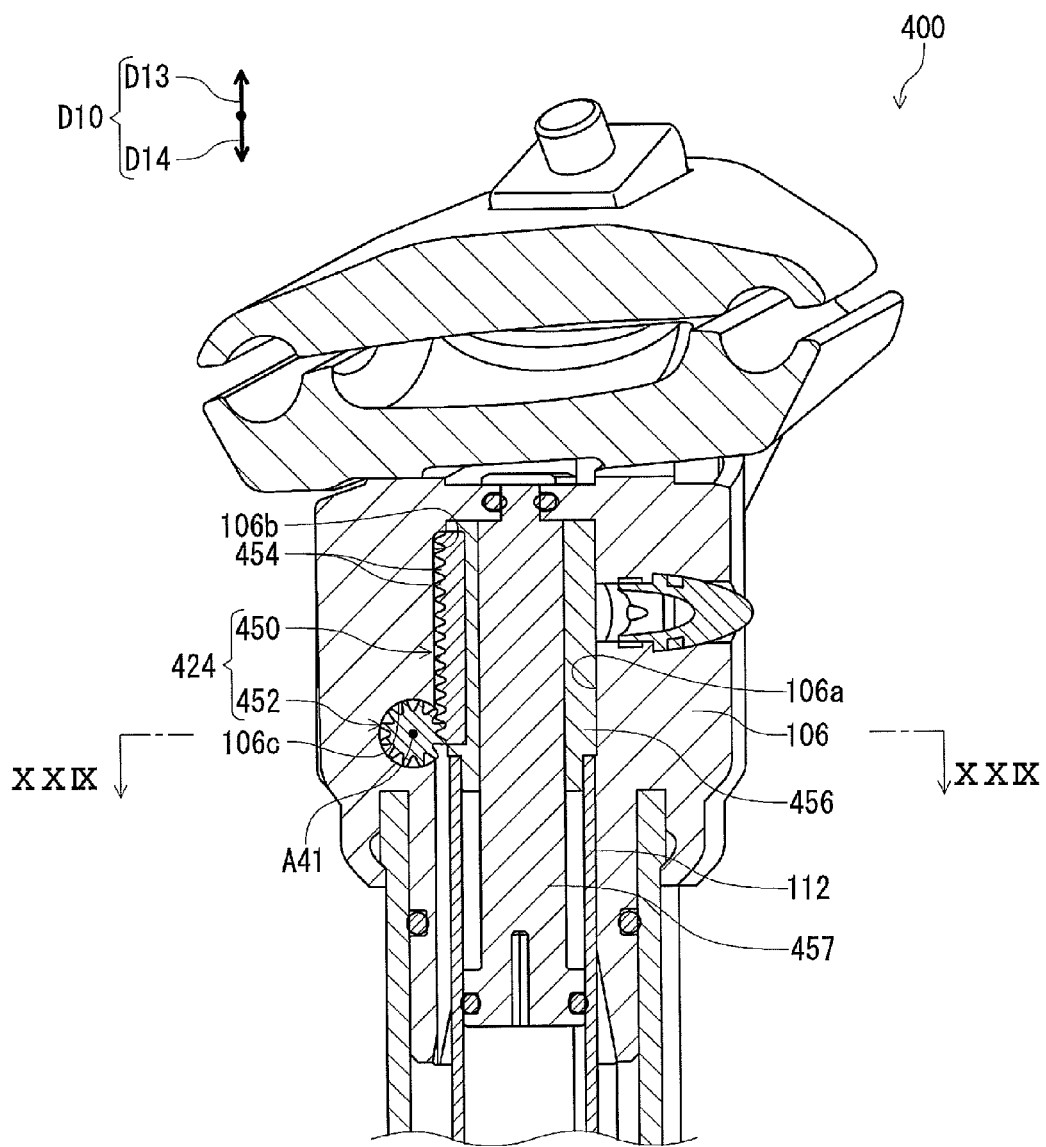
FIG. 28 is a partial cross-sectional view of a bicycle seatpost assembly in accordance with a third embodiment.

As seen in FIG. 28, the bicycle seatpost assembly 400 comprises an adjusting structure 424. Unlike the adjusting structure 124 in the first embodiment, the adjusting structure 424 is configured to change the position of the second positioning member 112 relative to the second cylinder 104. In the illustrated embodiment, the adjusting structure 424 is configured to adjust the position of the fluid cylinder 112 relative to the additional attachment end 106.

The adjusting structure 424 includes a rack 450 and a pinion gear 452. The rack 450 includes teeth 454 and is secured to the fluid cylinder 112. In the illustrated embodiment, a tubular member 456 is secured to an end of the fluid cylinder 112. The rack 450 is secured to the tubular member 456. The fluid cylinder 112, the rack 450, and the tubular member 456 are movable relative to the additional attachment end 106 in the telescopic direction D10.

Figure 29:
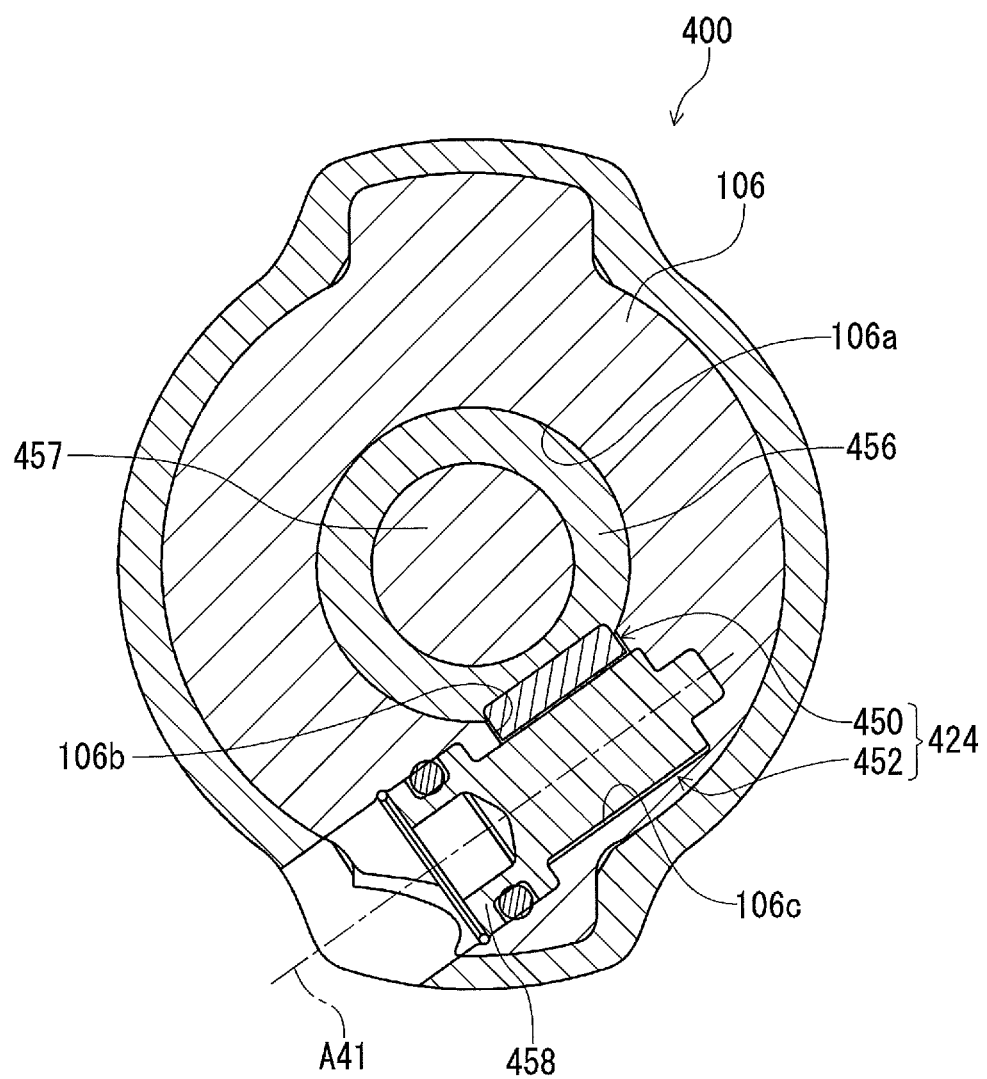
FIG. 29 is a cross-sectional view of the bicycle seatpost assembly taken along line XXIX-XXIX of FIG. 28.

As seen in FIGS. 28 and 29, the additional attachment end 106 includes a first guide hole 106a extending in the telescopic direction D10. The fluid cylinder 112 and the tubular member 456 are provided in the first guide hole 106a. The additional attachment end 106 includes a guide groove 106b extending in the telescopic direction D10. The rack 450 is provided in the guide groove 106b.

As seen in FIG. 28, the bicycle seatpost assembly 400 includes a guide member 457 provided in the fluid cylinder 112 and the tubular member 456. The guide member 457 is secured to the additional attachment end 106 to guide the fluid cylinder 112 and the tubular member 456. An upper end of the tubular member 456 is contactable with the additional attachment end 106 in the telescopic direction D10. A lower end of the tubular member 456 is contactable with the guide member 457 in the telescopic direction D10. The additional attachment end 106 and the guide member 457 define a movable range in which the fluid cylinder 112 is movable relative to the second cylinder 104 in the telescopic direction D10 by the adjusting structure 424.

As seen in FIGS. 28 and 29, the pinion gear 452 is configured to engage with the teeth 454 of the rack 450 to position the fluid cylinder 112 relative to the additional attachment end 106. The pinion gear 452 is rotatable relative to the additional attachment end 106 about a rotational axis A41. The additional attachment end 106 includes a second guide hole 106c extending in a direction different from the telescopic direction D10.

Figure 30:
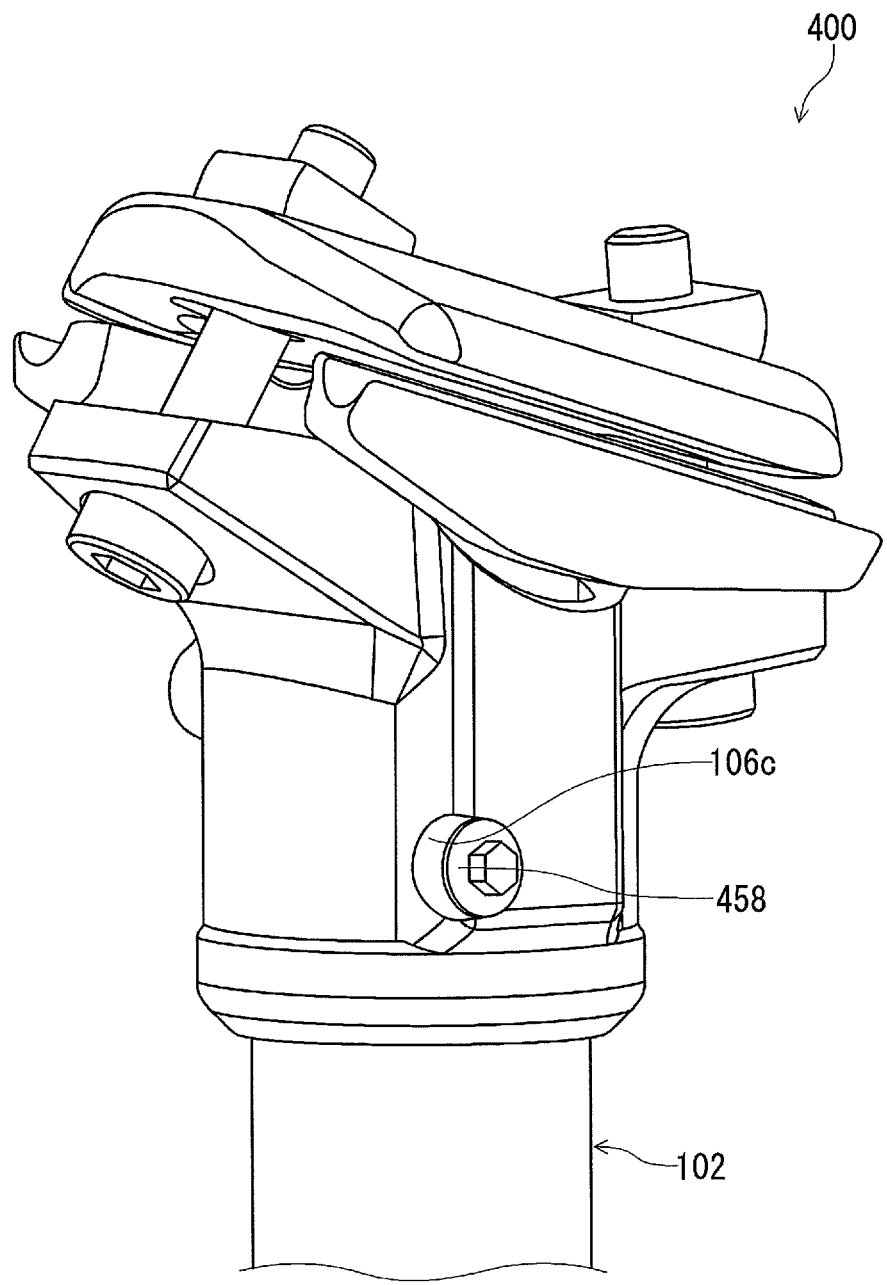
FIG. 30 is a partial perspective view of the bicycle seatpost assembly illustrated in FIG. 28.

As seen in FIGS. 29 and 30, the pinion gear 452 includes a tool engagement end 458 with which a tool is to be engaged. Examples of the tool include a hexagon wrench. Rotation of the pinion gear 452 relative to the additional attachment end 106 moves the fluid cylinder 112 relative to the second cylinder 104 via the rack 450.

Figure 31:
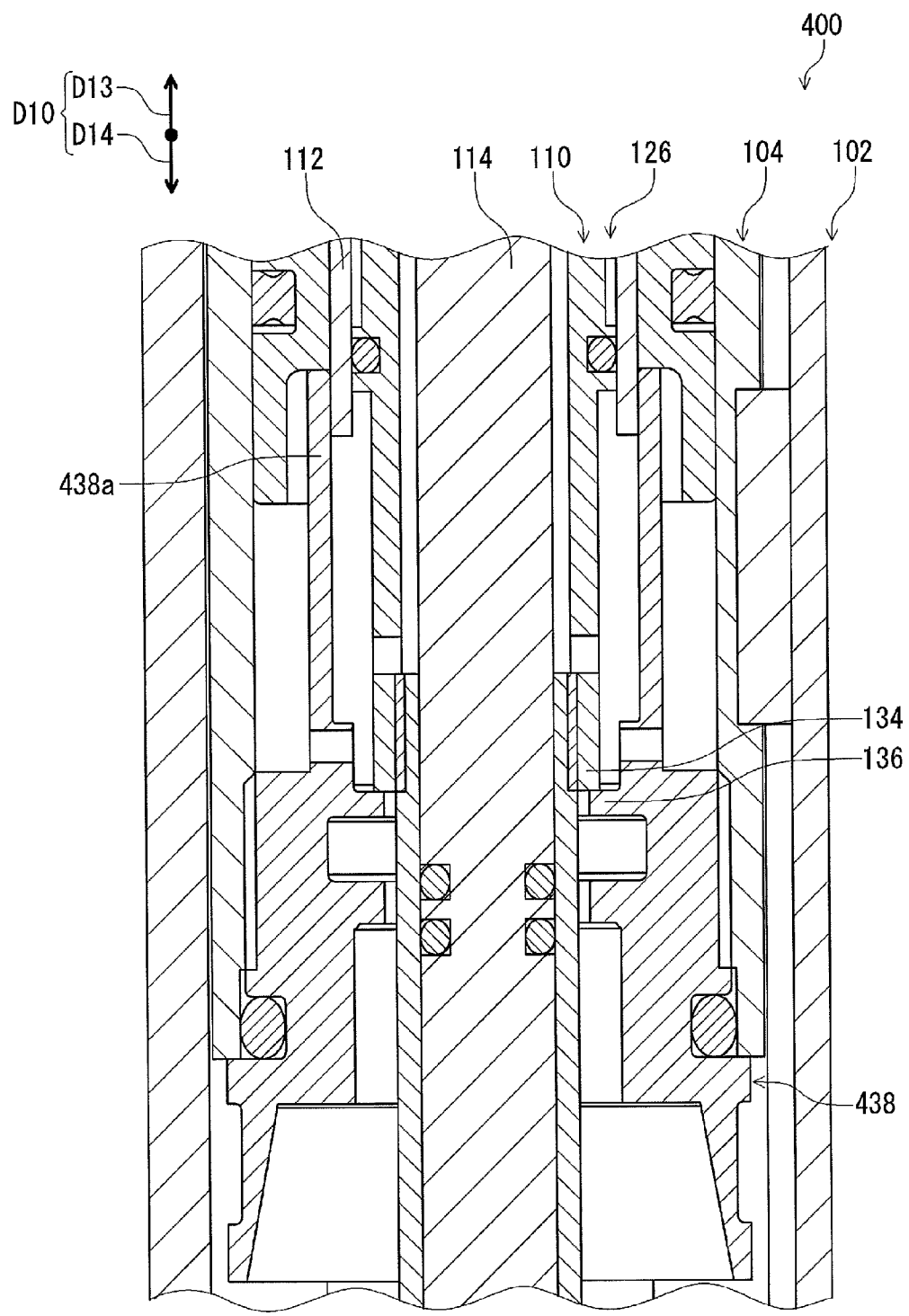
FIG. 31 is a partial cross-sectional view of the bicycle seatpost assembly illustrated in FIG. 28.

As seen in FIG. 31, in the illustrated embodiment, the positioning structure 108 includes a sealing structure 438. While the sealing structure 438 has substantially the same structure as that of the sealing structure 138, the sealing structure 438 includes a tubular portion 438a. The tubular portion 438a has a length longer than a length of the tubular portion 138a of the sealing structure 138 in the first embodiment (FIG. 21). An end of the fluid cylinder 112 is movably provided in the tubular portion 438a. The sealing structure 438 movably supports the fluid cylinder 112.

As seen in FIGS. 28 and 31, for example, when the fluid cylinder 112 moves relative to the second cylinder 104 in the shortening direction D14 using the pinion gear 452, the fluid cylinder 112 moves relative to the first positioning member 126 in the shortening direction D14. This moves the recess 112a of the fluid cylinder 112 relative to the seal member 122 in the shortening direction D14 (FIG. 11), making the first adjustable position range AR1 (FIG. 10) shorter. At this time, the second adjustable position range AR2 of the bicycle seatpost assembly 400 is constant since a position of the second abutment 136 is not changed relative to the second cylinder 104.

When the fluid cylinder 112 moves relative to the second cylinder 104 in the extending direction D13 using the pinion gear 452, the fluid cylinder 112 moves relative to the first positioning member 126 in the extending direction D13. This moves the recess 112a of the fluid cylinder 112 relative to the seal member 122 in the extending direction D13 (FIG. 11), making the first adjustable position range AR1 of the bicycle seatpost assembly 400 longer. At this time, the second adjustable position range AR2 of the bicycle seatpost assembly 400 is constant since a position of the second abutment 136 is not changed relative to the second cylinder 104.

Unlike the bicycle seatpost assembly 100 in accordance with the first embodiment, the volume of the first chamber C1 is not affected or little affected by the movement of the fluid cylinder 112. Accordingly, when the position of the fluid cylinder 112 is adjusted relative to the second cylinder 104, the movable member 114 can be positioned at the closed position P10 to close the first gate GT1 and the second gate GT2.

With the bicycle seatpost assembly 400, the adjusting structure 424 is configured to adjust at least one of the first adjustable position range AR1 and the second adjustable position range AR2. In the illustrated embodiment, the adjusting structure 424 is configured to adjust the first adjustable position range AR1. Accordingly, it is possible to change the adjustable position range of the bicycle seatpost assembly 400 to suit the needs and/or preferences of the user.

Fourth Embodiment

A bicycle seatpost assembly 500 in accordance with a fourth embodiment will be described below referring to FIG. 32. The bicycle seatpost assembly 500 has substantially the same configuration as the bicycle seatpost assembly 100 except for the adjusting structure 124. Thus, elements having substantially the same function as those in the above embodiments will be numbered the same here, and will not be described and/or illustrated again in detail here for the sake of brevity.

Figure 32:
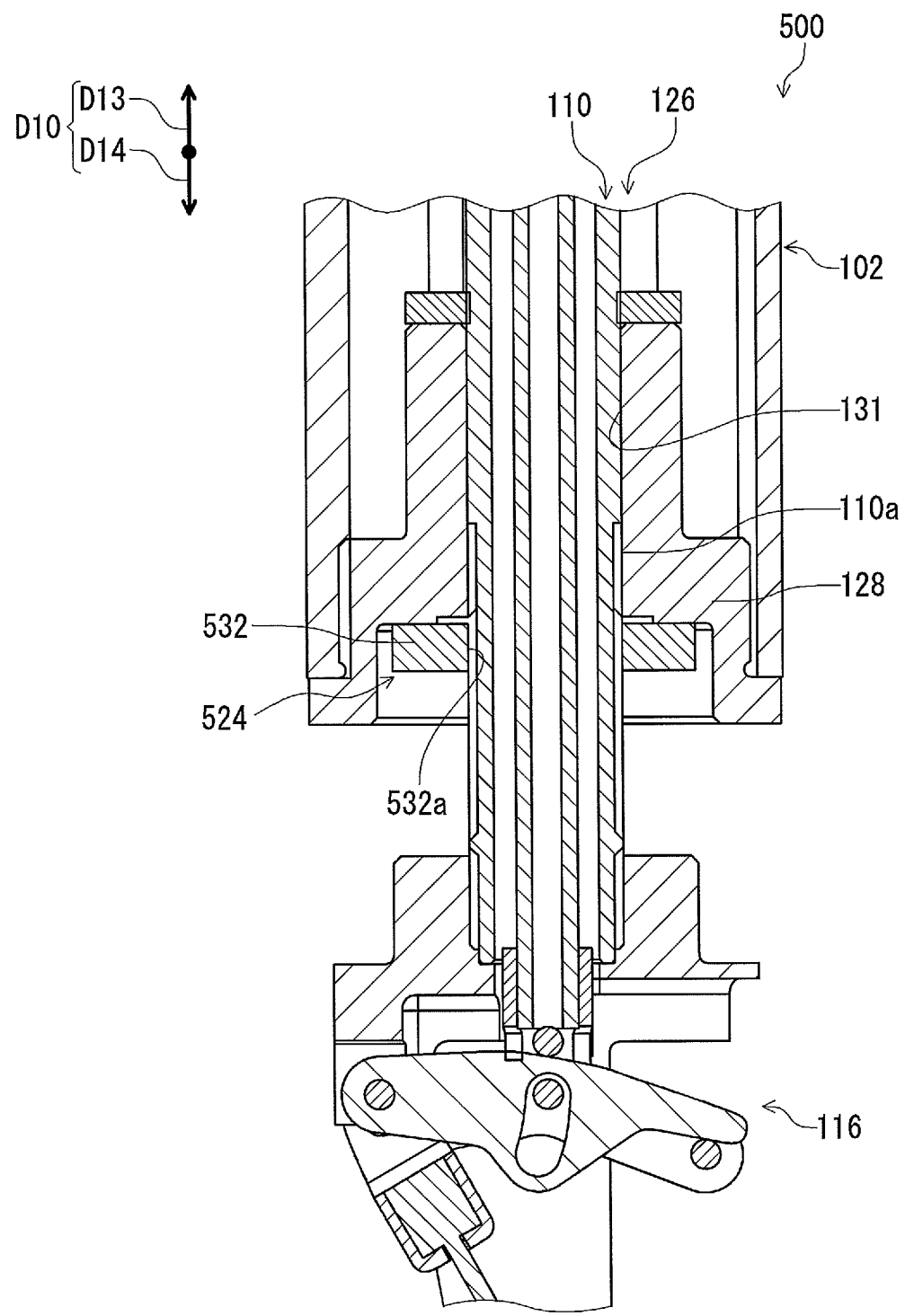
FIG. 32 is a partial cross-sectional view of a bicycle seatpost assembly in accordance with a fourth embodiment.

As seen in FIG. 32, the bicycle seatpost assembly 500 comprises an adjusting structure 524. Unlike the adjusting structure 124 in the first embodiment, the adjusting structure 524 includes a lock member 532 configured to lock the support member 110 relative to the attachment end 128 so that a position of the support member 110 is adjustable relative to the attachment end 128. The lock member 532 is configured to be attached to the support member 110 so that a position of the lock member 532 relative to the support member 110 is adjustable. Specifically, the lock member 532 includes a threaded hole 532a. The externally threaded portion 110a of the support member 110 is engaged with the threaded hole 532a. In the illustrated embodiment, the lock member 532 is contactable with the attachment end 128 to lock the support member 110 relative to the attachment end 128. The lock member 532 is tightened to fixedly position the support member 110 relative to the first cylinder 102 in a state where the lock member 532 is in contact with the attachment end 128. An intermediate member such as a washer (not shown) can be provided between the lock member 532 and the attachment end 128.

With the bicycle seatpost assembly 500, it is possible to obtain substantially the same advantageous effects as those of the bicycle seatpost assembly 100 in accordance with the first embodiment.

Fifth Embodiment

A bicycle seatpost assembly 600 in accordance with a fifth embodiment will be described below referring to FIGS. 33 and 34. The bicycle seatpost assembly 600 has substantially the same configuration as the bicycle seatpost assembly 100 except for the adjusting structure 124. Thus, elements having substantially the same function as those in the above embodiments will be numbered the same here, and will not be described and/or illustrated again in detail here for the sake of brevity.

Figure 33:
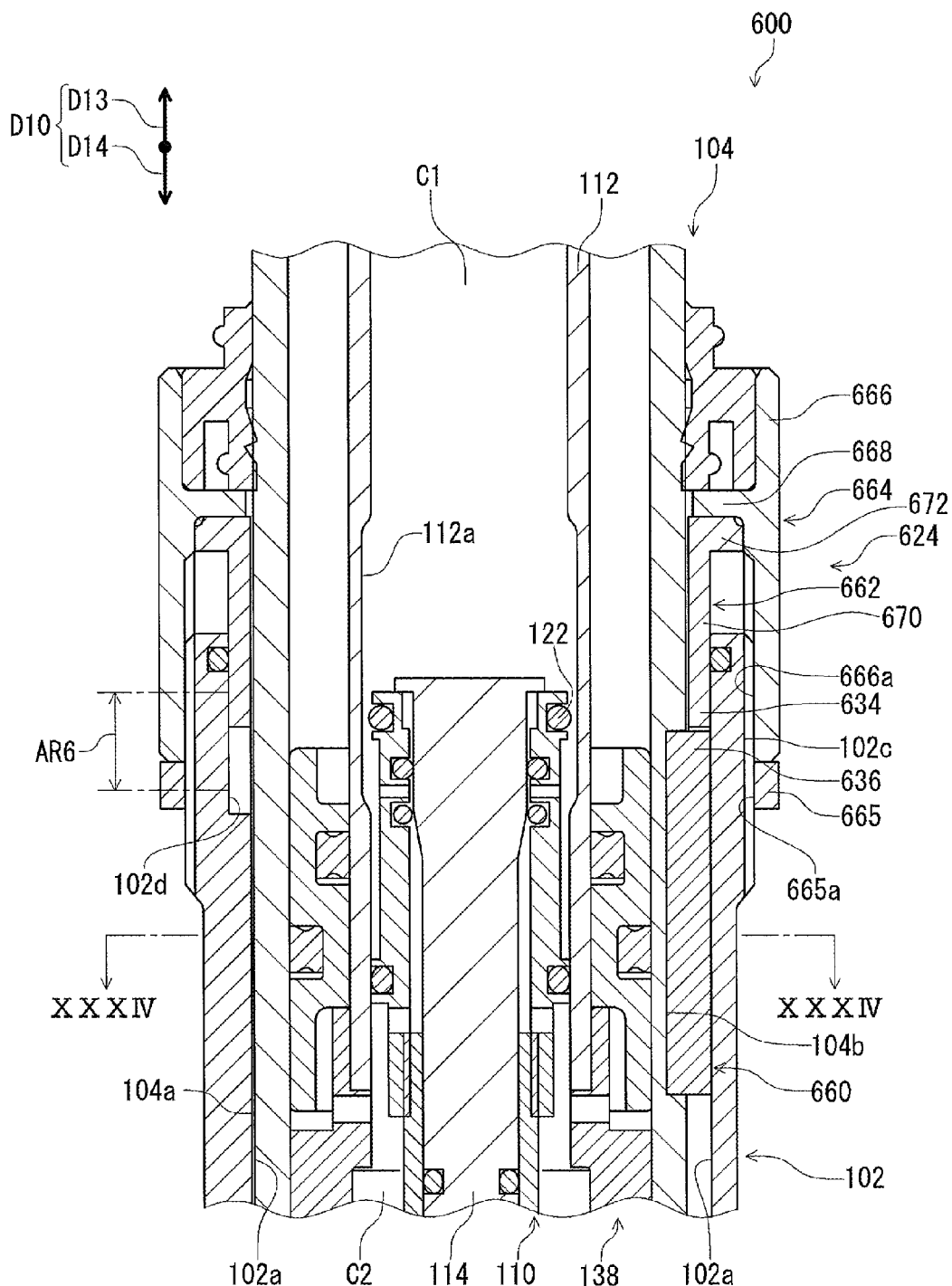
FIG. 33 is a partial cross-sectional view of a bicycle seatpost assembly in accordance with a fifth embodiment.

As seen in FIG. 33, the bicycle seatpost assembly 600 comprises a first abutment 634, a second abutment 636, and an adjusting structure 624. The first abutment 634 is configured to be coupled to the first cylinder 102. The second abutment 636 is configured to be coupled to the second cylinder 104. The second abutment 636 is configured to abut the first abutment 634 to restrict a movement of the second cylinder 104 with respect to the first cylinder 102 in the extending direction D13.

The first abutment 634 and the second abutment 636 are provided outside the second cylinder 104. The first cylinder 102 includes an inner peripheral surface 102a. The second cylinder 104 includes an outer peripheral surface 104a configured to face the inner peripheral surface 102a. The first abutment 634 is provided on the inner peripheral surface 102a of the first cylinder 102. The second abutment 636 is provided on the outer peripheral surface 104a of the second cylinder 104. The second abutment 636 is configured to radially protrude from the outer peripheral surface 104a of the second cylinder 104.

Figure 34:
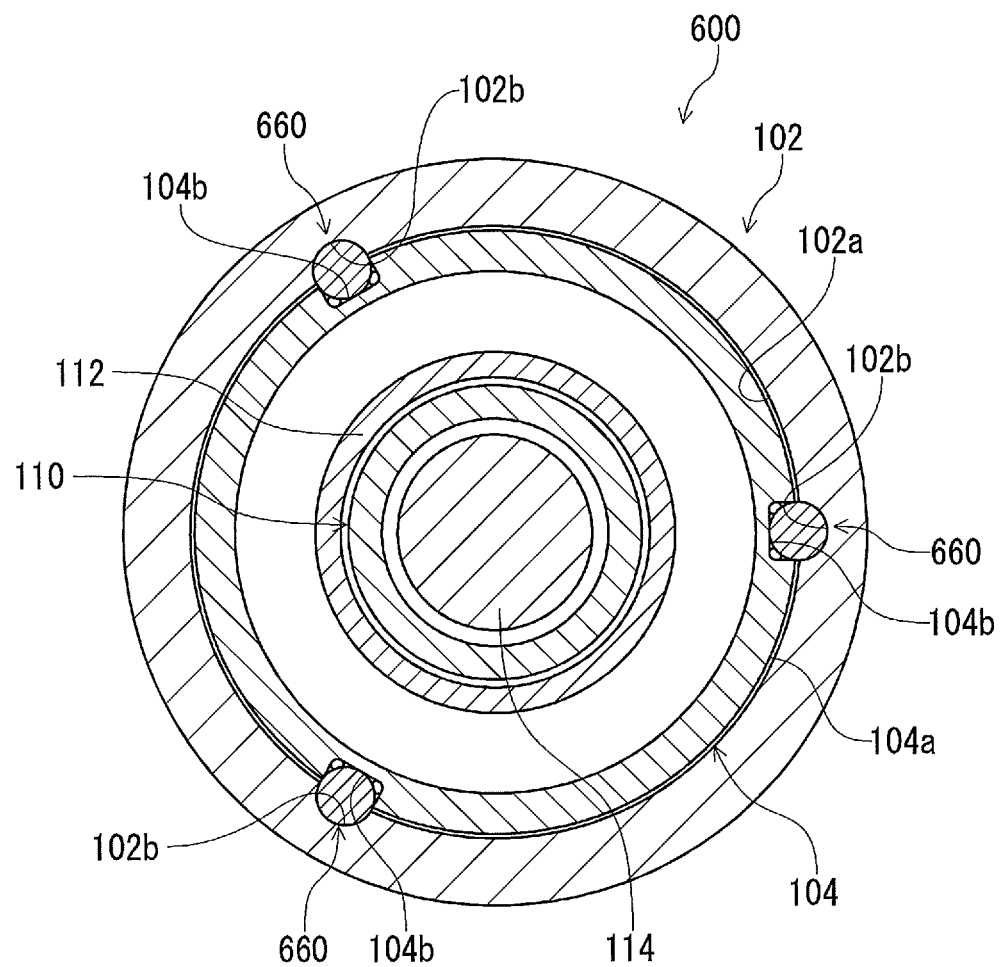
FIG. 34 is a cross-sectional view of the bicycle seatpost assembly taken along line XXXIV-XXXIV of FIG. 33.

As seen in FIG. 34, in the illustrated embodiment, the bicycle seatpost assembly 600 further comprises a restricting member 660 radially protruding from the outer peripheral surface 104a of the second cylinder 104. The first cylinder 102 includes a restricting groove 102b provided on the inner peripheral surface 102a. The restricting groove 102b extends in the telescopic direction D10. The restricting member 660 is provided in the restricting groove 102b to restrict a relative rotation between the first cylinder 102 and the second cylinder 104. The second abutment 636 is provided to the restricting member 660.

In the illustrated embodiment, the bicycle seatpost assembly 600 comprises a plurality of restricting members 660 radially protruding from the outer peripheral surface 104a of the second cylinder 104. The restricting member 660 are spaced apart from each other in a circumferential direction of the bicycle seatpost assembly 600. The restricting member 660 has a circular cross-section. The second cylinder 104 includes a plurality of attachment grooves 104b. The restricting members 660 are respectively provided in the attachment grooves 104b. The first cylinder 102 includes a plurality of restricting grooves 102b provided on the inner peripheral surface 102a. The restricting members 660 are respectively provided in the restricting grooves 102b.

As seen in FIG. 33, the adjusting structure 624 is configured to adjust one of a position of the first abutment 634 relative to the first cylinder 102 and a position of the second abutment 636 relative to the second cylinder 104. In the illustrated embodiment, the adjusting structure 624 is configured to adjust a position of the first abutment 634 relative to the first cylinder 102.

The adjusting structure 624 includes a stopper 662 attached to an end of the first cylinder 102 to be contactable with the second abutment 636. The first abutment 634 is provided to the stopper 662. The adjusting structure 624 is configured to adjust a position of the first abutment 634 relative to the first cylinder 102 via the stopper 662 in the telescopic direction D10.

In the illustrated embodiment, the adjusting structure 624 includes a cover 664 and a lock ring 665. The cover 664 is configured to be detachably attached to the end of the first cylinder 102. The cover 664 has an annular shape. The lock ring 665 is configured to lock the cover 664 relative to the first cylinder 102.

The cover 664 includes a cover body 666 and an annular portion 668. The annular portion 668 extends radially inwardly from the cover body 666. The cover body 666 has a tubular shape and includes an internally threaded part 666a. The lock ring 665 includes a threaded hole 665a. The first cylinder 102 includes an externally threaded part 102c configured to be engaged with the internally threaded part 666a and threaded hole 665a. The lock ring 665 is to fixedly position the cover 664 relative to the first cylinder 102. An intermediate member such as a washer (not shown) can be provided between the cover 664 and the lock ring 665.

The stopper 662 is attached to the cover 664 via adhesive, for example. The stopper 662 includes a tubular body 670 and a flange 672. The first cylinder 102 includes an annular recess 102d. The tubular body 670 is provided in the annular recess 102d. The flange 672 extends radially outwardly from the tubular body 670. The flange 672 is attached to the annular portion 668 of the cover 664 via adhesive. The restricting grooves 102b are connected to the annular recess 102d. The restricting member 660 is contactable with the stopper 662 in the telescopic direction D10. Namely, the second abutment 636 is configured to abut the first abutment 634 in the telescopic direction D10. The maximum overall length L0 of the bicycle seatpost assembly 600 is defined in a state where the second abutment 636 abuts the first abutment 634.

Rotation of the cover 664 relative to the first cylinder 102 moves the cover 664 and the stopper 662 relative to the first cylinder 102 in the telescopic direction D10. Tightening the lock ring 665 locks the cover 664 and the stopper 662 at an adjusted position relative to the first cylinder 102. This allows the position of the first abutment 634 to be adjusted within a predetermined adjustable range to change the second adjustable position range AR2 of the bicycle seatpost assembly 600.

Furthermore, the change in the position of the first abutment 634 changes the position of the seal member 122 within the adjustable range AR6 relative to the recess 112a of the fluid cylinder 112. This changes the first adjustable position range AR1 of the bicycle seatpost assembly 600. In the bicycle seatpost assembly 600, the support member 110 is not contactable with the sealing structure 138. The first abutment 134 is not provided to the support member 110. The second abutment 136 is not provided to the sealing structure 138.

With the bicycle seatpost assembly 600, the adjusting structure 624 is configured to adjust at least one of the first adjustable position range AR1 and the second adjustable position range AR2. In the illustrated embodiment, the adjusting structure 624 is configured to adjust the first adjustable position range AR1 and the second adjustable position range AR2. Accordingly, it is possible to change the adjustable position range of the bicycle seatpost assembly 600 to suit the needs and/or preferences of the user.

Sixth Embodiment

A bicycle seatpost assembly 700 in accordance with a sixth embodiment will be described below referring to FIGS. 35 to 43. The bicycle seatpost assembly 700 has substantially the same configuration as the bicycle seatpost assembly 100 except for the positioning structure 108. Thus, elements having substantially the same function as those in the above embodiments will be numbered the same here, and will not be described and/or illustrated again in detail here for the sake of brevity.

The bicycle seatpost assembly 700 comprises a positioning structure 716. The positioning structure 716 has substantially the same function as that of the positioning structure 108 in accordance with the first embodiment. However, the positioning structure 716 has a structure different from the structure of the positioning structure 108.

Figure 35:
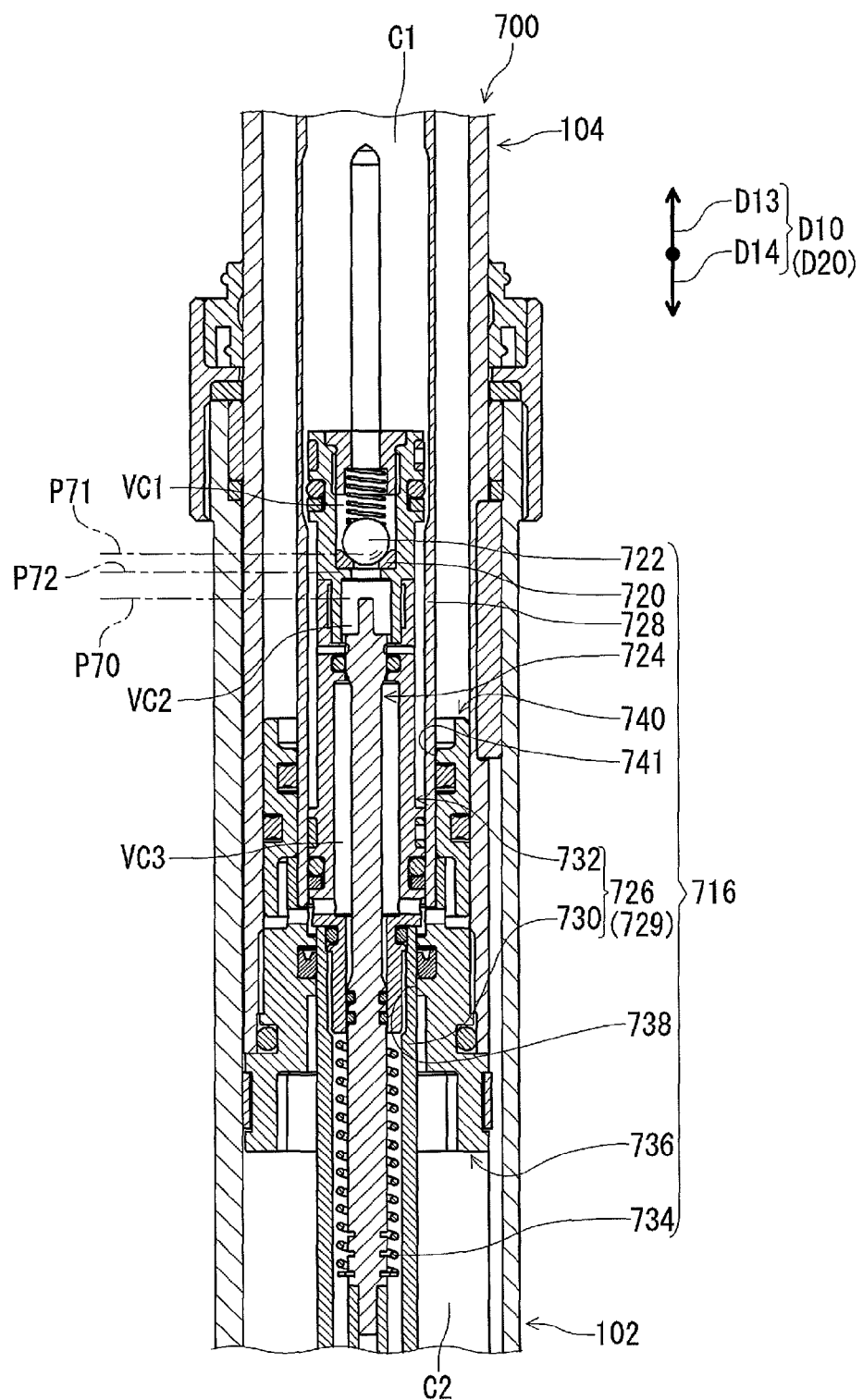
FIG. 35 is a partial cross-sectional view of a bicycle seatpost assembly in accordance with a sixth embodiment (a closed position)

As seen in FIG. 35, the positioning structure 716 includes a receiving member 720, a seal body 722, and a movable member 724. Namely, the bicycle seatpost assembly 700 comprises the receiving member 720, the seal body 722, and the movable member 724.

The positioning structure 716 includes a first positioning member 726 and a second positioning member 728. The first positioning member 726 includes a support member 729 configured to movably support the movable member 724. The support member 729 has substantially the same structure as that of the support member 110 in the first embodiment. The support member 729 has a tubular shape. The movable member 724 is movably provided in the support member 729. In the illustrated embodiment, the movable member 724 is movable relative to the support member 729 in the telescopic direction D10.

As seen in FIG. 35, the second positioning member 728 can also be referred to as a fluid cylinder 728. The fluid cylinder 728 has substantially the same structure as that of the fluid cylinder 112 in the first embodiment. The support member 729 is configured to be telescopically movable relative to the fluid cylinder 728. The support member 729 and the fluid cylinder 728 extend in the telescopic direction D10. The support member 729 is provided in the first cylinder 102. A lower end of the support member 729 is secured to the valve operating structure 116 (FIG. 10). The support member 729 is integrally movable with the first cylinder 102 relative to the second cylinder 104 in the telescopic direction D10. The fluid cylinder 728 is provided in the second cylinder 104. An upper end of the fluid cylinder 728 is secured to the seat attachment portion 106 (the additional attachment end 106 in FIG. 10). The fluid cylinder 728 is integrally movable with the second cylinder 104 relative to the first cylinder 102 in the telescopic direction D10. The support member 729 can be provided in the second cylinder 104 and the fluid cylinder 728 can be provided in the first cylinder 102 if needed and/or desired.

As seen in FIG. 35, the support member 729 includes an inner tube 730 and a valve receiving member 732. The inner tube 730 extends in the telescopic direction D10. The valve receiving member 732 is secured to an upper end of the inner tube 730 and is movably provided in the fluid cylinder 728.

The movable member 724 is movably provided in the inner tube 730 and the valve receiving member 732. The valve receiving member 732 includes a first valve chamber VC1, a second valve chamber VC2, and a third valve chamber VC3. The second valve chamber VC2 is provided between the first valve chamber VC1 and the third valve chamber VC3 in the telescopic direction D10. The seal body 722 is provided in the first valve chamber VC1. The movable member 724 is movably provided in the second valve chamber VC2 and the third valve chamber VC3.

The seal body 722, the support member 729, and the movable member 724 constitute a valve structure. The valve structure has a closed state (FIG. 36), a first open state (FIG. 37) and a second open state (FIG. 38). The closed state corresponds to the locked state of the bicycle seatpost assembly 700. The first open state corresponds to the first adjustable state of the bicycle seatpost assembly 700. The second open state corresponds to the second adjustable state of the bicycle seatpost assembly 700.

As seen in FIG. 35, the movable member 724 is configured to be positioned at a closed position P70, a first open position P71, and a second open position P72. The closed position P70, the first open position P71, and the second open position P72 are defined by a position of an upper tip end of the movable member 724 in the telescopic direction D10. In the closed state of the valve structure, the movable member 724 is positioned at the closed position P70. In the first open state of the valve structure, the movable member 724 is positioned at the first open position P71. In the second open state of the valve structure, the movable member 724 is positioned at the second open position P72.

The second open position P72 is provided between the closed position P70 and the first open position P71 in a movement direction D20 of the movable member 724. While the movement direction D20 of the movable member 724 coincides with the telescopic direction D10 of the bicycle seatpost assembly 700, the movement direction D20 can be different from the telescopic direction D10.

The positioning structure 716 includes a biasing element 734 configured to bias the movable member 724 relative to the support member 729 toward the closed position P70. The movable member 724 is configured to be positioned at the closed position P70 by a biasing force of the biasing element 734. The movable member 724 is moved from the closed position P70 toward the first open position P71 relative to the support member 729 against a biasing force of the biasing element 734. The position of the movable member 724 is continuously adjustable relative to the support member 729 between the closed position P70 and the first open position P71 using the bicycle operating device 10 (FIG. 10).

As seen in FIG. 35, the movable member 724 is positioned at the closed position P70 in a state where the operated member 16 of the bicycle operating device 10 is disposed at the rest position P0 (FIG. 10). The movable member 724 is positioned at the first open position P71 via the operation cable 2 and the valve operating structure 116 (FIG. 10) in a state where the operated member 16 of the bicycle operating device 10 is disposed at the first operated position P1 (FIG. 10). The movable member 724 is positioned at the second open position P72 via the valve operating structure 116 and the operation cable 2 in a state where the operated member 16 of the bicycle operating device 10 is disposed at the second operated position P2 (FIG. 10).

As seen in FIG. 35, the positioning structure 716 includes a sealing structure 736 having an annular shape. The sealing structure 736 is secured to a lower end of the second cylinder 104. A lower end of the fluid cylinder 728 is secured to the sealing structure 736. Namely, the fluid cylinder 728 and the sealing structure 736 are integrally movable with the second cylinder 104 relative to the first cylinder 102 in the telescopic direction D10. The sealing structure 736 includes a guide hole 738 extending in the telescopic direction D10. The support member 729 extends through the guide hole 738 of the sealing structure 736 in the telescopic direction D10.

The positioning structure 716 includes a piston 740 having an annular shape. The piston 740 is provided between the second cylinder 104 and the fluid cylinder 728 in a radial direction of the piston 740. The piston 740 includes a guide hole 741 extending in the telescopic direction D10. The fluid cylinder 728 extends through the guide hole 741 of the piston 740 in the telescopic direction D10. The piston 740 is movable relative to the second cylinder 104 and the fluid cylinder 728 in the telescopic direction D10.

As seen in FIG. 35, the positioning structure 716 includes the first chamber C1 and the second chamber C2. The first chamber C1 is defined by the support member 729, the fluid cylinder 728, and the seat attachment portion 106 (FIG. 10). The second chamber C2 is defined by the first cylinder 102, the support member 729, the sealing structure 736, and the valve operating structure 116 (FIG. 10). The first chamber C1 is filled with a substantially incompressible fluid (e.g., oil), for example. The second chamber C2 is in communication with an outside of the bicycle seatpost assembly 700, for example.

Figure 36:
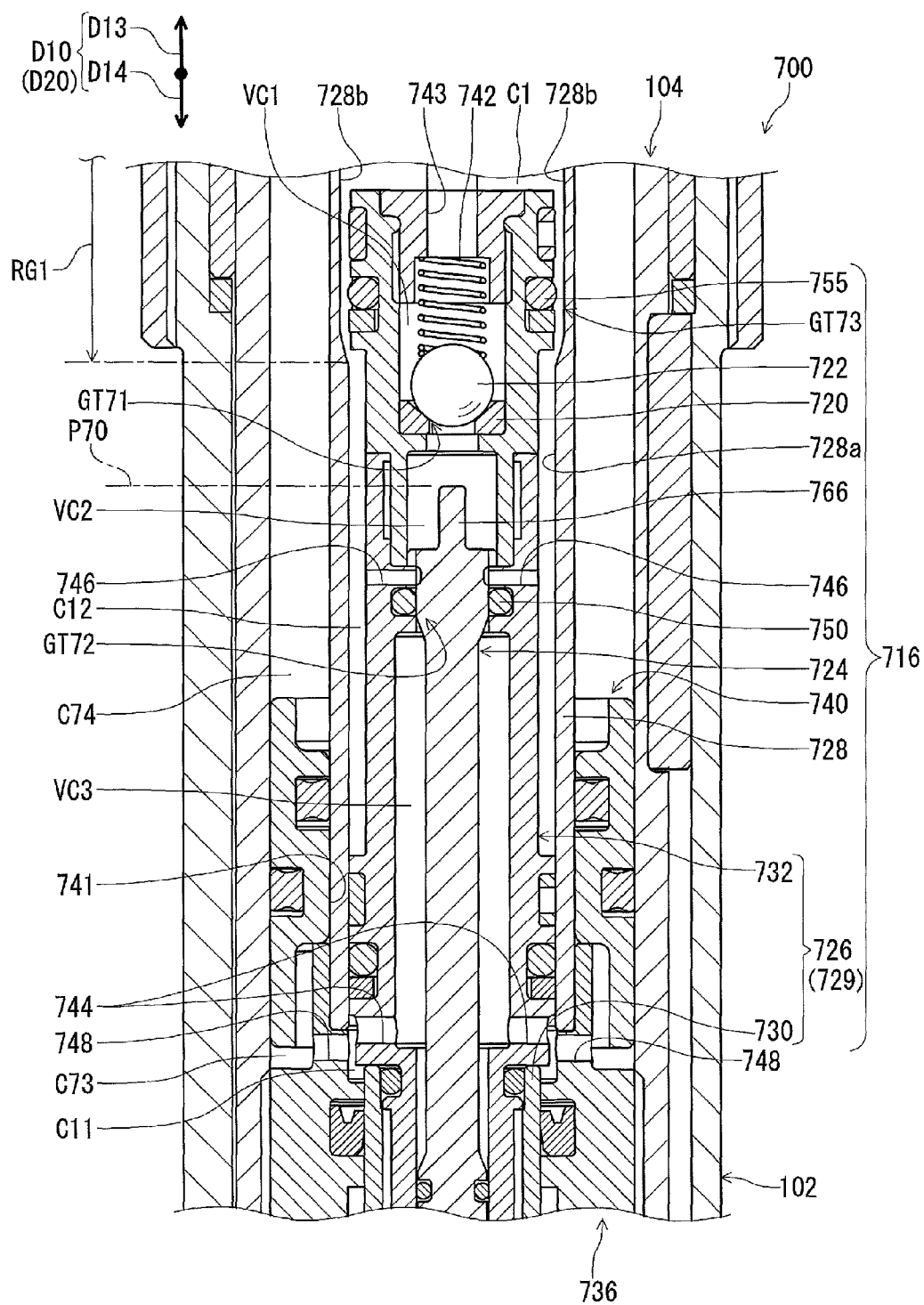
FIG. 36 is an enlarged partial cross-sectional view of the bicycle seatpost assembly illustrated in FIG. 35 (the closed position)

As seen in FIG. 36, a third chamber C73 is defined by the second cylinder 104, the fluid cylinder 728, the sealing structure 736, and the piston 740. A first intermediate chamber C11 is defined by the fluid cylinder 728, the support member 729, and the sealing structure 736. A second intermediate chamber C12 is defined by the support member 729 and the fluid cylinder 728. Each of the third chamber C73, the first intermediate chamber C11, and the second intermediate chamber C12 is filled with the substantially incompressible fluid (e.g., oil), for example.

A biasing chamber C74 is defined by the second cylinder 104, the fluid cylinder 728, the piston 740, and the seat attachment portion 106 (FIG. 10). A compressible fluid (e.g., air or gas other than air) is filled in the biasing chamber C74. The biasing chamber C74 is configured to apply a biasing force to the piston 740 so that the second cylinder 104 upwardly moves relative to the first cylinder 102 in the telescopic direction D10. The compressible fluid is compressed in the biasing chamber C74 in a state where the overall length of the bicycle seatpost assembly 700 is the maximum overall length L0 (FIG. 10).

As seen in FIG. 36, the movable member 724 is a separate member from the seal body 722. The seal body 722 is provided on an opposite side of the movable member 724 relative to the receiving member 720. The movable member 724 is spaced apart from the seal body 722 in the telescopic direction D10 in the closed state where the movable member 724 is disposed at the closed position P70. The receiving member 720 is provided between the seal body 722 and the movable member 724 in the telescopic direction D10 in the closed state where the movable member 724 is disposed at the closed position P70. While the movable member 724 is a separate member from the seal body 722, the movable member 724 can be integrally provided with the seal body 722 as a single unitary member so as to move together with the seal body 722.

As seen in FIG. 36, the positioning structure 716 includes a valve biasing member 742 configured to bias the seal body 722 toward the receiving member 720 so that the spherical surface 722a (FIG. 41) is in contact with the receiving member 720. The movable member 724 is configured to move the seal body 722 relative to the receiving member 720 against a biasing force of the valve biasing member 742 to open a first gate GT71. The seal body 722 is provided between the receiving member 720 and the valve biasing member 742 in the telescopic direction D10. The seal body 722 is provided between the movable member 724 and the valve biasing member 742 in the telescopic direction D10. The valve biasing member 742 is provided in the first valve chamber VC1. While the valve biasing member 742 is a spring, the valve biasing member 742 can be a biasing member other than the spring.

Figure 37:
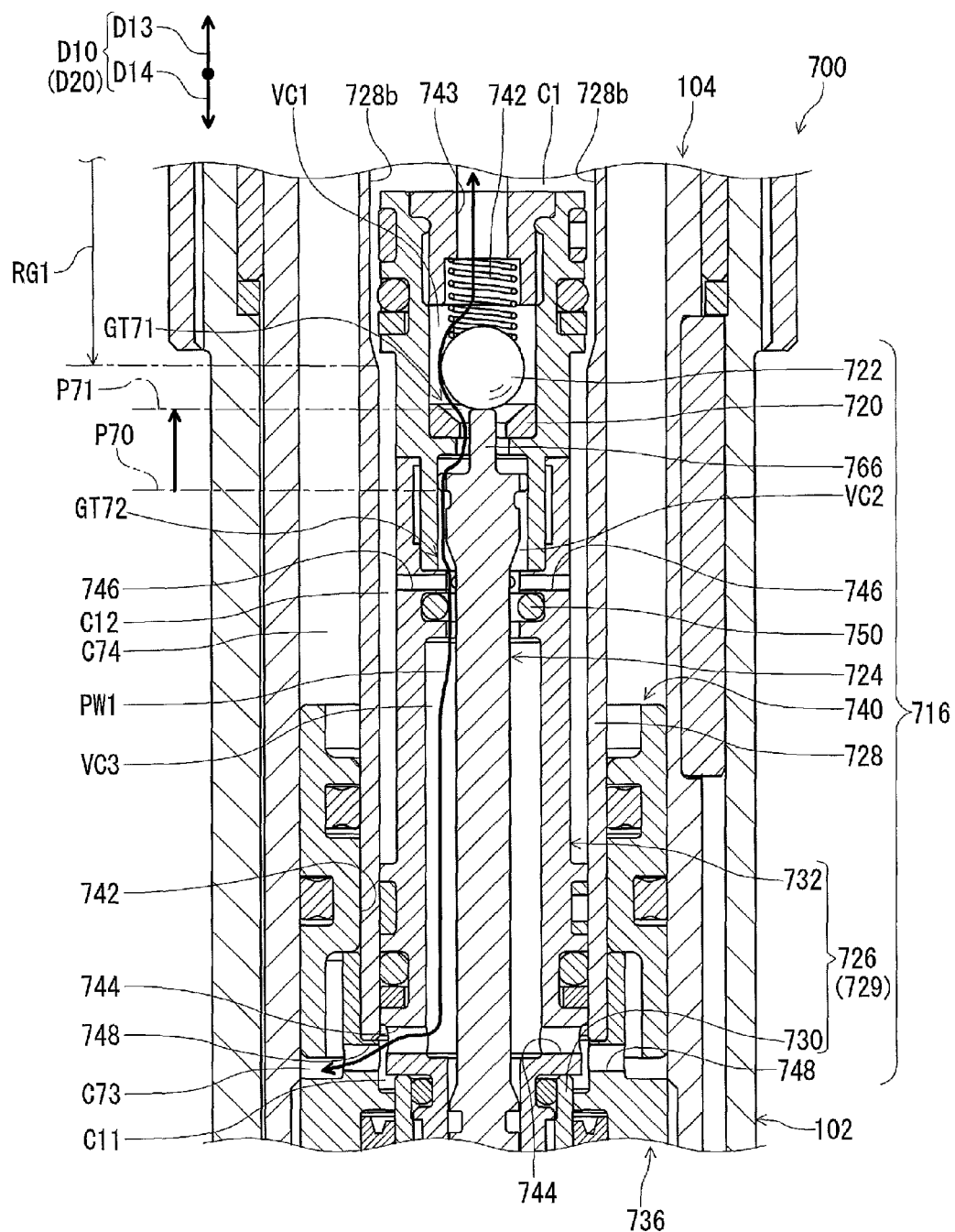
FIG. 37 is an enlarged partial cross-sectional view of the bicycle seatpost assembly illustrated in FIG. 35 (a first open position)
Figure 38:
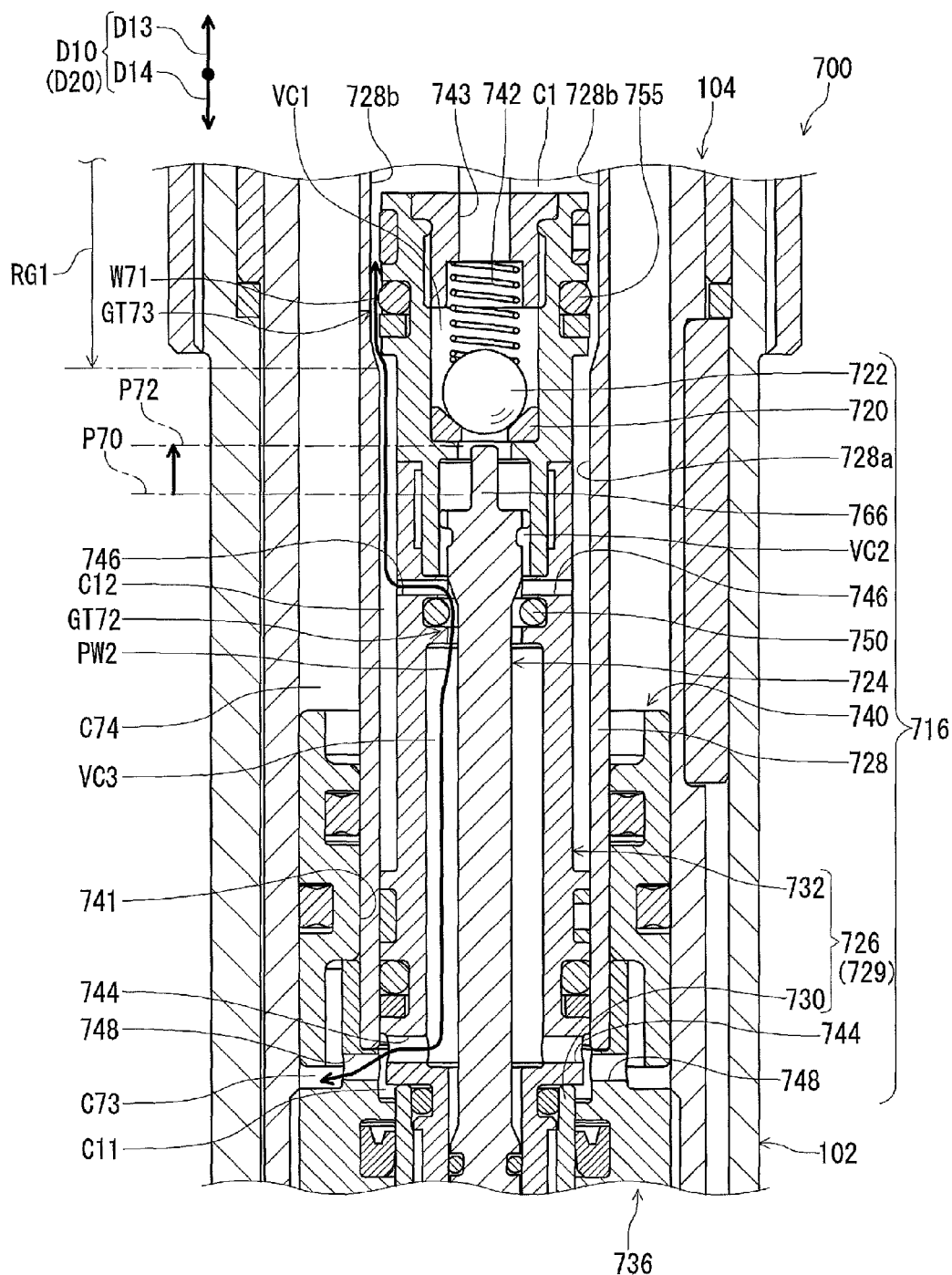
FIG. 38 is an enlarged partial cross-sectional view of the bicycle seatpost assembly illustrated in FIG. 35 (a second open position)

As seen in FIGS. 36 and 37, the seal body 722 is configured to provide the first gate GT71 of a first passageway PW1 together with the receiving member 720. The seal body 722 is contactable with the receiving member 720 to close the first gate GT71. The movable member 724 is configured to move the seal body 722 relative to the receiving member 720 to open the first gate GT71. The first valve chamber VC1 is in communication with the second valve chamber VC2 via the first gate GT71 in a state where the first gate GT71 is open.

The movable member 724 is movable relative to the support member 729 between the closed position P70 where the seal body 722 is in contact with the receiving member 720 to close the first gate GT71, and the first open position P71 where the movable member 724 moves the seal body 722 so that the seal body 722 is spaced apart from the receiving member 720 to open the first gate GT71.

In the illustrated embodiment, the movable member 724 is configured to press the seal body 722 to move away from the receiving member 720 so that the first gate GT71 is open. The movable member 724 can be configured to pull the seal body 722 to move away from the receiving member 720 if needed and/or desired. In such an embodiment, for example, the seal body 722 is provided on the same side as the movable member 724 relative to the receiving member 720.

As seen in FIG. 37, the first passageway PW1 is configured to connect the first chamber C1 to the third chamber C73. More specifically, the support member 729 includes a first through-hole 743, second through-holes 744, and third through-holes 746. The first through-hole 743 is configured to connect the first chamber C1 to the first valve chamber VC1. The second through-holes 744 are configured to connect the third valve chamber VC3 to the first intermediate chamber C11. The third through-holes 746 are configured to connect the third valve chamber VC3 to the second intermediate chamber C12. The sealing structure 736 includes fourth through-holes 748 configured to connect the first intermediate chamber C11 to the third chamber C73. The first passageway PW1 includes the first through-hole 743, the first to third valve chambers VC1 to VC3, the second through-holes 744, the first intermediate chamber C11, and the fourth through-holes 748.

As seen in FIG. 36, the positioning structure 716 includes a seal element 750. The movable member 724 is contactable with the seal element 750. The seal element 750 is provided between the second valve chamber VC2 and the third valve chamber VC3. As seen in FIG. 38, the seal element 750 is configured to provide a second gate GT72 of a second passageway PW2 together with the movable member 724. The second valve chamber VC2 is in communication with the third valve chamber VC3 via the second gate GT72 in a state where the second gate GT72 is open. In the illustrated embodiment, the seal element 750 is a seal ring such as an O-ring made of elastic material such as rubber.

As seen in FIGS. 36 and 38, the movable member 724 is movable relative to the support member 729 between the closed position P70 where the movable member 724 is in contact with the seal element 750 to close the second gate GT72, and the second open position P72 where the movable member 724 is spaced apart from the seal element 750 to open the second gate GT72.

As seen in FIG. 38, the second passageway PW2 is at least partially provided radially outward of the support member 729. In the illustrated embodiment, the second passageway PW2 is at least partially provided radially outward of the support member 729 in the movement direction D20 of the movable member 724. The second passageway PW2 includes the second intermediate chamber C12, the third through-holes 746, the third valve chamber VC3, the second through-holes 744, the first intermediate chamber C11, and the fourth through-holes 748.

The movable member 724 is configured to be provided at the second open position P72 so that the seal body 722 is in contact with the receiving member 720 to close the first gate GT71. The movable member 724 is spaced apart from the seal body 722 in a state where the movable member 724 is disposed at the second open position P72.

As seen in FIG. 37, the movable member 724 is configured to be provided at the first open position P71 so that the movable member 724 is spaced apart from the seal element 750 to open the second gate GT72. The first gate GT71 and the second gate GT72 are open so that the first passageway PW1 connects the first chamber C1 to the third chamber C73 in the state where the movable member 724 is disposed at the first open position P71. Namely, it can be said that the second gate GT72 is provided on the first passageway PW1 in addition to the first gate GT71.

Figure 39:
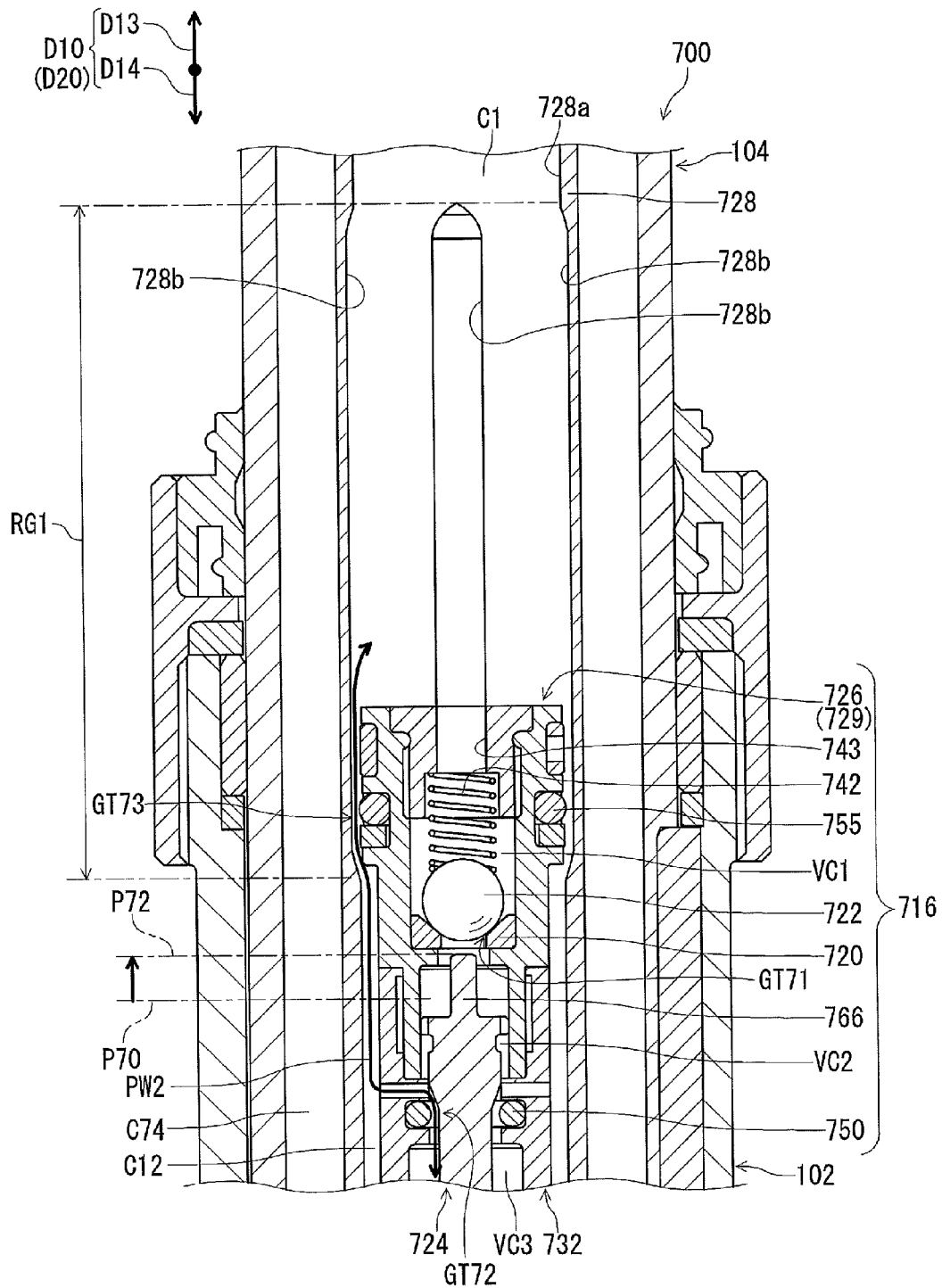
FIG. 39 is an enlarged partial cross-sectional view of the bicycle seatpost assembly illustrated in FIG. 35 (the second open position)

As seen in FIG. 39, the fluid cylinder 728 includes an inner peripheral surface 728a and recesses 728b recessed from the inner peripheral surface 728a. The positioning structure 716 includes a seal member 755 provided on an outer periphery of the support member 729. Specifically, the first positioning member 726 includes the seal member 755. In the illustrated embodiment, the seal member 755 is a seal ring such as an O-ring made of elastic material such as rubber.

The recesses 728b extend in the telescopic direction D10 and are circumferentially spaced apart from each other. The seal member 755 is contactable with the inner peripheral surface 728a of the fluid cylinder 728. The seal member 755 is configured to provide a third gate GT73 of the second passageway PW2 between the seal member 755 and the fluid cylinder 728. The third gate GT73 is open in a state where the seal member 755 is disposed within a range RG1 where the recesses 728b are provided.

Figure 40:
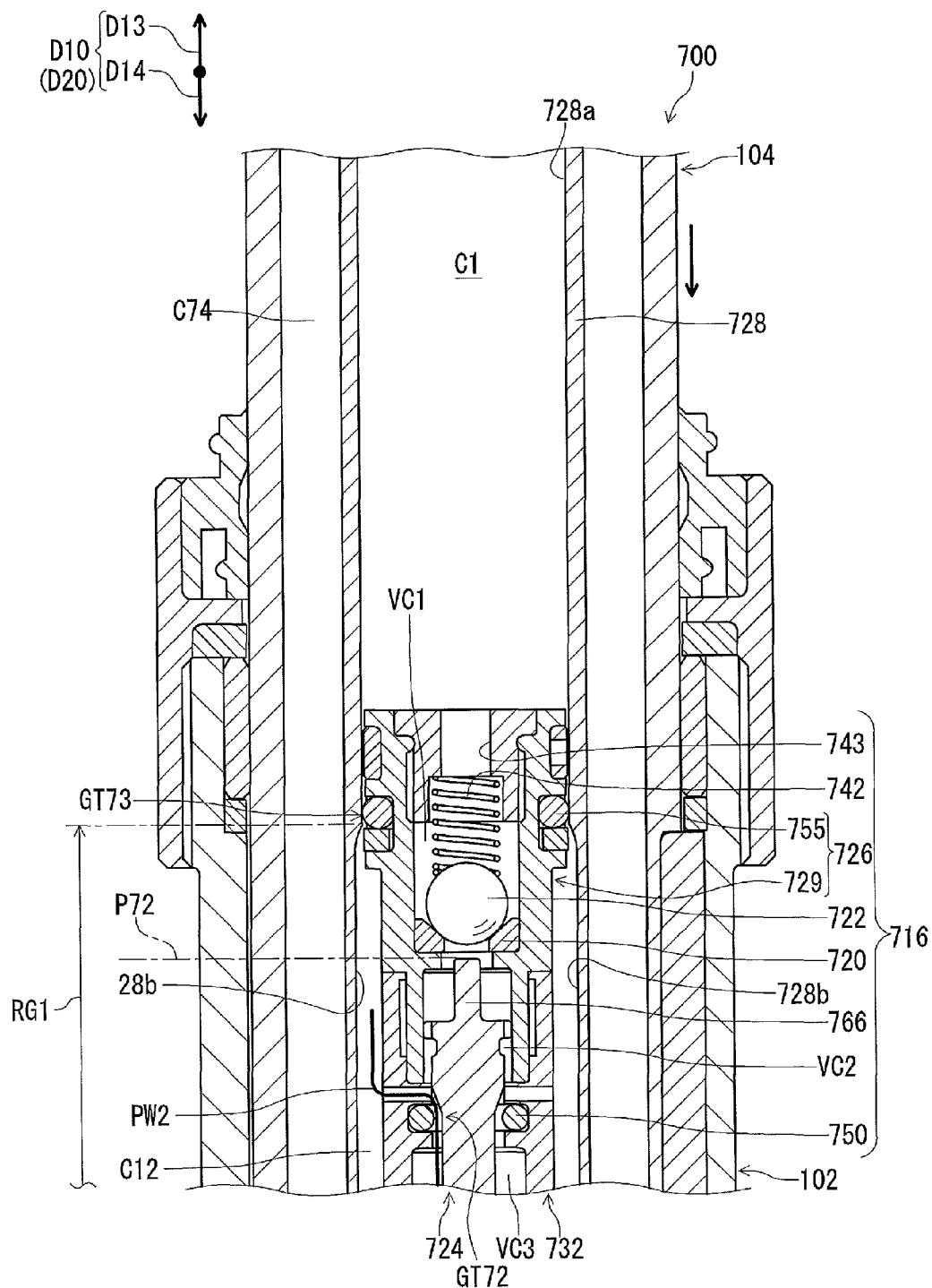
FIG. 40 is an enlarged partial cross-sectional view of the bicycle seatpost assembly illustrated in FIG. 35 (the second open position)

As seen in FIG. 40, the third gate GT73 is closed in a state where the seal member 755 is disposed outside the range RG1. For example, the seal member 755 is in contact with the inner peripheral surface 728a of the fluid cylinder 728 along an inner whole periphery of the fluid cylinder 728 in a state where the seal member 755 is disposed on an upper side of the recesses 728b. In this state, the third gate GT73 is closed so that the first chamber C1 is not in communication with the third chamber C73 via the second passageway PW2. In this state, the total length of the bicycle seatpost assembly 700 is the second overall length (intermediate length) L2 (FIG. 10).

While the recesses 728b has a shape such as a groove extending in the telescopic direction D10 in the illustrated embodiment, the recesses 728b can have shapes other than the grooves if needed and/or desired. For example, the recesses 728b can circumferentially connected with each other to provide an annular shape along the inner whole periphery of the fluid cylinder 728. Furthermore, the fluid cylinder 728 can include at least one recess 728b if needed and/or desired.

Figure 41:
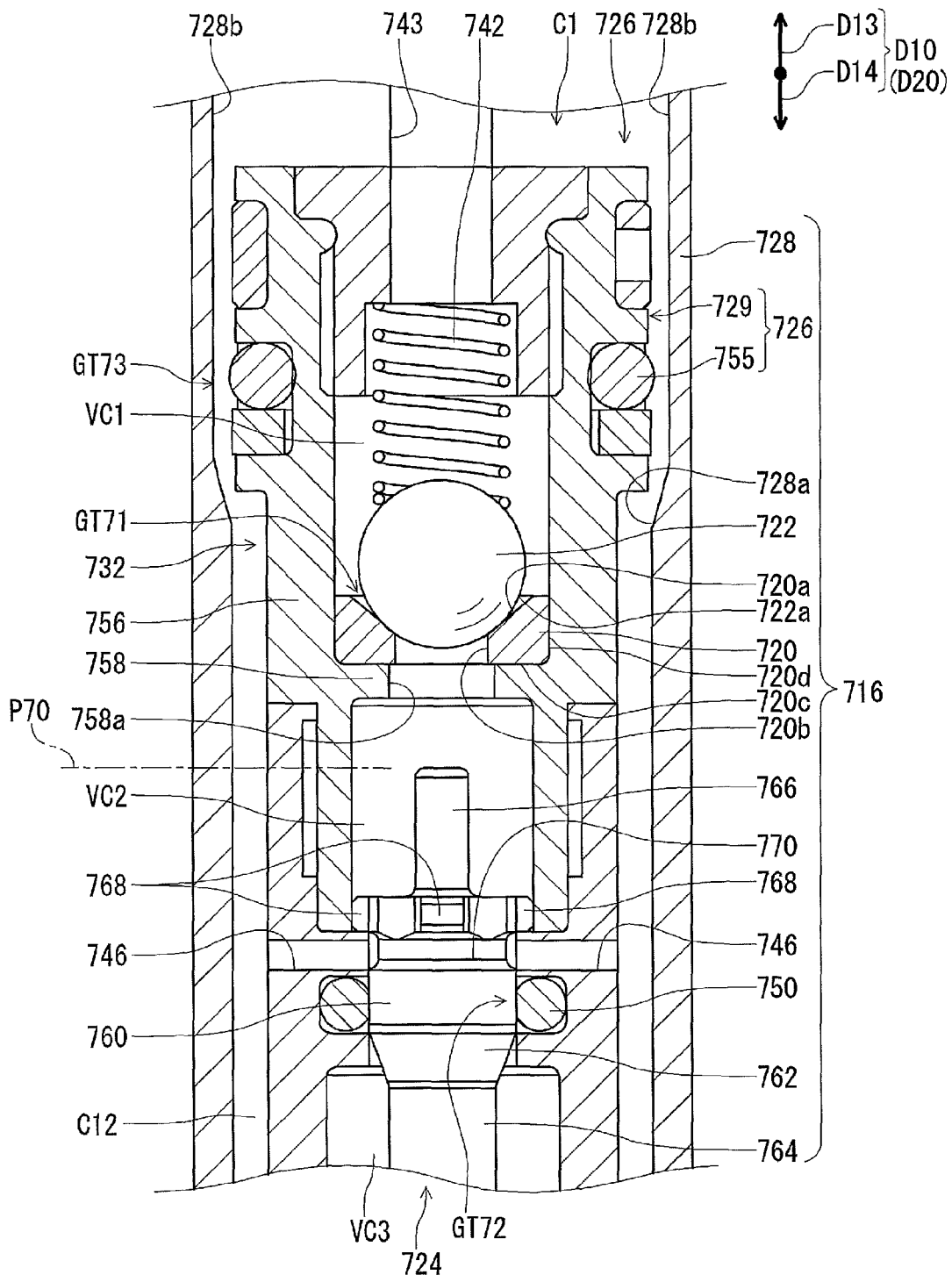
FIG. 41 is an enlarged partial cross-sectional view of the bicycle seatpost assembly illustrated in FIG. 35 (the closed position)

As seen in FIG. 41, the seal body 722 includes a spherical surface 722a contactable with the receiving member 720 to close the first gate GT71. In the illustrated embodiment, the seal body 722 is a sphere. In the present application, the term "spherical surface" can encompass a complete spherical surface and an ellipsoidal spherical surface, and the term "sphere" can encompass a complete sphere and an ellipsoidal sphere. In the illustrated embodiment, the spherical surface 722a is a complete spherical surface, and the seal body 722 is a complete sphere. The seal body 722 can have a shape other than the sphere if needed and/or desired.

As seen in FIG. 41, the receiving member 720 includes a tapered surface 720a contactable with the spherical surface 722a. The receiving member 720 has an annular shape. The receiving member 720 includes an opening 720b, an attachment surface 720c, and an outer peripheral surface 720d. The tapered surface 720a is opposite to the attachment surface 720c in the telescopic direction D10. The tapered surface 720a is inclined relative to the telescopic direction D10. More specifically, the tapered surface 720a is inclined relative to the telescopic direction D10 so that a distance between the tapered surface 720a and the attachment surface 720c increases from the opening 720b to the outer peripheral surface 720d. The receiving member 720 can have a shape other than the illustrated shape if needed and/or desired. The tapered surface 720a can have a spherical surface complementary to a profile of the seal body 722.

The receiving member 720 is made of a first material comprising a resin material. The seal body 722 is made of a second material comprising a metallic material. The first material can include material other than resin material in addition to the resin material. The second material can include material other than the metallic material in addition to the metallic material. Furthermore, the receiving member 720 can be made of material other than the first material. The seal body 722 can be made of material other than the second material.

As seen in FIG. 41, the receiving member 720 is a separate member from the support member 729. More specifically, the receiving member 720 is a separate member from the valve receiving member 732 of the support member 729. The receiving member 720 can be integrally provided with the support member 729 (the valve receiving member 732) if needed and/or desired.

The support member 729 includes a tubular part 756 and a flange part 758. The flange part 758 protrudes radially inward from an inner peripheral surface of the tubular part 756. The tubular part 756 and the flange part 758 define the first valve chamber VC1.

As seen in FIG. 41, the receiving member 720 is attached to the inner peripheral surface of the tubular part 756 and the flange part 758. The flange part 758 has an annular shape. The flange part 758 includes an opening 758a. The opening 758a is adjacent to the opening 720b of the receiving member 720. The openings 758a and 720b partially constitute the first passageway PW1 (FIG. 37). The openings 720b and 758a are configured to connect the first valve chamber VC1 to the second valve chamber VC2 in a state where the seal body 722 is spaced apart from the receiving member 720.

The movable member 724 includes a contact portion 760, a tapered portion 762, and a rod portion 764. The contact portion 760 is contactable with the seal element 750. The contact portion 760 is in contact with the seal element 750 to close the second gate GT72 in the closed state where the movable member 724 is disposed at the closed position P70. The rod portion 764 extends in the telescopic direction D10. The tapered portion 762 is provided between the contact portion 760 and the rod portion 764. The tapered portion 762 includes a tapered peripheral surface 762a. The tapered peripheral surface 762a is inclined relative to the telescopic direction D10 so that an outer diameter of the tapered portion 762 decreases from the contact portion 760 to the rod portion 764. The tapered peripheral surface 762a is radially spaced apart from the seal element 750 in the first or second open state where the movable member 724 is disposed at each of the first open position P71 and the second open position P72 (FIGS. 37 and 38).

As seen in FIG. 41, the movable member 724 includes a pressing portion 766 extending from the contact portion 760 toward the seal body 722 in the telescopic direction D10. The pressing portion 766 is configured to press the seal body 722 to move away from the receiving member 720 in the telescopic direction D10. More specifically, the pressing portion 766 is configured to be inserted in the openings 720b and 758a in the telescopic direction D10.

As seen in FIG. 37, the pressing portion 766 is inserted in the openings 720b and 758a in the telescopic direction D10 in the first open state where the movable member 724 is disposed at the first open position P71. As seen in FIG. 38, the pressing portion 766 is at least partially inserted in the opening 758a in the telescopic direction D10 in the second open state where the movable member 724 is disposed at the second open position P72.

As seen in FIG. 41, the movable member 724 includes protruding portions 768. The protruding portions 768 protrude radially outward from the contact portion 760. The protruding portions 768 are circumferentially spaced apart from each other about the contact portion 760. The protruding portions 768 are configured to radially support the movable member 724 relative to the support member 729.

As seen in FIG. 41, the movable member 724 includes a communication groove 770 having an annular shape. The communication groove 770 is provided on an outer peripheral surface of the contact portion 760. The communication groove 770 is configured to connect the second valve chamber VC2 to the second intermediate chamber C12 via the third through-holes 746. The communication groove 770 is arranged to radially face the third through-holes 746 in the closed state where the movable member 724 is disposed at the closed position P70. A pressure in the second valve chamber VC2 is equal to a pressure in the second intermediate chamber C12 in a state where the communication groove 770 connects the second valve chamber VC2 to the second intermediate chamber C12 via the third through-holes 746.

The operation of the bicycle seatpost assembly 700 will be described in detail below.

As seen in FIG. 36, in a state where the overall length of the bicycle seatpost assembly 700 is the maximum overall length L0 (FIG. 10), the seal member 755 is disposed radially inward of the recesses 728b of the fluid cylinder 728. In this state, the third gate GT73 is open so that the first chamber C1 is in communicate with the second intermediate chamber C12 via the third gate GT73. The first chamber C1 is in communication with the second valve chamber VC2 via the third gate GT73, the second intermediate chamber C12, and the third through-holes 746 in the closed state where the movable member 724 is positioned at the closed position P70.

As seen in FIG. 38, when the movable member 724 is moved from the closed position P70 to the second open position P72 in response to the second operation of the bicycle operating device 10, the second gate GT72 is open so that the first chamber C1 is in communication with the third chamber C73 via the second passageway PW2. This allows the substantially incompressible fluid to flow between the first chamber C1 and the third chamber C73 via the second passageway PW2.

When the rider's weight is applied to the second cylinder 104 via the seat attachment portion 106 (FIG. 10), fluid pressure increases in the first chamber C1. This causes the substantially incompressible fluid to flow from the first chamber C1 to the third chamber C73 via the second passageway PW2. At this time, the piston 740 is pressed toward the biasing chamber C74 relative to the first cylinder 102, causing the compressible fluid to be compressed in the biasing chamber C74. This allows the second cylinder 104 to be downwardly moved relative to the first cylinder 102 using the rider's weight (FIGS. 39 and 40).

On the other hand, when the rider's weight is released from the second cylinder 104, the compressible fluid compressed in the biasing chamber C74 biases the second cylinder 104 to upwardly move relative to the first cylinder 102 in the telescopic direction D10. This causes the substantially incompressible fluid to flow from the third chamber C73 to the first chamber C1 via the second passageway PW2. The second cylinder 104 is upwardly moved relative to the first cylinder 102 while the rider's weight is released from the second cylinder 104.

As seen in FIG. 36, the second gate GT72 is closed when the movable member 724 returns to the closed position P70, causing the substantially incompressible fluid to stop flowing between the first chamber C1 and the third chamber C73 via the second passageway PW2 (FIG. 38). This allows the second cylinder 104 to be positioned at any position within the second adjustable position range AR2 (FIG. 10) corresponding to the range RG1 of the recesses 728b.

As seen in FIG. 40, when the seal member 755 reaches the upper side of the recesses 728b, the seal member 755 comes in contact with the inner peripheral surface 728a of the fluid cylinder 728 along the inner whole periphery of the fluid cylinder 728. This causes the third gate GT73 to be closed so that the substantially incompressible fluid stops flowing from the first chamber C1 to the third chamber C73. This allows the second cylinder 104 to be positioned at a position corresponding to the second overall length (intermediate length) L2 (FIG. 10) relative to the first cylinder 102 by just operating the operated member 16 of the bicycle operating device 10 to the second operated position P2. The second cylinder 104 does not move relative to the first cylinder 102 in the telescopic direction D10 until the first gate GT71 is open.

Figure 42:
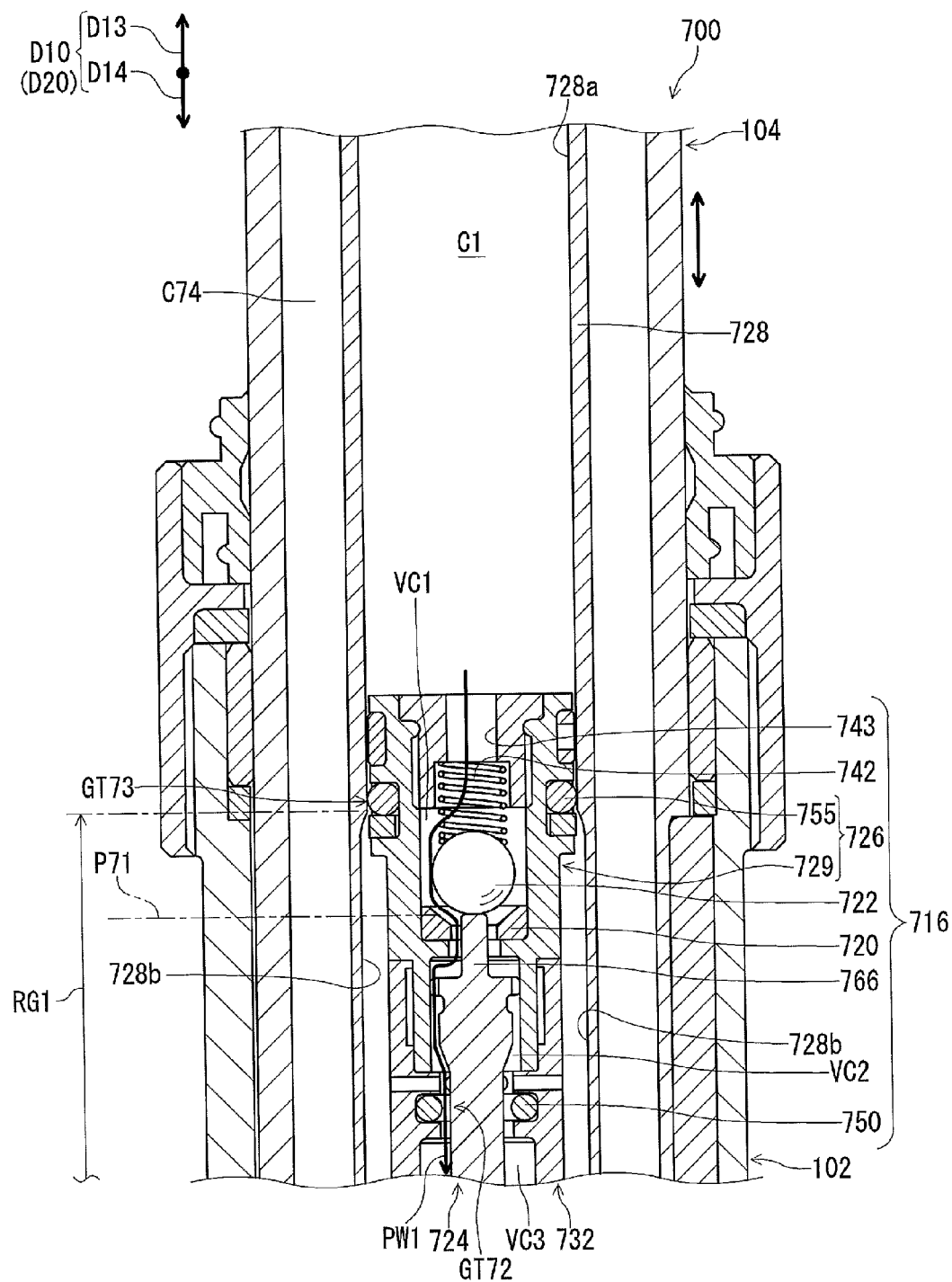
FIG. 42 is an enlarged partial cross-sectional view of the bicycle seatpost assembly illustrated in FIG. 35 (the first open position)

As seen in FIGS. 37 and 42, in the first open state where the movable member 724 is positioned at the first open position P71, the first gate GT71 and the second gate GT72 are open so that the first chamber C1 is in communication with the third chamber C73 via the first passageway PW1. This allows the substantially incompressible fluid to flow between the first chamber C1 and the second chamber C2 via the first passageway PW1 and the second passageway PW2. However, the positioning structure 716 can have such a construction that the second passageway PW2 is closed in a state where the first passageway PW1 is open.

When the rider's weight applied to the second cylinder 104, the fluid pressure increases in the first chamber C1. This causes the substantially incompressible fluid to flow from the first chamber C1 to the third chamber C73 via the first passageway PW1. At this time, the piston 740 is pressed toward the biasing chamber C74 relative to the first cylinder 102, causing the compressible fluid to be compressed in the biasing chamber C74. This allows the second cylinder 104 to be downwardly moved relative to the first cylinder 102 using the rider's weight.

On the other hand, when the rider's weight is released from the second cylinder 104, the compressible fluid compressed in the biasing chamber C74 biases the second cylinder 104 to upwardly move relative to the first cylinder 102 in the telescopic direction D10. This causes the substantially incompressible fluid to flow from the third chamber C73 to the first chamber C1 via the first passageway PW1. The second cylinder 104 is upwardly moved relative to the first cylinder 102 while the rider's weight is released from the second cylinder 104.

The first gate GT71 and the second gate GT72 are closed when the movable member 724 returns to the closed position P70 (FIG. 36), causing the substantially incompressible fluid to stop flowing between the first chamber C1 and the third chamber C73 via the first passageway PW1 (FIG. 37). Accordingly, a relative position between the first cylinder 102 and the second cylinder 104 can be continuously adjusted regardless of the recesses 728b in the first open state where the movable member 724 is disposed at the first open position P71.

As seen in FIG. 38, the support member 729 is at least partly disposed in the fluid cylinder 728 to provide a fluid passageway W71 between the support member 729 and the fluid cylinder 728. The seal member 755 is configured to block the fluid passageway W71 in a state where the total length of the bicycle seatpost assembly 700 is a first overall length (intermediate length) L1 between a maximum overall length (longest length) L0 and a minimum overall length (shortest length) L3 (FIG. 10).

The first positioning member 726 is movable together with one of the first cylinder 102 and the second cylinder 104 in the telescopic direction D10. The second positioning member 728 is movable together with the other of the first cylinder 102 and the second cylinder 104 in the telescopic direction D10. In the illustrated embodiment, the first positioning member 726 is movable together with the first cylinder 102 (FIG. 10) in the telescopic direction D10. The second positioning member 728 is movable together with the second cylinder 104 in the telescopic direction D10.

Figure 43:
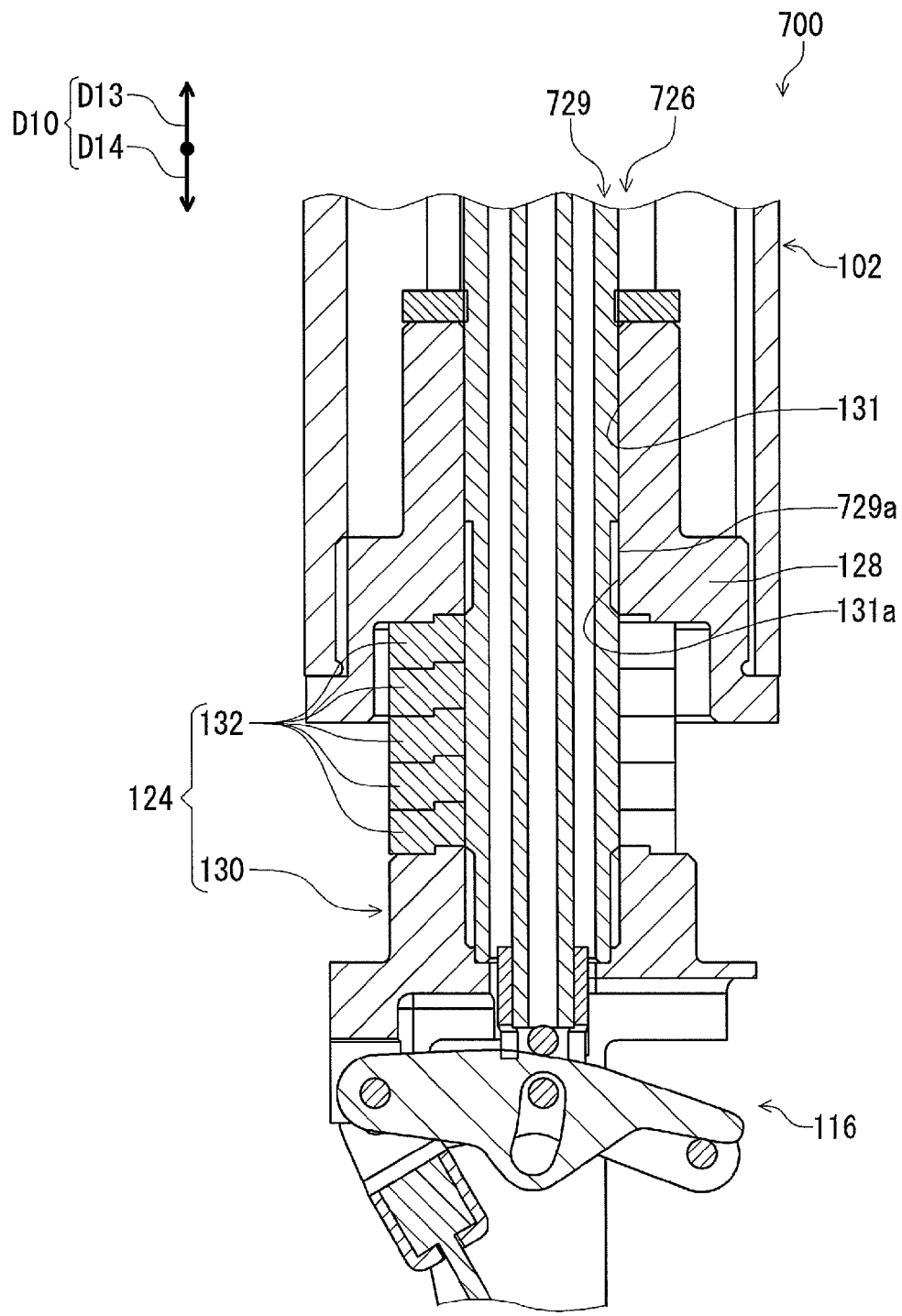
FIG. 43 is a partial cross-sectional view of a bicycle seatpost assembly illustrated in FIG. 35.

As seen in FIG. 43, the support member 729 extends in the telescopic direction D10 and is configured to be attached to the attachment end 128. The first positioning member 726 is attached to the first cylinder 102 via the attachment end 128.

As seen in FIG. 43, the adjusting structure 124 is configured to adjust a relative positional relationship between the first positioning member 726 and the second positioning member 728 in a reference state where a total length of the bicycle seatpost assembly 700 is one of shortest and longest. In the illustrated embodiment, the adjusting structure 124 is configured to adjust the relative positional relationship between the first positioning member 726 and the second positioning member 728 in a reference state where a total length of the bicycle seatpost assembly 700 is shortest.

The adjusting structure 124 is configure to adjust an initial relative position of the fluid cylinder 728 and the support member 729. In the illustrated embodiment, the initial relative position of the fluid cylinder 728 and the support member 729 is a relative position at which a total length of the bicycle seatpost assembly 700 is shortest.

As seen in FIG. 43, the adjusting structure 124 is configured to change a position of the first positioning member 726 relative to one of the first cylinder 102 and the second cylinder 104. The adjusting structure 124 is configured to change a position of the support member 729 relative to one of the first cylinder 102 and the second cylinder 104. In the illustrated embodiment, the adjusting structure 124 is configured to change the position of the first positioning member 726 (the support member 729) relative to the first cylinder 102. As described in the third embodiment, however, the adjusting structure 124 can be configured to change a position of the second positioning member 728 relative to the other of the first cylinder 102 and the second cylinder 104. The adjusting structure 124 can be configured to change a position of the fluid cylinder 728 relative to the other of the first cylinder 102 and the second cylinder 104.

As seen in FIG. 43, the adjusting structure 124 is configured to adjust a position of the support member 729 relative to the attachment end 128 in the telescopic direction D10. The support member 729 extends through the through-hole 131 and has an externally threaded portion 729a engaged with the internally threaded portion 131a. When the securing member 130 and the support member 729 are integrally rotated relative to the first cylinder 102, the securing member 130 and the support member 729 move relative to the first cylinder 102 in the telescopic direction D10 via the internally threaded portion 131a and the externally threaded portion 729a.

The spacers 132 are configured to be detachably provided between the securing member 130 and the attachment end 128 to adjust the position of the support member 729 relative to the attachment end 128. Since the method of adjusting the position of the support member 729 is substantially the same as the method of adjusting the position of the support member 110 in the first embodiment, it will not be described in detail here for the sake of brevity.

With the bicycle seatpost assembly 700, it is possible to obtain the same advantageous effect as that of the bicycle seatpost assembly 100 in accordance with the first embodiment.

It will be apparent to those skilled in the bicycle field from the present disclosure that the constructions of the above embodiments can be at least partially combined with each other if needed and/or desired. For example, the adjusting structure 424 in accordance with the third embodiment can be applied to the bicycle seatpost assembly 100 in accordance with the first embodiment in addition to the adjusting structure 124. In such an embodiment, the position of the first positioning member 126 can be adjusted relative to the first cylinder 102, and the position of the second positioning member 112 can be adjusted relative to the second cylinder 104. This allows both of the first adjustable position range AR1 and the second adjustable position range AR2 to be changed. Furthermore, each of the constructions of the second to fifth embodiments can be applied to the bicycle seatpost assembly 700 in accordance with the sixth embodiment.

In the present application, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

The invention claimed is:

1. A bicycle seatpost assembly comprising:
   a first cylinder;
   a second cylinder configured to be telescopically received in the first cylinder;
   a positioning structure configured to relatively position the first cylinder and the second cylinder and configured to switch a state of the bicycle seatpost assembly among
     a first adjustable state in which a positional relationship between the first cylinder and the second cylinder is adjustable within a first adjustable position range, and
     a second adjustable state in which the positional relationship between the first cylinder and the second cylinder is adjustable within a second adjustable position range different from the first adjustable position range; and
   an adjusting structure configured to adjust at least one of the first adjustable position range and the second adjustable position range.

2. The bicycle seatpost assembly according to claim 1, wherein
   the adjusting structure is configured to adjust one of the first adjustable position range and the second adjustable position range without changing the other of the first adjustable position range and the second adjustable position range.

3. The bicycle seatpost assembly according to claim 1, wherein the first cylinder and the second cylinder are relatively movable in a telescopic direction, the positioning structure includes
  a first positioning member movable together with one of the first cylinder and the second cylinder in the telescopic direction relative to the other of the first cylinder and the second cylinder, and
  a second positioning member movable together with the other of the first cylinder and the second cylinder in the telescopic direction relative to the one of the first cylinder and the second cylinder, and
the adjusting structure is configured to adjust a relative positional relationship between the first positioning member and the second positioning member in a reference state where a total length of the bicycle seatpost assembly is one of shortest and longest.

4. The bicycle seatpost assembly according to claim 3, wherein
the adjusting structure is configured to change a position of the first positioning member relative to one of the first cylinder and the second cylinder, and/or
the adjusting structure is configured to change a position of the second positioning member relative to the other of the first cylinder and the second cylinder.

5. The bicycle seatpost assembly according to claim 3, wherein
the second positioning member extends in the telescopic direction in a form of a fluid cylinder, and
the first positioning member includes
  a support member at least partly disposed in the fluid cylinder to provide a fluid passageway between the support member and the fluid cylinder, and
  a seal member configured to block the fluid passageway in a state where the total length of the bicycle seatpost assembly is an intermediate length between a maximum overall length and a minimum overall length.

6. The bicycle seatpost assembly according to claim 5, wherein
one of the first cylinder and the second cylinder includes an attachment end,
the support member extends in the telescopic direction and is configured to be attached to the attachment end, and
the adjusting structure is configured to adjust a position of the support member relative to the attachment end in the telescopic direction.

7. The bicycle seatpost assembly according to claim 6, wherein
the adjusting structure includes
  a securing member configured to be secured to an end of the support member, and
  at least one spacer configured to be detachably provided between the securing member and the attachment end to adjust a position of the support member relative to the attachment end.

8. The bicycle seatpost assembly according to claim 6, wherein
the adjusting structure includes a lock member configured to lock the support member relative to the attachment end so that a position of the support member is adjustable relative to the attachment end.

9. The bicycle seatpost assembly according to claim 6, wherein
the other of the first cylinder and the second cylinder includes an additional attachment end,
the fluid cylinder is configured to be attached to the additional attachment end, and
the adjusting structure is configured to adjust a position of the fluid cylinder relative to the additional attachment end in the telescopic direction.

10. The bicycle seatpost assembly according to claim 9, wherein
the adjusting structure includes
  a rack including teeth and secured to the fluid cylinder, and
  a pinion gear configured to engage with the teeth of the rack to position the fluid cylinder relative to the additional attachment end.

11. A bicycle seatpost assembly comprising:
a first cylinder;
a second cylinder configured to be telescopically received in the first cylinder so as to be movable with respect to the first cylinder in a telescopic direction, the telescopic direction including
  an extending direction in which a total length of the bicycle seatpost assembly increases, and
  a shortening direction which is opposite to the extending direction and in which the total length of the bicycle seatpost assembly decreases;
a positioning structure configured to relatively position the first cylinder and the second cylinder;
a first abutment configured to be coupled to the first cylinder;
a second abutment configured to be coupled to the second cylinder, the second abutment being configured to abut the first abutment to restrict a movement of the second cylinder with respect to the first cylinder in the extending direction; and
an adjusting structure configured to adjust one of a position of the first abutment relative to the first cylinder and a position of the second abutment relative to the second cylinder.

12. The bicycle seatpost assembly according to claim 11, wherein
the first abutment and the second abutment are provided in the second cylinder.

13. The bicycle seatpost assembly according to claim 12, wherein
the positioning structure includes
  a sealing structure configured to be mounted to the second cylinder and having an opening, and
  a support member configured to be mounted to the first cylinder to extend through the opening of the sealing structure,
the first abutment is provided to the support member, and
the second abutment is provided to the sealing structure.

14. The bicycle seatpost assembly according to claim 13, wherein
the adjusting structure is configured to change a position of the support member relative to the first cylinder to adjust the position of the first abutment relative to the first cylinder.

15. The bicycle seatpost assembly according to claim 14, wherein
the first cylinder includes an attachment end to which the support member is configured to be attached, and
the adjusting structure includes
  a securing member configured to be secured to an end of the support member and provided outside the first cylinder, and
  at least one spacer configured to be detachably provided between the securing member and the attachment end to adjust a position of the support member relative to the attachment end.

16. The bicycle seatpost assembly according to claim 14, wherein
the first cylinder includes an attachment end to which the support member is configured to be attached, and
the adjusting structure includes a lock member configured to lock the support member relative to the attachment end so that a position of the support member is adjustable relative to the attachment end.

17. The bicycle seatpost assembly according to claim 11, wherein
the first abutment and the second abutment are provided outside the second cylinder.

18. The bicycle seatpost assembly according to claim 17, wherein
the first cylinder includes an inner peripheral surface,
the second cylinder includes an outer peripheral surface configured to face the inner peripheral surface,
the first abutment is provided on the inner peripheral surface of the first cylinder, and
the second abutment is provided on the outer peripheral surface of the second cylinder.

19. The bicycle seatpost assembly according to claim 18, wherein
the second abutment is configured to radially protrude from the outer peripheral surface of the second cylinder.

20. The bicycle seatpost assembly according to claim 19, further comprising:
a restricting member radially protruding from the outer peripheral surface of the second cylinder, wherein
the first cylinder includes a restricting groove provided on the inner peripheral surface and extending in the telescopic direction,
the restricting member is provided in the restricting groove to restrict a relative rotation between the first cylinder and the second cylinder, and
the second abutment is provided to the restricting member.

21. The bicycle seatpost assembly according to claim 20, wherein
the adjusting structure is configured to adjust a position of the first abutment relative to the first cylinder.

22. The bicycle seatpost assembly according to claim 21, wherein
the adjusting structure includes a stopper attached to an end of the first cylinder to be contactable with the second abutment, and
the first abutment is provided to the stopper.

23. The bicycle seatpost assembly according to claim 22, wherein
the adjusting structure is configured to adjust the position of the first abutment relative to the first cylinder via the stopper in the telescopic direction.

24. A bicycle seatpost assembly comprising:
a first cylinder;
a second cylinder configured to be telescopically received in the first cylinder so as to be movable with respect to the first cylinder in a telescopic direction;
a positioning structure configured to relatively position the first cylinder and the second cylinder, the positioning structure including
a fluid cylinder connected to one of the first cylinder and the second cylinder, and a support member connected to the other of the first cylinder and the second cylinder, the support member being at least partly received in the fluid cylinder; and
an adjusting structure configure to adjust an initial relative position of the fluid cylinder and the support member.

25. The bicycle seatpost assembly according to claim 24, wherein
the adjusting structure is configured to change a position of the support member relative to one of the first cylinder and the second cylinder, and
the adjusting structure is configured to change a position of the fluid cylinder relative to the other of the first cylinder and the second cylinder.

26. The bicycle seatpost assembly according to claim 25, wherein
the support member is at least partly disposed in the fluid cylinder to provide a fluid passageway between the support member and the fluid cylinder, and
the positioning structure includes a seal member configured to block the fluid passageway in a state where a total length of the bicycle seatpost assembly is an intermediate length between a maximum overall length and a minimum overall length.

27. The bicycle seatpost assembly according to claim 26, wherein
one of the first cylinder and the second cylinder includes an attachment end,
the support member extends in the telescopic direction and is configured to be attached to the attachment end, and
the adjusting structure is configured to adjust a position of the support member relative to the attachment end in the telescopic direction.

28. The bicycle seatpost assembly according to claim 27, wherein
the adjusting structure includes
a securing member configured to be secured to an end of the support member, and
at least one spacer configured to be detachably provided between the securing member and the attachment end to adjust a position of the support member relative to the attachment end.

29. The bicycle seatpost assembly according to claim 27, wherein
the adjusting structure includes a lock member configured to lock the support member relative to the attachment end so that a position of the support member is adjustable relative to the attachment end.

30. The bicycle seatpost assembly according to claim 27, wherein
the other of the first cylinder and the second cylinder includes an additional attachment end,
the fluid cylinder is configured to be attached to the additional attachment end, and
the adjusting structure is configured to adjust a position of the fluid cylinder relative to the additional attachment end.

31. The bicycle seatpost assembly according to claim 30, wherein
the adjusting structure includes
a rack including teeth and secured to the fluid cylinder, and
a pinion gear configured to engage with the teeth of the rack to position the fluid cylinder relative to the additional attachment end.

* * * * *